(12) United States Patent
Hickman et al.

(10) Patent No.: US 11,623,828 B2
(45) Date of Patent: Apr. 11, 2023

(54) AUTONOMOUS DEVICES, SYSTEMS, AND METHODS FOR PACKING FOLDED LAUNDRY

(71) Applicant: MONOTONY.AI, INC., Allston, MA (US)

(72) Inventors: Madeline R. Hickman, Arlington, MA (US); Samuel Duffley, Cambridge, MA (US); Noa M. Rensing, West Newton, MA (US); Kayla M. Swiston, Chesnut Hill, MA (US); Jesse Sielaff, Norfolk, MA (US); Benjamin D. Bixby, Newton Highlands, MA (US)

(73) Assignee: MONOTONY.AI, INC., Allston, MA (US)

( * ) Notice: Subject to any disclaimer, the term of this patent is extended or adjusted under 35 U.S.C. 154(b) by 0 days.

(21) Appl. No.: 17/514,700

(22) Filed: Oct. 29, 2021

(65) Prior Publication Data
US 2022/0135266 A1    May 5, 2022

Related U.S. Application Data

(60) Provisional application No. 63/168,540, filed on Mar. 31, 2021, provisional application No. 63/168,555, (Continued)

(51) Int. Cl.
*B65B 25/20* (2006.01)
*B65B 35/44* (2006.01)
(Continued)

(52) U.S. Cl.
CPC ............ *B65G 65/16* (2013.01); *B65B 25/20* (2013.01); *B65B 35/44* (2013.01); *B65B 35/50* (2013.01);
(Continued)

(58) Field of Classification Search
CPC ......... B65B 25/20; B65B 35/44; B65B 35/50; B65B 57/10; B65B 59/00; D06F 95/00
See application file for complete search history.

(56) References Cited

U.S. PATENT DOCUMENTS 3,967,716 A    7/1976    Smith
4,124,967 A    11/1978   Beer et al.
(Continued)

FOREIGN PATENT DOCUMENTS

DE      29607058 U1    7/1996

OTHER PUBLICATIONS https://www.youtube.com/watch?v=_DEqMz1SdTc Pullnose, Pull nose, Conveyor, Teleskop conveyor, Teleskoptransportører 632 views Jan. 21, 2014.
(Continued)

*Primary Examiner* — Anna K Kinsaul
*Assistant Examiner* — Veronica Martin
(74) *Attorney, Agent, or Firm* — Myers Bigel, P.A.

(57) ABSTRACT

Devices, systems, and methods for autonomously packing folded laundry articles into a container are described. A packing system includes a refillable cartridge, a queue conveyor having one or more folded laundry articles and stacks of folded laundry articles disposed thereon, at least one retractable conveyor loading end between the refillable cartridge and the queue conveyor for loading the folded laundry articles into the refillable cartridge, a driven lifter for selectively raising and lowering the into and out of the container, and a controller in operative configuration with processors and drives of all of the foregoing and one or more sensors detecting a fill height of the refillable cartridge. The refillable cartridge includes a removable receiving surface that moves from a closed position to an open position during
(Continued)

loading of the folded laundry by the retractable conveyor and unloading of the folded laundry into the container.

25 Claims, 46 Drawing Sheets

Related U.S. Application Data filed on Mar. 31, 2021, provisional application No. 63/106,891, filed on Oct. 29, 2020.

(51) Int. Cl.
| | |
|---|---|
| *B65B 35/50* | (2006.01) |
| *B65B 57/10* | (2006.01) |
| *B65B 59/00* | (2006.01) |
| *B65G 65/16* | (2006.01) |
| *B65G 57/03* | (2006.01) |
| *B65G 65/00* | (2006.01) |
| *B65G 65/32* | (2006.01) |
| *B65G 69/02* | (2006.01) |
| *D06F 95/00* | (2006.01) |

(52) U.S. Cl.
CPC ............ *B65B 57/10* (2013.01); *B65B 59/00* (2013.01); *B65G 57/03* (2013.01); *B65G 65/005* (2013.01); *B65G 65/32* (2013.01); *B65G 69/02* (2013.01); *D06F 95/00* (2013.01); *B65G 2201/0229* (2013.01); *B65G 2203/0208* (2013.01); *B65G 2203/0283* (2013.01); *B65G 2203/041* (2013.01); *B65G 2814/0305* (2013.01); *B65G 2814/0331* (2013.01)

(56) References Cited

U.S. PATENT DOCUMENTS

| | | | | |
|---|---|---|---|---|
| 4,765,487 | A | 8/1988 | Bliss | |
| 4,854,111 | A | 8/1989 | Roberts et al. | |
| 4,862,677 | A | 9/1989 | Roberts et al. | |
| 6,122,895 | A | 9/2000 | Schubert | |
| 7,814,733 | B2 | 10/2010 | Carlson et al. | |
| 8,689,530 | B2* | 4/2014 | Prahm | B65B 5/064 53/247 |
| 9,789,983 | B2* | 10/2017 | Brandhorst | B65B 5/105 |
| 10,287,048 | B2 | 5/2019 | Sytema et al. | |
| 10,882,705 | B2 | 1/2021 | Overley | |
| 2001/0040107 | A1 | 11/2001 | Tourre et al. | |
| 2003/0019798 | A1* | 1/2003 | Capps | D06F 95/00 68/245 |
| 2003/0033788 | A1* | 2/2003 | Van Dam | B65G 57/06 53/541 |
| 2006/0070353 | A1* | 4/2006 | Van Dam | B65B 5/108 53/247 |
| 2007/0209327 | A1* | 9/2007 | Kent | B65B 35/50 53/553 |
| 2009/0266037 | A1 | 10/2009 | Odman et al. | |
| 2010/0230432 | A1 | 9/2010 | Cardinal et al. | |
| 2012/0191240 | A1 | 7/2012 | Gilmore | |
| 2016/0135510 | A1 | 5/2016 | Ay | |
| 2017/0321372 | A1 | 11/2017 | Powell et al. | |
| 2018/0029729 | A1 | 2/2018 | Kim et al. | |
| 2018/0061255 | A1 | 3/2018 | Ekambaram et al. | |
| 2019/0286138 | A1 | 9/2019 | Skaaksrud et al. | |
| 2019/0287051 | A1 | 9/2019 | Heinla | |
| 2020/0193336 | A1 | 6/2020 | Capoia et al. | |
| 2020/0207550 | A1 | 7/2020 | De Boer et al. | |
| 2020/0331645 | A1 | 10/2020 | Almogy et al. | |
| 2020/0346792 | A1 | 11/2020 | Curhan et al. | |
| 2020/0356951 | A1 | 11/2020 | Cristache | |
| 2020/0376668 | A1 | 12/2020 | Russell | |
| 2020/0407088 | A1 | 12/2020 | White et al. | |
| 2021/0004646 | A1 | 1/2021 | Guizilini et al. | |

OTHER PUBLICATIONS https://www.youtube.com/watch?v=_uCL1e4j2PE, T-shirt Automatic folding & stacking machine (FX23), 10,704 views Jun. 17, 2010.
https://www.youtube.com/watch?v=Ooe24YsavF8, CVP Automated Packaging Solution, 42,057 views Jun. 28, 2018.
https://www.youtube.com/watch?v=8X6mIKmuIKQ, ROQ Fold, ROQ Pack and ROQ Stack Automatic Folding Machine, 36,369 views Mar. 28, 2017.
https://www.youtube.com/watch?v=O1DYltFHEKM M fold paper towel machine with automatic packing machine line 1,426 views Aug. 1, 2019.
https://www.youtube.com/watch?v=OchpR3VfUWo #Laundrynerds Expert Session: GREIT Stack Storage & Pack-Out System (Live Stream 2), 803 views Streamed live on May 27, 2020.
https://www.youtube.com/watch?v=qNF2vcOdQ04, Automated box packing system, 155,172 views Nov. 18, 2010.
https://www.youtube.com/watch?v=RrhX_GzYXk0, Automatic Linen Buffer and Storage—Inwatec, 4,273 views May 18, 2018.
https://www.youtube.com/watch?v=wfn8DpXENms, T-Apparel—folding & packing solution for garment, 318 views Apr. 25, 2018.
https://www.youtube.com/watch?v=wTARKYfzK6Y N Fold Hand Towel Paper Packing Machine | N fold Tissue Packing Machine | Lahooti Printech Pvt. Ltd. 2,054 views Jan. 24, 2020.
https://www.youtube.com/watch?v=Y5QZVjr-5rU , Automatic tissue paper napkin packing machine, 1,978 views Apr. 24, 2019.
Invitation to Pay Additional Fees for PCT/US2021/057322 dated Feb. 14, 2022, 11 pages.
Inwatec, Big Packing Machine, Automated Separation and Packing of Small Laundry Items, https://inwatec.dk/products/bag-packing-machine, 8 pages, available as of the date of filing.
Inwatec, GREIT Stack Storage System, Automatic Storage and Transportation of Stacked Laundry Items with GREIT, https://inwatec.dk/products/greit/, 9 pages, available as of the date of filing.

* cited by examiner

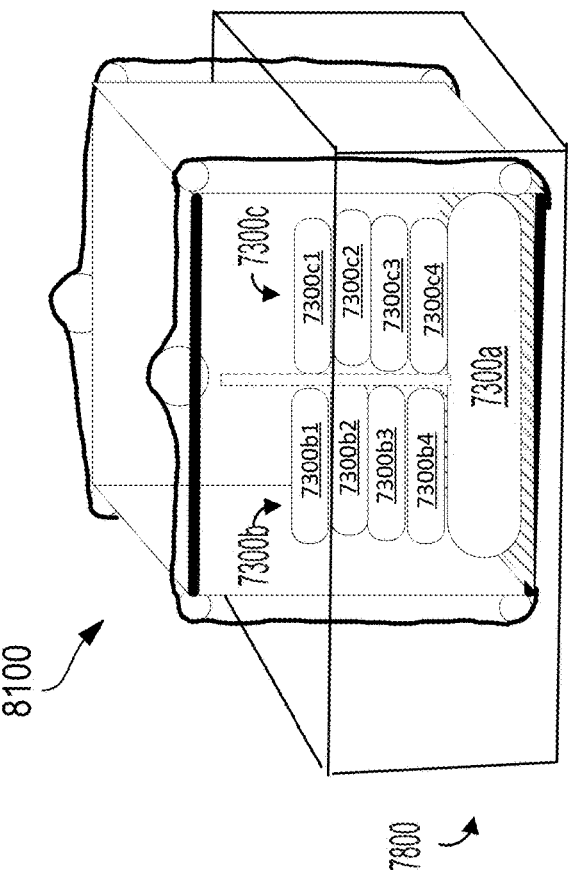
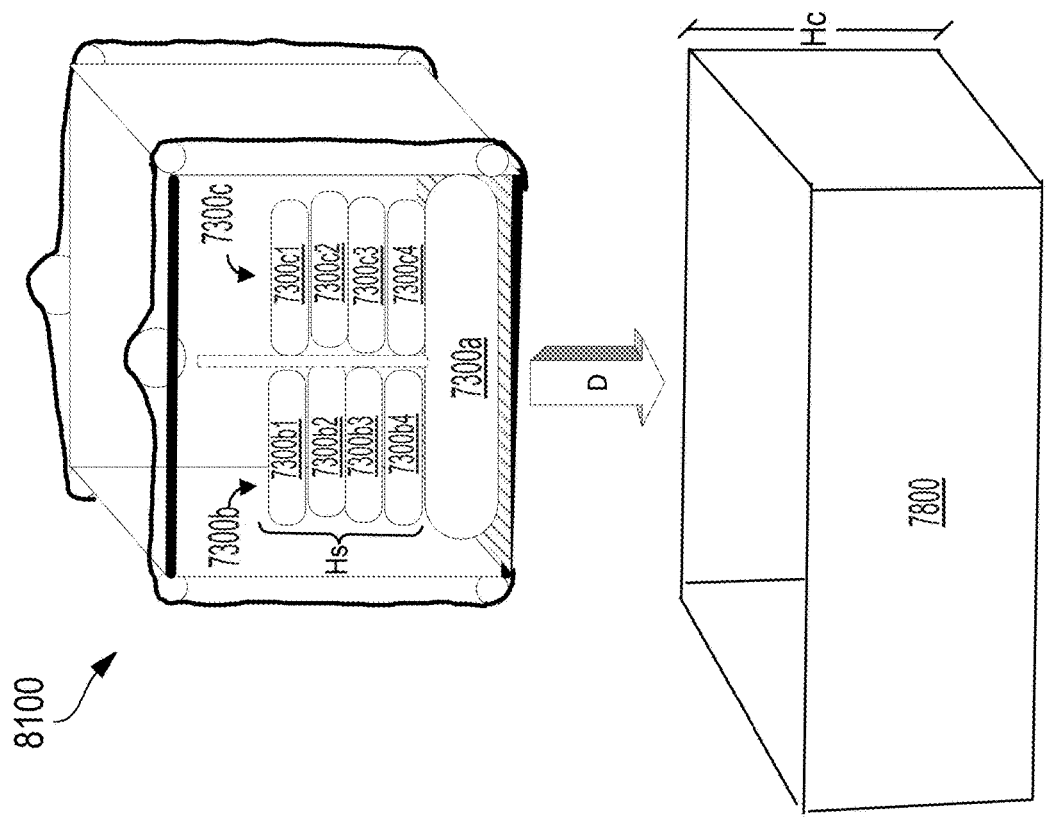
FIG. 17B
FIG. 17A

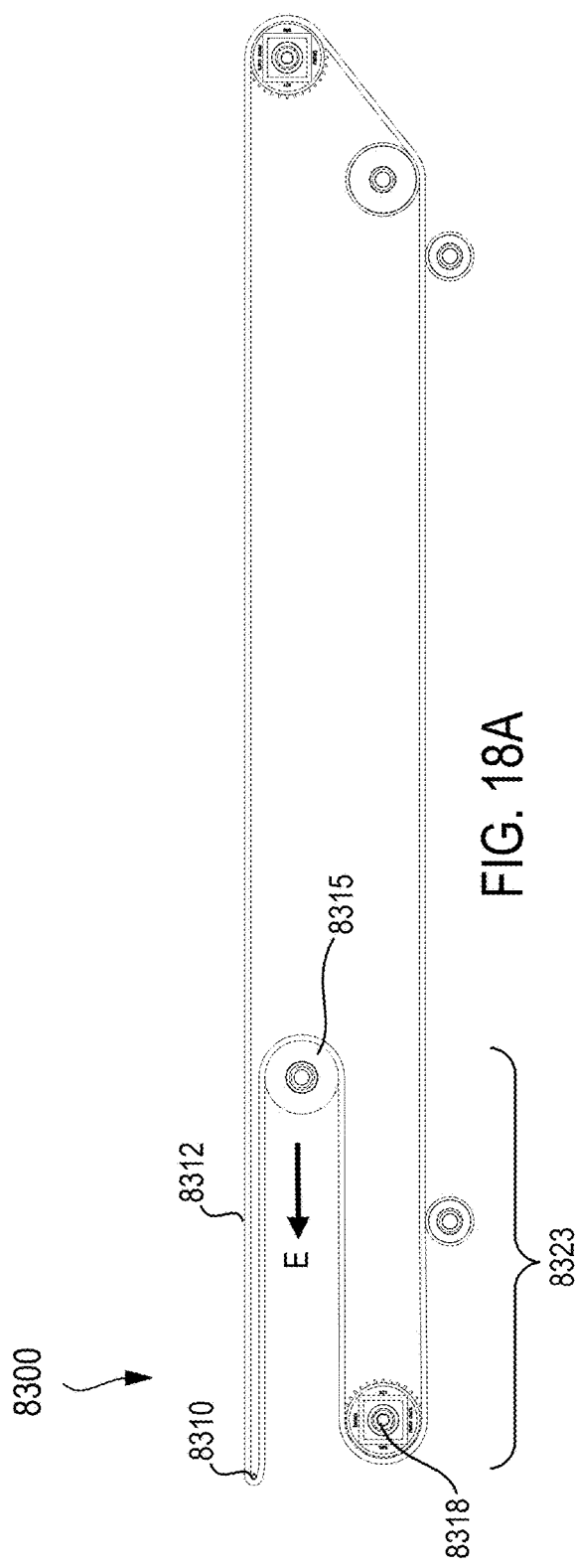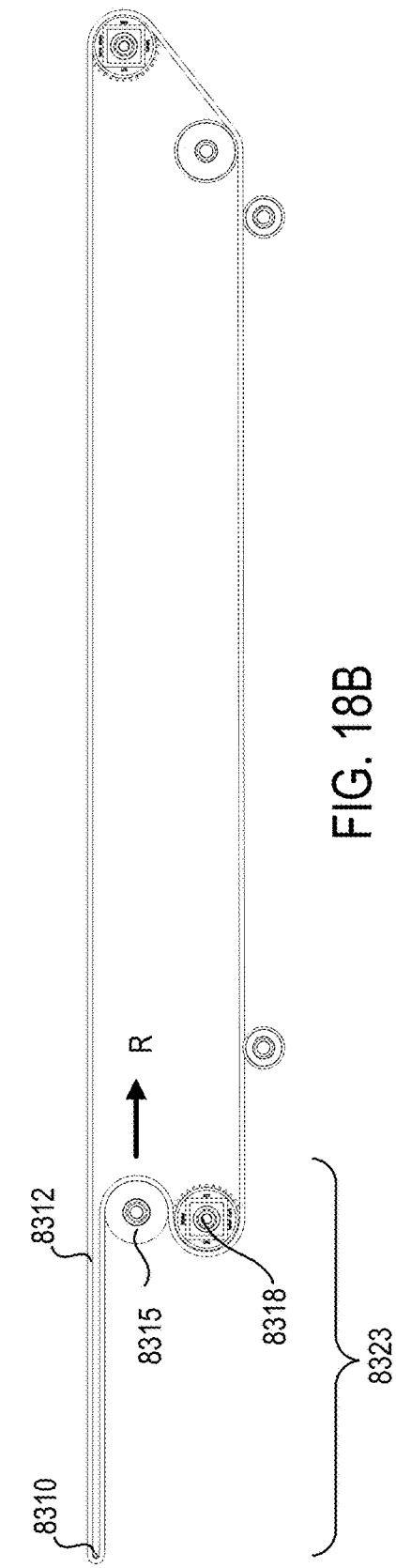

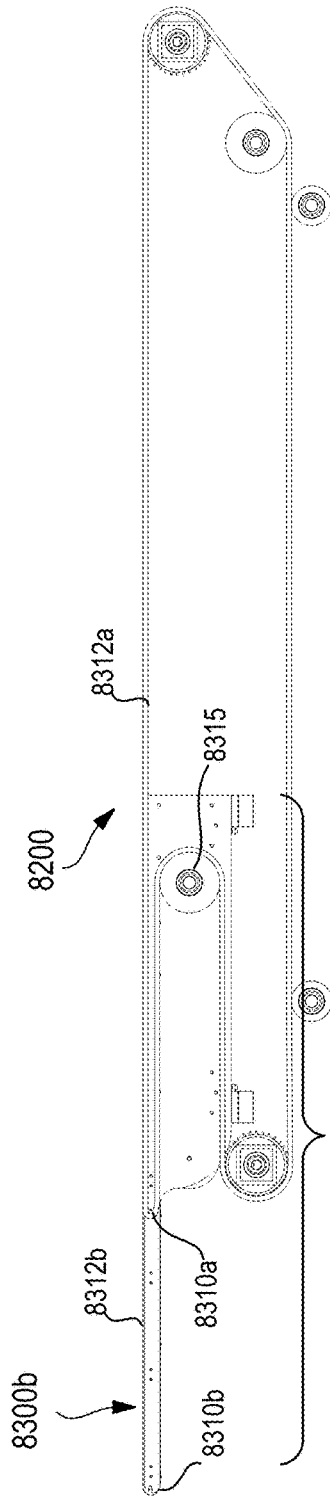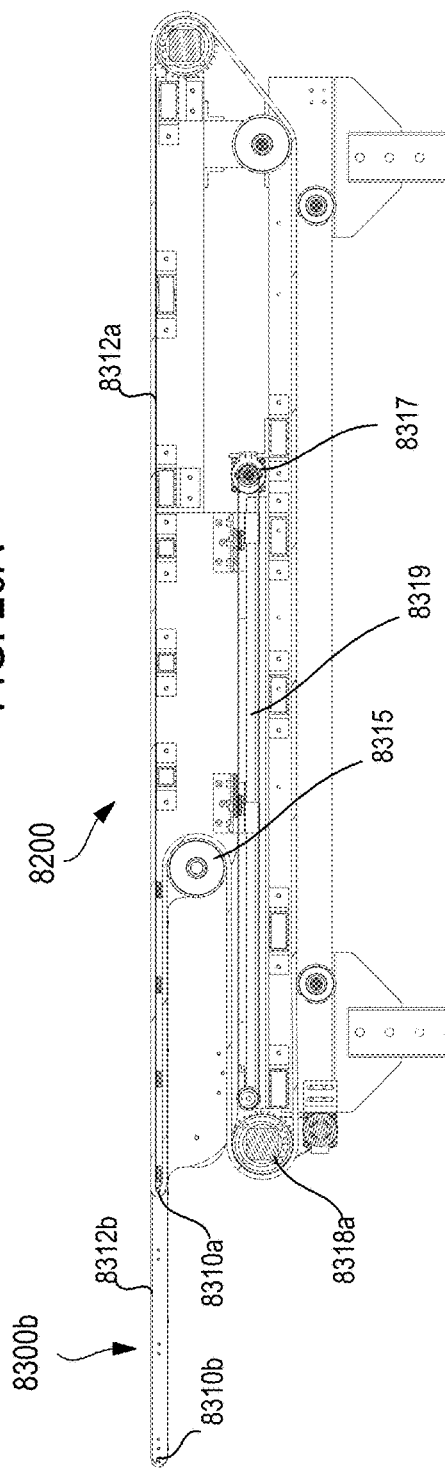

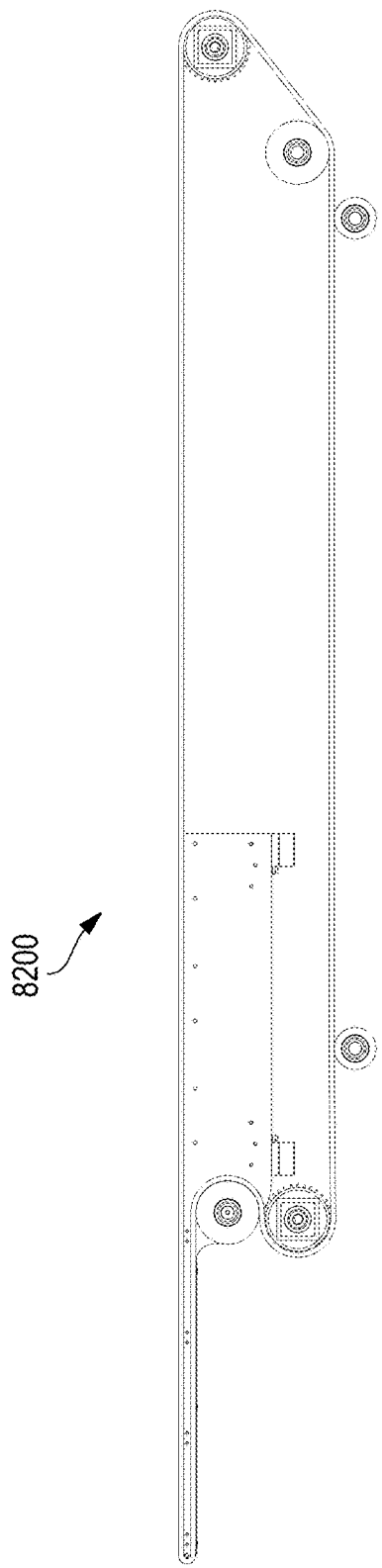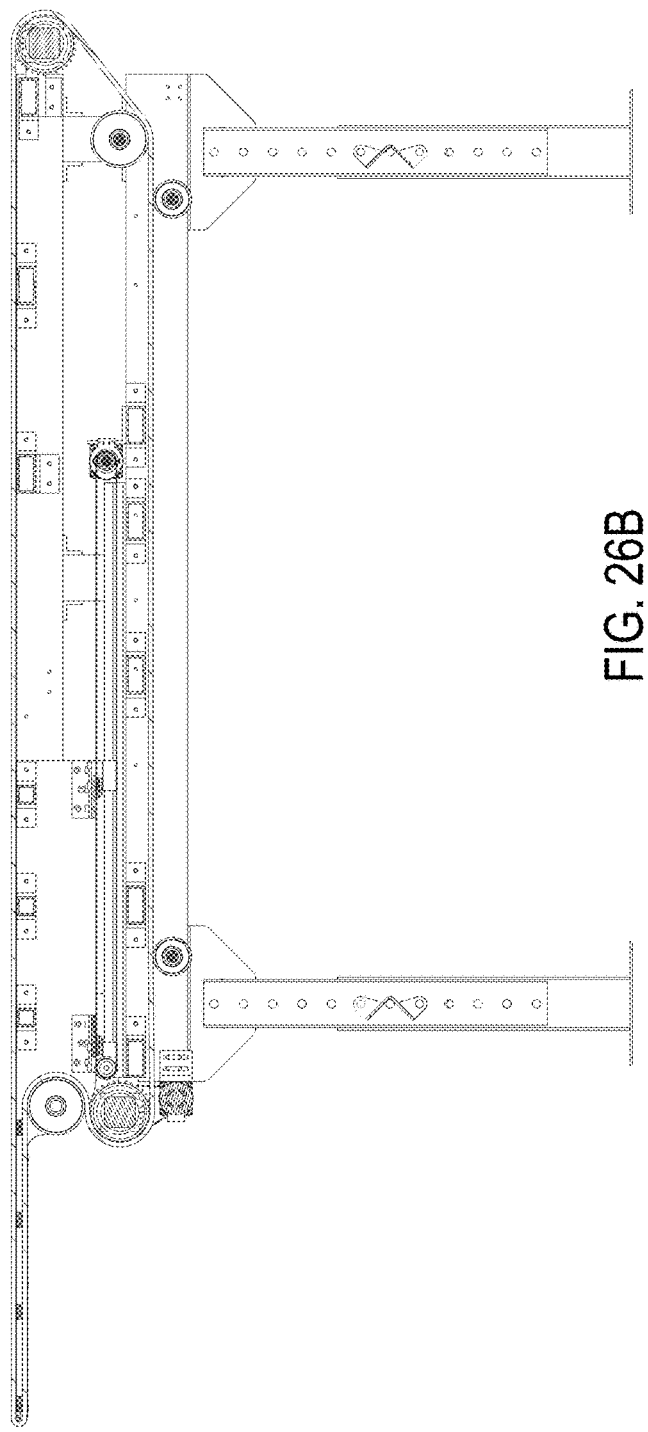
FIG. 26A
FIG. 26B

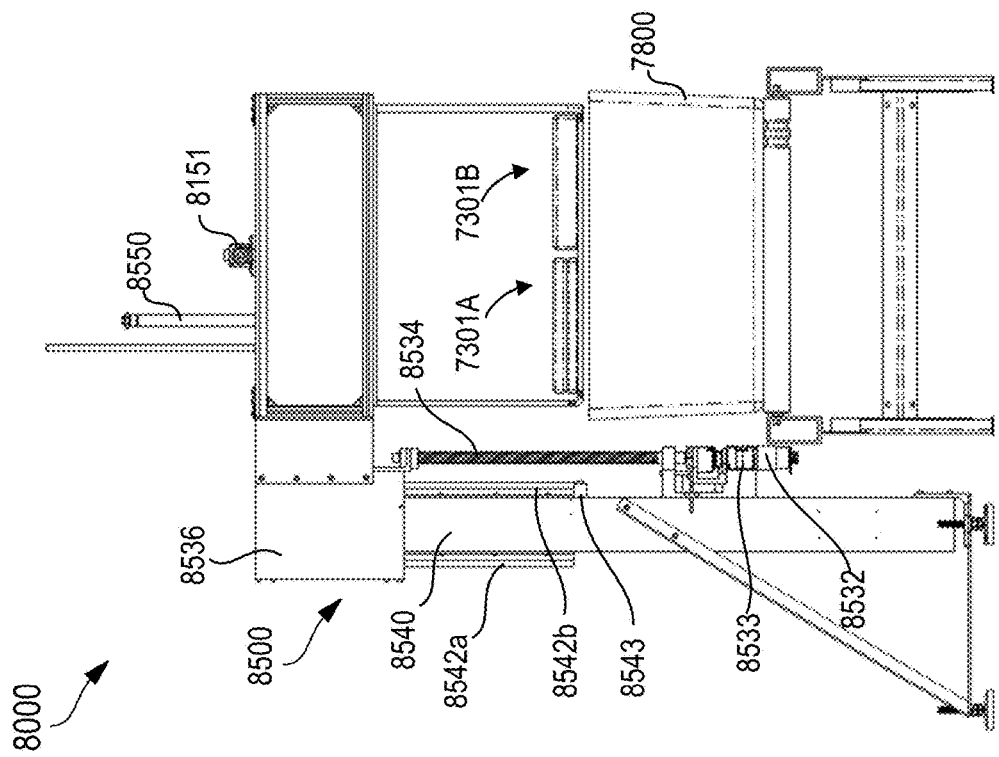
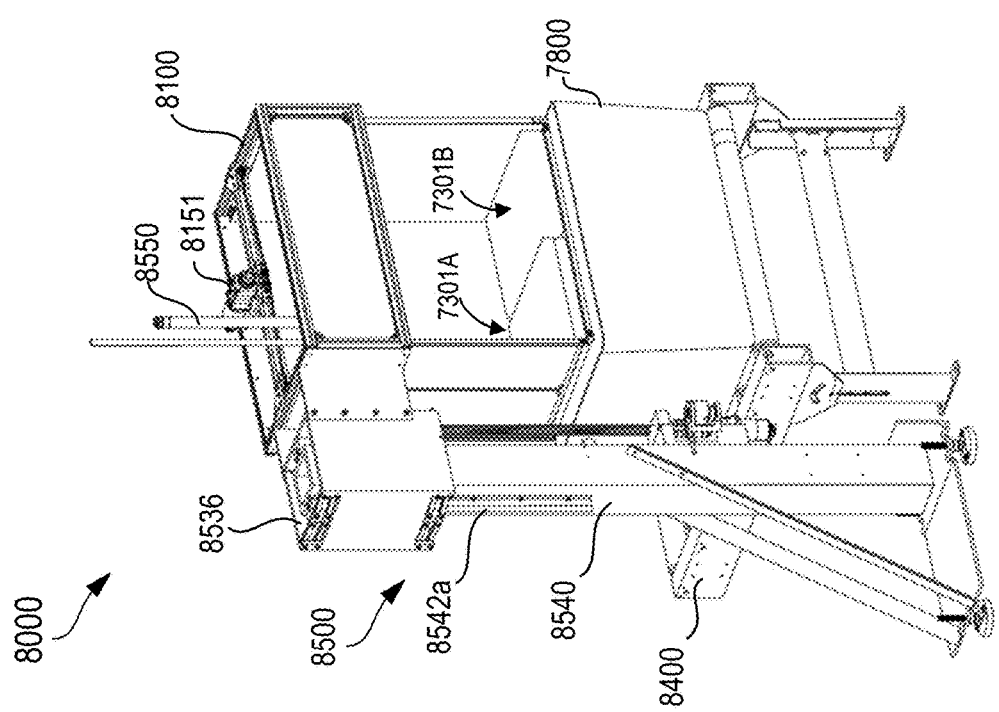
FIG. 30B
FIG. 30A

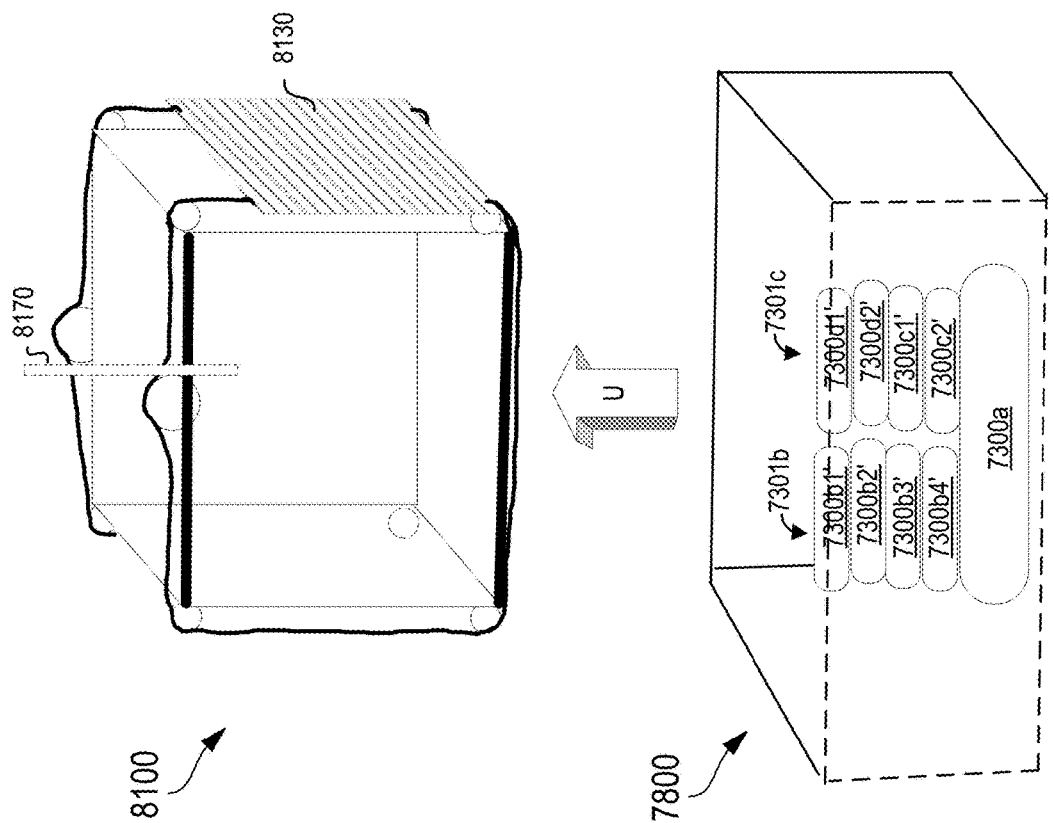
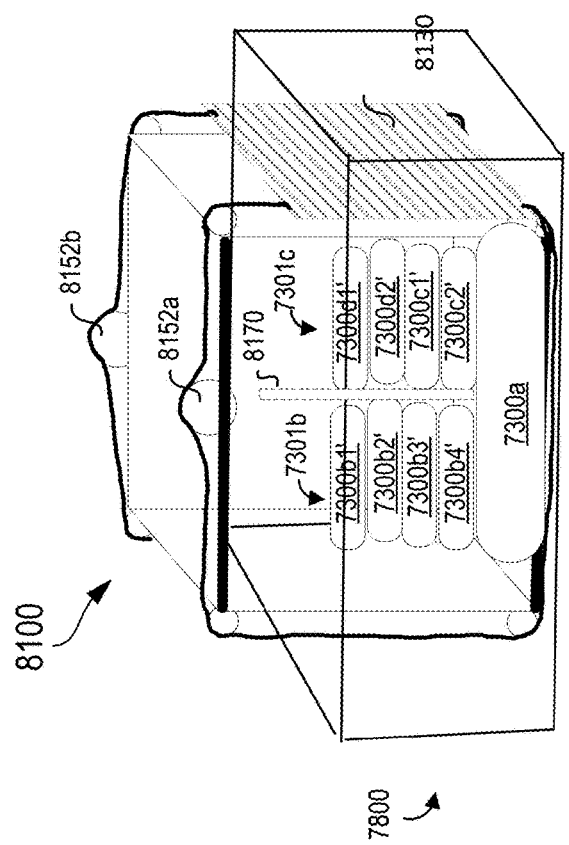
FIG. 40A
FIG. 40B

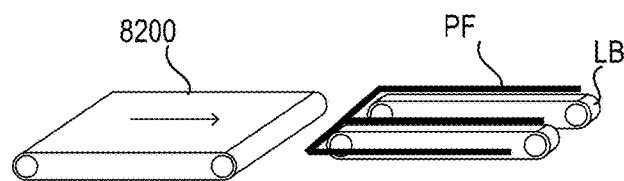
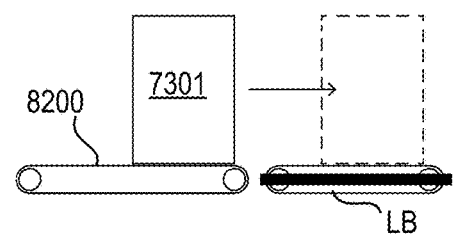
FIG. 46A
FIG. 46B
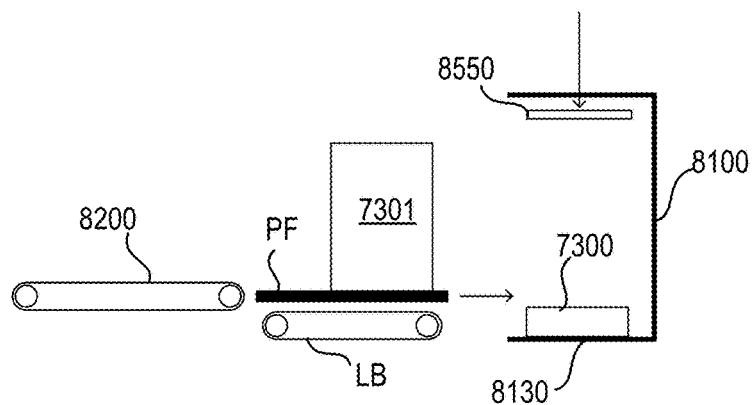
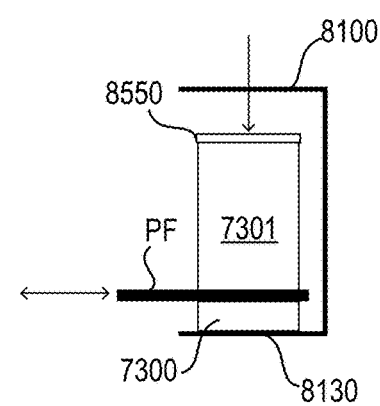
FIG. 46C
FIG. 46D

AUTONOMOUS DEVICES, SYSTEMS, AND METHODS FOR PACKING FOLDED LAUNDRY

CROSS-REFERENCE TO RELATED APPLICATIONS

This application claims priority under 35 U.S.C. § 119(e) to U.S. Provisional Patent Application Ser. No. 63/168,540 filed Mar. 31, 2021, titled "Autonomous Devices, Systems, and Methods For Packing Folded Laundry," U.S. Provisional Patent Application Ser. No. 63/168,555 filed Mar. 31, 2021, titled "Autonomous Devices, Systems, and Methods For Queuing Folded Laundry," and U.S. Provisional Patent Application Ser. No. 63/106,891 filed Oct. 29, 2020, titled "Autonomous Devices, Systems, And Methods For Handling Folded Laundry," the entirety of each of which applications is hereby incorporated by reference.

BACKGROUND

The present disclosure is directed to robotic laundry devices, systems, and methods.

Automating and outsourcing mundane, time-consuming household chores to robotic devices is increasingly common. Time-saving home robots include, for example, floor vacuuming and floor washing robots. Outsourcing responsibilities include, for example, engaging grocery shopping and delivery, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding and repacking clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to the customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital bed sheets, medical scrubs, and hotel towels. Such industrial machines are tailor-made to accept one type of laundry item of one size or style. For example, unique folding machines exist to accept washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Autonomous robotic devices are provided to process loads of household laundry. Such devices eliminate human contact with deformable laundry articles and autonomously process batches of disparate article types and sizes. As such, the devices need to be designed to be efficient and reliable for replacing the common, human-dependent chore of laundry.

SUMMARY

In one example, a refillable cartridge device configured to receive automatically at least one unbound folded laundry article for transfer into a container includes a pair of rigid opposed sidewalls, a rigid back wall spanning between the pair of opposed sidewalls, an opening opposite the rigid back wall, the opening configured to receive the at least one unbound folded laundry article therethrough, a removable receiving surface configured to span, in a closed position, between a bottom edge of each one of the pair of opposing sidewalls and the rigid back wall, at least one drive for moving the removable receiving surface from the closed position to an open position, and a controller in operable communication with the at least one drive and a communication network. The controller is configured to receive via the communication network one or more sensor signals indicative of at least one of the refillable cartridge being filled to a threshold height by the at least one unbound folded laundry article and no additional unbound folded laundry article being queued for insertion into the refillable cartridge, and instruct the drive to move the removable receiving surface from the closed position to the open position such that the removable receiving surface is no longer disposed beneath the at least one unbound folded laundry article.

Implementations of the device may include one or more of the following features.

In examples, the device further includes one or more channels disposed on at least one of the pair of opposing sidewalls, the one or more channels configured to receive the removable receiving surface in the open position. The one or more channels can include a pair of vertical channels, each one of the vertical channels being disposed adjacent a peripheral edge of the at least one of the pair of rigid opposed sidewalls.

In examples, the removable receiving surface is configured to retract into the one or more channels in the open position.

In examples, the device further includes one or more cords fixedly attached to the removable receiving surface and configured to route within the one or more channels, and a motorized pulley configured to receive the one or more cords. In examples, the motorized pulley includes the drive of the removable receiving surface, and the motorized pulley is configured to selectively raise and lower the one or more cords to retract the removable receiving surface in the open position and return the removable receiving surface to the closed position.

In examples, the device further includes at least one guide rail between a bottom edge of each of the pair of rigid opposed side walls configured to receive the removable receiving surface in the closed position.

In examples, the removable receiving surface is pliant. The receiving surface can include at least one of rubber, PVC, urethane, neoprene, nylon, nitrile, polyester, leather, and KEVLAR. In examples, the removable receiving surface includes a linked belt. In examples, the removable receiving surface is smooth.

In examples, the removable receiving surface includes a coefficient of friction between about 0.01 and 0.6.

In examples, the removable receiving surface is hingedly attached to a bottom edge of at least one of the pair of rigid opposing sidewalls and the rigid back wall.

In examples, the receiving surface includes at least one of rubber, PVC, polycarbonate, acrylonitrile butadiene styrene (ABS), urethane, neoprene, nylon, nitrile, polyester, leather, polyoxymethylene (POM), acetal, KEVLAR, TEFLON, DELRIN, ultrahigh molecular weight polyethylene, aluminum, and stainless steel.

In examples, a height of the at least one unbound folded laundry article is less than or equal to a height of the container.

In examples, the at least one unbound folded laundry article includes a plurality of unbound folded laundry articles disposed sequentially in a queue on a queue conveyor proximate the receiving surface. The plurality of unbound folded laundry articles includes household laundry belonging to a single household. The household laundry includes two or more article types of at least one of different sizes and different shapes, and each of the two or more article types includes a longest dimension of between about 4 cm to 500 cm.

In examples, the plurality of unbound folded laundry articles includes at least one stack of unbound folded laundry articles. A height of the at least one stack of unbound folded laundry articles is less than or equal to a height of the container. In examples, the refillable cartridge includes a height greater than or equal to the height of the container. In examples, a height of the at least one stack of folded laundry article includes a range of between about 25 to 65 cm.

In examples, the controller is further configured to receive a sensor signal indicative of a height of the at least one stack of folded laundry articles. The sensor signal is output from one or more sensors disposed proximate the refillable cartridge. In examples, the one or more sensors includes an optical sensor. In examples, the sensor includes at least one of a 3-D camera, an IR sensor, a 2-D camera, LIDAR, LADAR, a sonar proximity sensor, an ultrasonic ranging sensor, a radar sensor, and a pair of stereo depth cameras.

In examples, each unbound folded laundry article of the at least one stack of folded laundry articles includes at least one of a common article type and area footprint. The at least one stack of unbound folded laundry articles includes an area footprint less than or equal to an area bounded by the rigid opposing sidewalls, the rigid back wall, and the opening. In examples, the at least one stack of unbound folded laundry articles includes at least two stacks and the refillable cartridge is configured to receive two or more stacks of the at least two unbound folded laundry articles. In examples, the two or more stacks of unbound folded laundry articles are configured to be received at least one of side-by-side and atop one another, and a height of each of the two or more stacks is less than or equal to a height of the container. In examples, the two or more stacks of unbound folded laundry articles are configured to be received atop one another and a combined height of the received two or more stacks is less than or equal to a height of the container. In examples, the two or more stacks of unbound folded laundry articles are configured to be received side-by-side and an area footprint of the received side-by-side stacks is less than or equal to an area bounded by the rigid opposing sidewalls, the rigid back wall, and the opening.

In examples, the two or more stacks of folded laundry articles are disposed adjacent the refillable cartridge in at least one queue. The at least one queue can include two parallel queues, and each one of the two parallel queues can be aligned with one half of a volume of the refillable cartridge. In examples, the two parallel queues are staggered along a length of the two parallel queues. In examples, the two parallel queues are disposed on a movable conveyor in operable communication with the controller. In examples, the two or more stacks of the two parallel queues are disposed in order of size, and at least one of the at least one unbound folded laundry article and the two or more stacks of folded laundry articles including a largest folded area is disposed closest to the refillable cartridge. In examples, at least one of a remaining one or more unbound folded laundry article the two or more stacks of folded laundry articles are disposed in the at least one queue in a descending order of folded area.

In examples, the two or more stacks of the two parallel queues include approximately even heights, and the even heights include a range of between about 25 to 65 cm. In examples, the device further includes at least one conveyor disposed between the at least one queue and the refillable cartridge. The at least one conveyor is configured to convey the at least one unbound folded laundry article to the refillable cartridge. In examples, the device further includes at least one sensor in communication with the communication network. The at least one sensor is configured to detect a presence of one or more unbound articles disposed adjacent the refillable cartridge in two parallel queues. In examples, the at least one conveyor includes two parallel conveyors, and each one of the two parallel conveyors aligned with one of the two parallel queues. The two parallel conveyors can operate at least one of independently and simultaneously.

In examples, each one of the two parallel conveyors is configured to extend a leading edge out to the rigid back wall, rotate a conveyor belt to advance the at least one of the at least one unbound folded laundry article and the two or more stacks toward the rigid back wall, and continue rotating the conveyor belt while retracting backward to deposit the at least one unbound folded laundry article into the refillable cartridge.

In examples, each one of the two parallel conveyors is a cantilevered conveyor configured to selectively extend between the at least one of the refillable cartridge and a corresponding one the two parallel queues. In examples, each one of the two parallel conveyors includes an inclined end abutting an oppositely inclined end of a movable conveyor of a queue platform on which the two parallel queues are disposed.

In examples, the device further includes a motorized lifter configured to engage with the refillable cartridge and raise and lower the refillable cartridge to at least one of one or more loading positions for receiving the at least two stacks of folded laundry articles, and an unloading position within the container. In examples, the device further includes two or more rails disposed on a top half of each one of the opposed rigid sidewalls. The two or more rails can engage bearings disposed on a stationary support structure of the motorized lifter. In examples, the device further includes at least one of a rack and pinion, timing belt drive, counterweight, and leadscrew configured to move the refillable cartridge upward and downward along the stationary support structure. In examples, the motorized lifter includes a structure configured to attach to an upper portion of the refillable cartridge and move upward and downward along one or more stationary rails. In examples, the device further includes at least one of a rack and pinion, timing belt drive, counterweight, and leadscrew configured to move the structure upward and downward along the one or more stationary rails. In examples, the motorized lifter includes an overhead scissor lift.

In examples, the at least one of the receiving surface and a top surface of an unbound folded laundry article received within the refillable cartridge is configured to be positioned below a bottom surface of the at least one conveyor in a range of between about 1 mm to 100 mm prior to loading. The refillable cartridge is configured to be lowered between one or more selectable loading heights to a preset unloading height within the container. In examples, the controller is further in operable communication with a drive of the motorized lifter and configured to raise and lower the refillable cartridge between the one or more selectable loading heights and the preset unloading height. In examples, the height of the at least one conveyor is fixed and the motorized lifter further includes one or more position sensors configured to sense at least one of a height of the motorized lifter and a distance traveled.

In examples, the one or more position sensors includes an encoder disposed on a drive motor of the motorized lifter, the encoder being configured to output a signal to the controller indicative of an absolute of position of the removable receiving surface on the motorized lifter.

In examples, the one or more position sensors includes a depth sensor configured to detect a change in height relative to a known height at fixed position.

In examples, the controller is further configured to receive an output signal from the one or more position sensors, receive a sensed signal of at least one sensor in wired or wireless communication with the controller, the sensed signal being indicative of a height of the at least one unbound article received within the refillable cartridge, determine, based on the height of the at least one unbound article received within the refillable cartridge relative to a height of the removable receiving surface, whether the height of the at least one unbound article is at or below a threshold height, and whether unoccupied height exists below the threshold height, and based on the determination of unoccupied height, at least one of instruct the drive motor of the motorized lifter to lower the refillable cartridge until the output signal from the one or more position sensors is indicative of a top surface of the at least one unbound article being below a bottom surface of at least one placer, and instruct the drive motor of the motorized lifter to lower the refillable cartridge until the output signal from the one or more position sensors is indicative of the refillable cartridge being positioned at the unloading height within the container.

In examples, the controller is further configured to instruct at least one drive for moving the removable receiving surface to retract the removable receiving surface in response to receiving a signal of the one or more position sensors indicative of the refillable cartridge being positioned at the unloading height.

In examples, the motorized lifter further includes one or more plungers configured to engage the received at least one unbound folded laundry article received within the refillable cartridge, apply a compression force, and retract from the at least one unbound folded laundry article. The one or more plungers can be configured to remain engaged with the received at least one unbound folded laundry article during a descent of the refillable cartridge into the container. A plunger compression force can include a range of between about 0.25 lbf to 5 lbf. In examples, the device further includes at least one load cell disposed on the one or more plungers, the at least one load cell being configured to sense a height of the at least one unbound folded laundry article received within the refillable cartridge and output a signal indicative of the height to the controller.

In examples, the at least one sensor configured to detect a height of the at least one unbound article received within the refillable cartridge is at least one of a 3-D camera, an IR sensor, a 2-D camera, LIDAR, LADAR, a sonar proximity sensor, an ultrasonic ranging sensor, a radar sensor, and a pair of stereo depth cameras.

In one example, a system for packing folded laundry articles includes a refillable cartridge configured to receive the folded laundry articles including at least one of at least one unbound folded laundry article and two or more unbound stacks of folded laundry articles. The refillable cartridge includes a removable receiving surface configured to span, in a closed position, between a bottom edge of each one of a pair of opposing rigid sidewalls and a rigid back wall spanning between the pair of opposing sidewalls, and at least one drive for moving the removable receiving surface from the closed position to an open position wherein the removable receiving surface is disposed on an exterior surface at least one of the pair of opposing rigid sidewalls. The system includes at least one retractable conveyor disposed between the refillable cartridge and a queue including the at least one of the unbound folded laundry article and the two or more unbound stacks of folded laundry articles. The at least one conveyor is configured to extend into the refillable cartridge, convey the at least one unbound folded laundry article to the refillable cartridge, and deposit the at least one of the unbound folded laundry article and the two or more unbound stacks of folded laundry articles within the refillable cartridge. The system includes a driven lifter configured to receive the refillable cartridge and selectively raise and lower the cartridge relative to the at least one retractable conveyor, one or more sensors disposed proximate the refillable cartridge, each of the one or more sensors configured output a signal indicative of a fill height of the refillable cartridge, and at least one controller in operable communication with the at least one drive, a drive of the at least one retractable conveyor, a drive of the driven lifter, and a communication network. The at least one controller is configured to receive via the communication network the output signal of the one or more sensors, determine, based on the output signal, whether the fill height reaches or exceeds a threshold fill height, instruct, in response to determining the fill height is lower than a threshold fill height, the drive of the at least one retractable conveyor to extend the at least one retractable conveyor out to the rigid back wall, rotate a conveyor belt to advance from the queue the at least one of the at least one unbound folded laundry article and the two or more unbound stacks of folded laundry articles toward the rigid back wall, and continue rotating the conveyor belt while moving the at least one retractable conveyor backward to deposit the at least one of the at least one unbound folded laundry article and the two or more unbound stacks folded laundry articles into the refillable cartridge, and instruct, in response to determining the fill height is at or above the threshold fill height, the drive of the driven lifter to lower the refillable cartridge into a walled container, the at least one drive to move the removable receiving surface from the closed position to the open position, and the drive of the driven lifter to raise the refillable cartridge from the walled container with the removable receiving surface in the open position.

Implementations of the system may include one or more of the following features.

In examples, the system further includes a container conveyor configured to position an empty walled container beneath the raised refillable cartridge.

In examples, a height each of the two or more unbound stacks of folded laundry articles is approximately even. In examples, a difference in heights of each of the two or more unbound stacks of folded laundry articles is not greater than a range of about 10 to 12 cm. In examples, the height of each of the two or more unbound stacks of folded laundry articles includes a range of between about 25 to 65 cm.

In examples, all the unbounded folded laundry articles of a single stack of the two or more unbound stacks of folded laundry articles includes at least one of a common type and area. In examples, the at least one of at least one unbound folded laundry article and two or more unbound stacks of folded laundry articles includes household laundry belonging to a common household. The household laundry can include two or more article types of at least one of different sizes and different shapes, and each of the two or more article types includes a longest dimension of between about 4 cm to 500 cm.

In examples, the one or more sensors configured output a signal indicative of a fill height of the refillable cartridge includes an optical sensor. The optical sensor includes at least one of a 3-D camera, an IR sensor, a 2-D camera, LIDAR, LADAR, a sonar proximity sensor, an ultrasonic ranging sensor, a radar sensor, and a pair of stereo depth cameras.

In examples, the refillable cartridge is configured to receive two or more stacks of unbound folded laundry articles at least one of side-by-side and atop one another. In examples, further includes a movable wall configured to be received by the refillable cartridge prior to receiving the two or more stacks of unbound folded laundry articles side-by-side. The movable wall is configured to be retractably inserted from a top of the refillable cartridge.

In examples, a height of each of the two or more stacks of unbound folded laundry articles is less than or equal to a height of the walled container. In examples, at least two stacks of the two or more stacks of folded laundry articles are configured to be received into the refillable cartridge atop one another and a combined height of the received at least two stacks is less than or equal to a height of the walled container. An area footprint of each of the two or more stacks unbound folded laundry articles is less than or equal to an area defined by the removable receiving surface in the closed position.

In examples, the unbound folded laundry articles include household laundry belonging to a common household. The household laundry includes two or more article types of at least one of different sizes and different shapes, and each one of the two or more article types includes a longest dimension of between about 4 cm to 500 cm.

In examples, the at least one of at least one unbound folded laundry article and two or more unbound stacks of folded laundry articles are disposed adjacent the refillable cartridge in at least one queue. In examples, the at least one queue includes two parallel queues, each one of the two parallel queues being aligned with one half of a volume of the refillable cartridge. In examples, the two or more unbound stacks of folded laundry articles of the two parallel queues include approximately even heights, and the approximately even heights each include a range of between about 25 to 65 cm.

In examples, the two or more unbound stacks of folded laundry articles are disposed in the two parallel queues are staggered along a length of the two parallel queues.

In examples, two or more stacks of unbound folded laundry articles of the two parallel queues are disposed in a descending order of size.

In examples, at least one of the at least one unbound folded laundry article and the two or more stacks of unbound folded laundry articles including a largest folded area is disposed closest to the refillable cartridge.

In examples, the two parallel queues are disposed on a queue conveyor in operable communication with the controller. In examples, a carrying surface of the retractable conveyor is level with a carrying surface of the queue conveyor. In examples, the system includes at least one sensor in communication with the communication network, the at least one sensor configured to detect a presence of one or more folded laundry articles adjacent the refillable cartridge in the two parallel queues. In examples, the at least one retractable conveyor includes two parallel retractable conveyors, each of the two parallel retractable conveyors being aligned with one of the two parallel queues. In examples, the two parallel retractable conveyors are configured to operate at least one of independently and simultaneously.

In examples, each one of the two parallel retractable conveyors is a pull nose conveyor configured to extend a leading edge out to the rigid back wall, rotate a conveyor belt to advance the at least one of the at least one unbound folded laundry article and the two or more stacks toward the rigid back wall, and continue rotating the conveyor belt while retracting the leading edge backward to deposit the at least one unbound folded laundry article into the refillable cartridge.

In examples, each one of the two parallel retractable conveyors is a cantilevered conveyor configured to selectively extend between the at least one of the refillable cartridge and a corresponding one the two parallel queues.

In examples, each one of the two parallel conveyors includes an inclined end abutting an oppositely inclined end of the queue conveyor.

In examples, the driven lifter includes two or more rails disposed on a top half of each one of the opposed rigid sidewalls, the two or more rails configured to engage bearings disposed on a stationary support structure of the driven lifter. In examples, the system further includes at least one of a rack and pinion, timing belt drive, counterweight, and leadscrew configured to move the refillable cartridge upward and downward along the stationary structure.

In examples, the driven lifter includes a carrier configured to attach to an upper portion of the refillable cartridge and move upward and downward along one or more stationary rails. In examples, the system further includes at least one of a rack and pinion, timing belt drive, counterweight, and leadscrew configured to move the carrier upward and downward along the one or more stationary rails.

In one example, a method of automatically packing a plurality of folded household laundry articles into a container includes receiving, at a controller, a sensor signal indicative of at least one of an area footprint and an alignment of at least one queued folded laundry article or stack of folded laundry articles disposed on a queue conveyor adjacent a pair of parallel loading conveyors. The method includes identifying based on the at least one of the area footprint and alignment whether one or both loading conveyors of the pair of parallel loading conveyors are aligned with the at least one queued folded article or stack of folded laundry articles. The method includes instructing a drive of each of the queue conveyor and the aligned one or both loading conveyors to rotate so that the folded laundry article or stack of folded articles advances onto the aligned one or both loading conveyors from the queue conveyor, receiving, at the controller, a sensor signal indicative of the folded laundry article or stack of folded articles being disposed entirely on the aligned one or both loading conveyors, instructing a drive of the aligned one or both loading conveyors to extend a leading edge of the one or both loading conveyors proximate to a rigid back wall of a refillable cartridge, and instructing a drive of the aligned one or both loading conveyors to retract to a fully retracted position while continuing to rotate the one or both loading conveyors.

Implementations of the method may include one or more of the following features.

In examples, the sensor signal is output from a sensor disposed proximate the refillable cartridge, the sensor being in at least one of wired and wireless communication with the controller.

In examples, the method further includes, prior to instructing the drive of the aligned one or both loading conveyors to retract, receiving a sensor signal indicative of a forward edge of the laundry article or stack of laundry articles being proximate the leading edge of the aligned one or both loading conveyors.

In examples, the method further includes determining, based on the sensor signal, a detected side-by-side configuration of two stacks of folded laundry articles inside the refillable cartridge. In examples, the method further includes instructing a drive of a support structure to lower a removable dividing wall into the refillable cartridge between the two detected side-by-side stacks of folded laundry articles. In examples, the method further includes determining, based on the sensor signal, the stack of folded laundry articles being disposed entirely within one bilateral half of the refillable cartridge. In examples, the method further includes instructing a drive of a support structure to lower a removable dividing wall into the refillable cartridge between bilateral halves of the refillable cartridge.

In examples, the plurality of folded laundry articles are sorted into at least one of article type and area footprint on the queue conveyor and the at least one of article type, and the area footprint is duplicated in each one of two parallel queues disposed on the queue conveyor such the each one of the plurality of folded household laundry articles can be placed in either of the two parallel queues. In examples, the controller is further configured to sort the folded laundry articles during loading onto the queue conveyor based on a cumulative height of each of the two parallel queues from a refillable cartridge end to an opposite end of the queue.

In examples, the method further includes determining, based on the sensor signal, one or more fill heights of the at least one folded laundry article or stacks of folded laundry articles within the refillable cartridge. In examples, the method further includes determining, based on the one or more fill heights, whether sufficient space remains in the refillable cartridge for receiving a next queued at least one queued folded laundry article or stack of folded laundry articles. In examples, the next queued at least one folded laundry article or stack of folded laundry articles has a measured height communicated at least one of wired and wirelessly from a queue conveyor sensor to the controller. In examples, the method further includes instructing a drive of a movable support of the refillable cartridge to lower the refillable cartridge until a lowest fill height is within a threshold clearance of a bottom of the aligned one or both loading conveyors. The threshold clearance can be in a range of between about 1 mm to 100 mm.

In examples, the method further includes upon determining no space remains in the refillable cartridge for receiving the next queued at least one folded laundry article or stack of folded laundry articles, instructing a drive of a movable support of the refillable cartridge to empty the refillable cartridge into the container disposed therebeneath and raise the empty refillable cartridge to a height parallel to the queue conveyor. In examples, emptying the refillable cartridge includes instructing a drive of the container conveyor disposed beneath the refillable cartridge to advance an empty container to a resting position below the refillable cartridge, and instructing, after lowering the refillable cartridge into the empty container and prior to raising the empty refillable cartridge to a height parallel to the queue conveyor, a drive of the refillable cartridge to retract a removable floor positioned substantially parallel to and above the floor of the container so that the at least one of a folded laundry article and a stack of folded laundry articles are released into the container;

In examples, the controller is configured to instruct the drive of the movable support to raise the empty refillable cartridge upon receiving a signal from the drive indicative of the removable floor being retracted.

In examples, the method further includes instructing a drive of a support structure to raise from the container a removable dividing wall movably inserted into the refillable cartridge between the two stacks of folded laundry articles disposed in bilateral halves of the refillable cartridge.

In examples, the method further includes instructing the drive of the refillable cartridge to extend the removable floor across a bottom of the refillable cartridge to receive a next queued one or more folded articles or stacks of folded articles upon receiving a signal from a height sensor indicative of the refillable cartridge being raised entirely above the container. The height sensor can include at least one of a hall sensor and a motor encoder of the movable support. The height sensor is configured to detect the removable floor of the refillable cartridge being at the height parallel to the queue conveyor.

In examples, the method further includes receiving at the controller a unique customer identifier to the empty container, the unique customer identifier being associated with the at least one of a folded laundry article and one or more stacks of folded laundry articles released into the container.

In examples, the method further includes receiving a signal indicative of the heights and area footprint of one or more at least one folded laundry article and folded stacks of laundry articles remaining on the queue conveyor and selecting an empty container including dimensions larger than the combined volume of the folded laundry articles remaining on the queue conveyor. In examples, the method further includes instructing the drive of the container conveyor disposed beneath the refillable cartridge to advance the empty container including the selected dimensions to a resting position below the refillable cartridge.

In examples, the at least one folded laundry article or stack of folded laundry articles are unbound.

In examples, the at least one folded laundry article or stack of folded laundry articles include household laundry belonging to a common household. The household laundry can include two or more article types of at least one of different sizes and different shapes, and each one of the two or more article types includes a longest dimension of between about 4 cm to 500 cm.

BRIEF DESCRIPTION OF THE DRAWINGS

FIG. 17A is a schematic example of the example refillable cartridge of FIG. 9A being lowered into a packing container.

FIG. 17B an example schematic of the example refillable cartridge of FIG. 9A being disposed in a packing container prior to withdrawing the movable receiving surface and releasing the folded laundry articles into the container.

FIG. 18A depicts a side view of an example roller and belt of a loader conveyor in a retracted position.

FIG. 18B depicts a side view of an example loader conveyor of FIG. 18A in an extended position.

FIG. 20A depicts a side view of the two parallel queue conveyors of FIG. 19 with the conveyor support structure removed for clarity.

FIG. 20B depicts a cross sectional view of the retracted conveyor of FIG. 20A with the conveyor structure depicted.

FIG. 26A is a side view of the two parallel queue conveyors of FIG. 25.

FIG. 26B depicts a cross sectional view of FIG. 26A.

FIG. 30A depicts a perspective view of refillable cartridge disposed on a movable support for loading folded laundry into a container thereunder.

FIG. 30B is a front view of FIG. 30A.

FIGS. 40A and 40B depict schematic views of the refillable cartridge of FIG. 39B lowered into a packing container and raised from the packing container following depositing the contents of the refillable cartridge therein.

FIGS. 46A-D depict sequential schematics of an example placer fork loading a stack of folded laundry articles into a refillable cartridge.

DETAILED DESCRIPTION

This disclosure relates to autonomous robotic devices, systems, and methods for packing folded residential laundry articles into a container. The system includes one or more autonomous process lines comprising a plurality of robotic devices configured to work in concert to process a dirty load of household laundry from a mass of dirty, non-uniform articles to individually separated, cleaned, and folded laundry articles. The plurality of robotic devices operate without human intervention to efficiently and effectively launder a customer's dirty items. This disclosure relates to autonomous robotic devices configured to autonomously pack clean, folded deformable laundry articles for return to a residential household. The autonomous robotic devices are configured to fold a plurality of loads of laundry each comprising a plurality of deformable article types. The laundry articles are collected from a household and delivered to the autonomous process line for cleaning and autonomous packing for return to the household. The autonomous processes are time and cost efficient, eliminate human intervention-based delays, eliminate line workers and associated introduction of human contaminants potentially introduced by line workers, and eliminate any concerns with having private personal items handled by strangers. The laundry articles are folded to preset sizes for efficient packing and unloading into a drawer or onto a shelf by the household customer.

Figure 1:
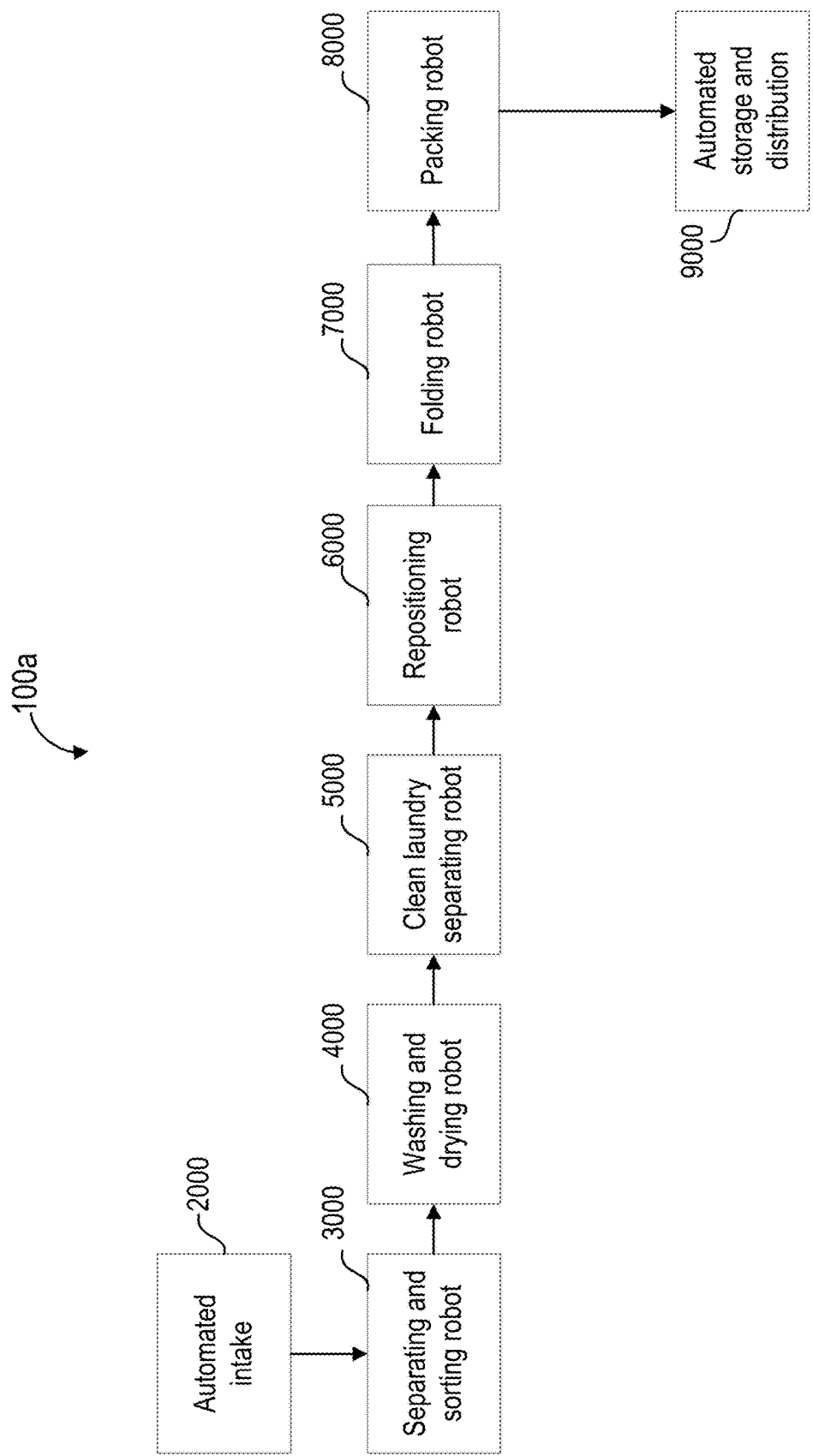
FIG. 1 depicts a schematic of an example autonomous robotic laundry process line.

As shown in FIG. 1, in implementations of the system, a process line 100 comprises a plurality of autonomous robots configured to operate in series without human intervention to process and transport dirty laundry through the cleaning process, folding and repackaging the clean laundry for return to a household. In one implementation, the process line 100 comprises an autonomous intake robot 2000 for receiving a load of dirty household laundry comprising a plurality deformable laundry articles. The deformable laundry articles can be non-uniform in type, size, shape, color, and fabric. For example, the plurality of deformable laundry articles can include items commonly laundered in homes, such as sheets, towels, tablecloths, and adult and children's garments, for example, tee shirts, baby onesies, pants, socks, undergarments, dresses, dress shirts, and blouses. The autonomous intake robot 2000 is configured to introduce the plurality of deformable laundry articles to a separating and sorting robot 3000 configured to separate out each one of the deformable laundry articles of the plurality of deformable laundry articles pertaining to a single customer or household. In implementations, the separating and sorting robot 3000 is configured to autonomously sort each one of the separated deformable laundry articles into one or more related batches for washing. In implementations, the separating and sorting robot 3000 is configured to intelligently batch the separated each one of the deformable laundry articles according to a programmed sorting algorithm based, for example, on criteria including at least one of material color, material type, customer washing preference, water temperature requirements, and load size. In implementations, the separating and sorting robot 3000 is configured to identify and record the number and types of garments in the load of laundry and provide this information to one or more downstream robots in the process line 100.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for introduction into a repositioning robot 6000. The repositioning robot 6000 receives a single deformable laundry article and manipulates and repositions it for automated introduction into a folding robot 7000, which automatically folds the laundry article for introduction to a packing robot 8000. In implementations, the packing robot 8000 is a system comprising one or more autonomous devices working in concert and in series to automatically pack the clean load of laundry comprising the plurality of clean and folded deformable laundry articles in a shipping container for automated redistribution to the residential household customer. In implementations, the shipping container is a reusable container. In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529.

Implementations of the process line 100 of household laundry cleaning robots can comprise one or more of each of the robots depicted in FIG. 1. Additionally, two or more of the robots can be combined in a single module in alternate implementations. In implementations, one or more of the robots in the process line 100 are configured to communicate over wired connections or wireless communication protocols. For example, in implementations, one or more robots in the process line 100 can communicate with another one or more robots in the process line 100 over a wired BUS, LAN, WLAN, 4G, 5G, LTE, Ethernet, BLUETOOTH, or other IEEE 801.11 standard.

Figure 2:
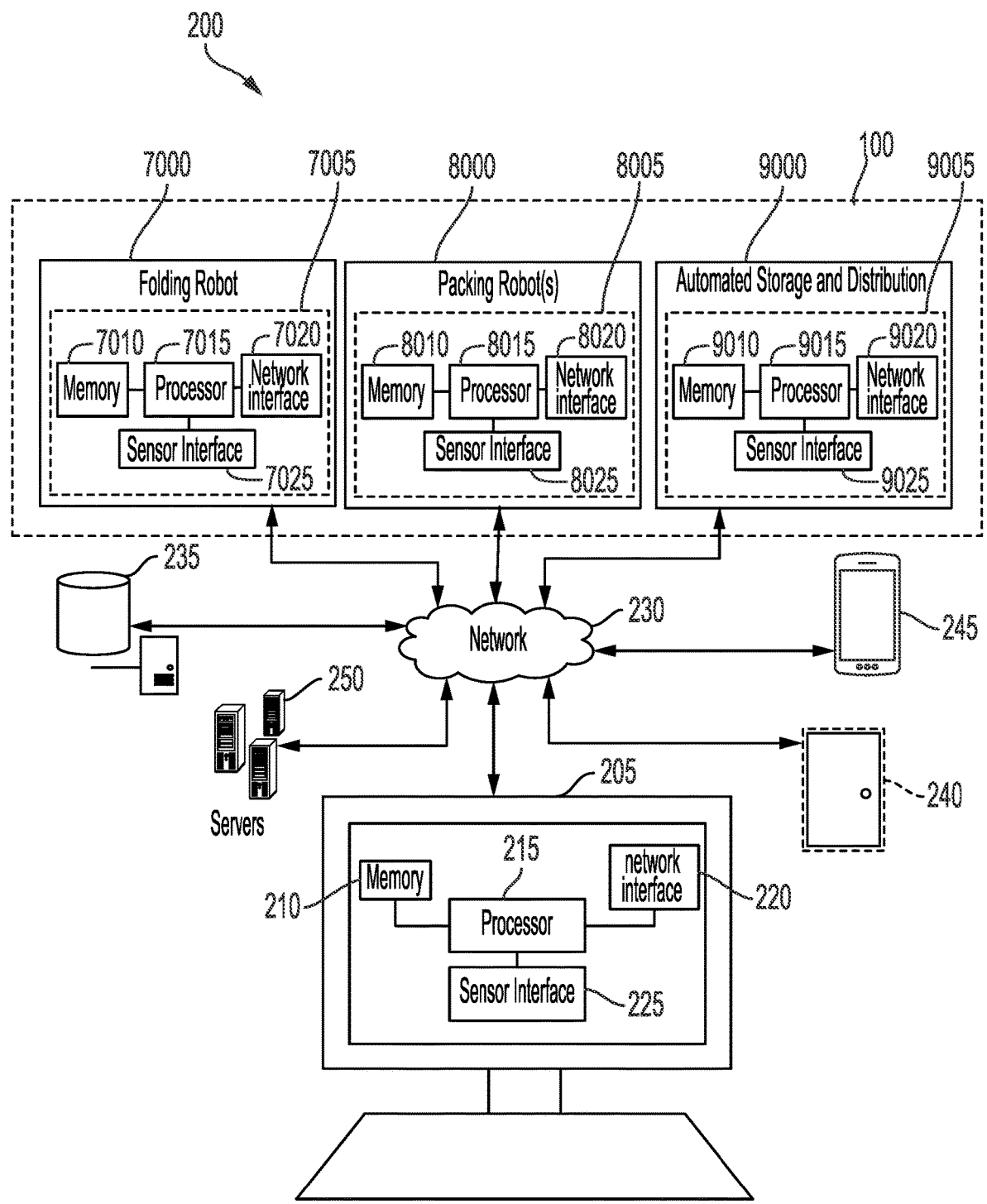
FIG. 2 depicts a schematic example of a system for controlling an autonomous robotic process line.

Referring to FIG. 2, an example of a system 200 of operatively connected autonomous robots is shown. FIG. 2 depicts a schematic implementation of a portion of an autonomous robotic process line 100 that processes the clean deformable laundry articles. An autonomous packing robot 8000 is in operative communication with an autonomous folding robot 7000 configured to output folded laundry articles from a load of household laundry to the packing robot 8000, and, in implementations, the packing robot 8000 is in communication with an autonomous storage and distribution system 9000 configured to receive and queue a packed one or more boxes for return to the residential household customer. In implementations, each robot 7000, 8000, 9000 includes a controller 7005, 8005, 9005 configured to operate the associated robot.

For example, in implementations, the packing robot 8000 includes one or more controllers 8005. Each of the one or more controllers 8005 includes a processor 8015 in communication with a memory 8010, a network interface 8020, and a sensor interface 8025. The processor 8015 can be a single microprocessor, multiple microprocessors, a many-core processor, a microcontroller, and/or any other general purpose computing system that can be configured by software and/or firmware. In implementations, the memory 8010 contains any of a variety of software applications, algorithms, data structures, files and/or databases as appropriate to the requirements of repositioning non-uniform deformable laundry articles. In one implementation, the controller 8005 includes dedicated hardware, such as single-board computers, one or more GPUs, application specific integrated circuits (ASICs), and field programmable gate arrays (FPGAs).

A network interface 8020 is configured to couple the controller 8005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 8020 is coupled to the network 230 via a networking device, such as a bridge, router, or hub. In other implementations, the network 230 may involve only two endpoints that each have a network connection directly with the other. In implementations, the network interface 8020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 8005 can transmit data via the network interface 8020 using a variety of security measures including, for example, TLS, SSL or VPN. In implementations, the network interface 8020 includes both a physical interface configured for wireless communication and a physical interface configured for wired communication. According to various embodiments, the network interface 8020 enables communication between the controller 8005 of the packing robot and at least one of the plurality of robots 2000, 3000, 4000, 5000, 6000, 7000, 9000 of the process line 100.

Additionally or alternatively, the network interface 8020 is configured to facilitate the communication of information between the processor 8015 and one or more other devices or entities over the network 230. For example, in implementations, the network interface 8020 is configured to communicate with a remote computing device such as a computing terminal 205, database 235, server 240, smartphone 245, and server farm 250. In implementations, the network interface 8020 can include communications circuitry for at least one of receiving data from a database 235 and transmitting data to a remote server 240, 250. In some implementations, the network interface 7020 can communicate with a remote server over any of the wired protocols previously described, including a WI-FI communications link based on the IEEE 802.11 standard.

In some examples in accordance with FIG. 2, the network 230 may include one or more communication networks through which the various robots and computing devices illustrated in FIG. 2 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although an embodiment of a controller 8005 of the packing robot 8000 is described herein in particular, one or more of the plurality of robots 2000, 3000, 4000, 5000, 6000, 7000, 9000 of the process line 100 includes similar components having similar functionality.

Figure 3:
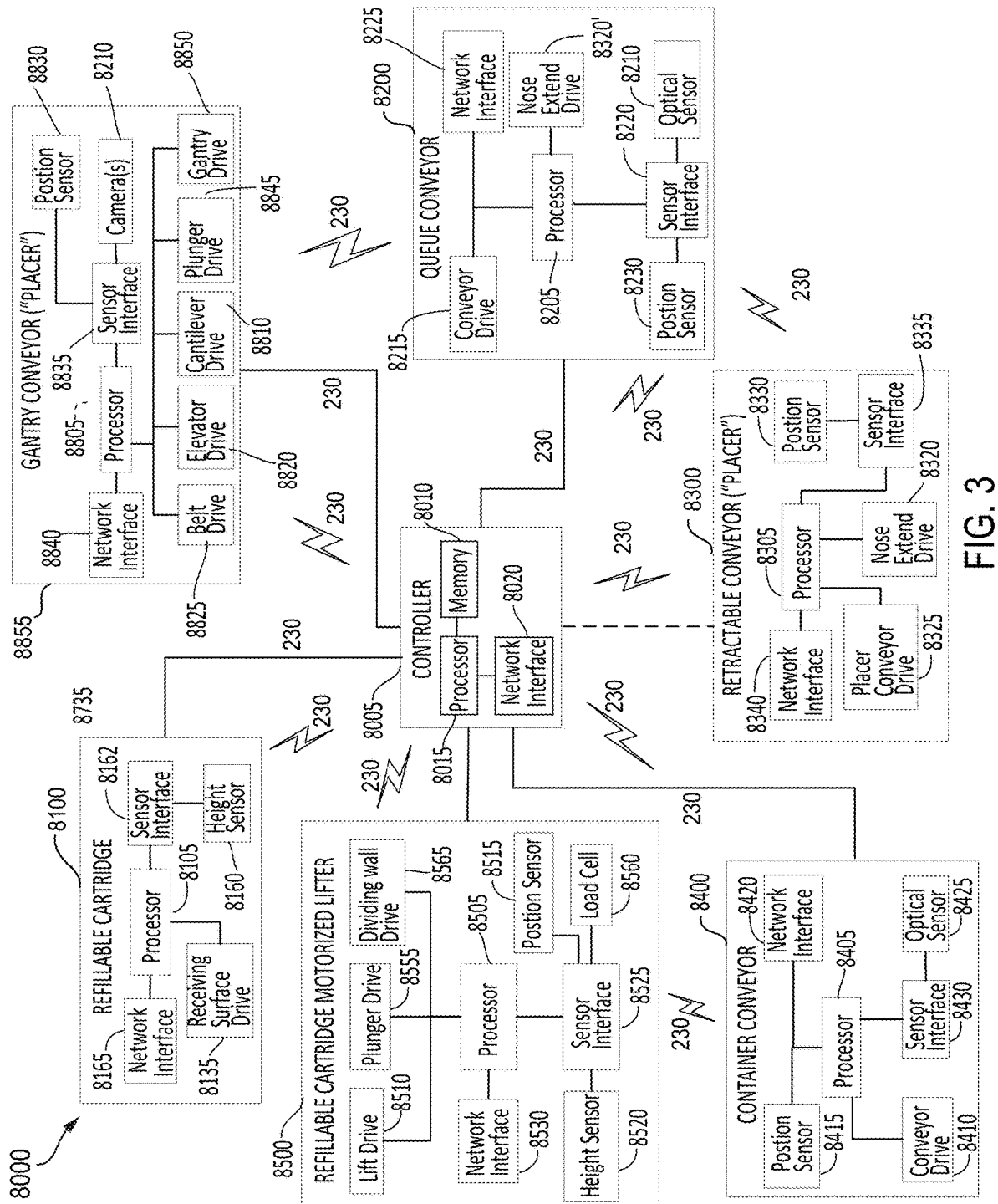
FIG. 3 depicts a schematic example of a system for packing unbound folded household laundry articles into a shipping container.
Figure 4:
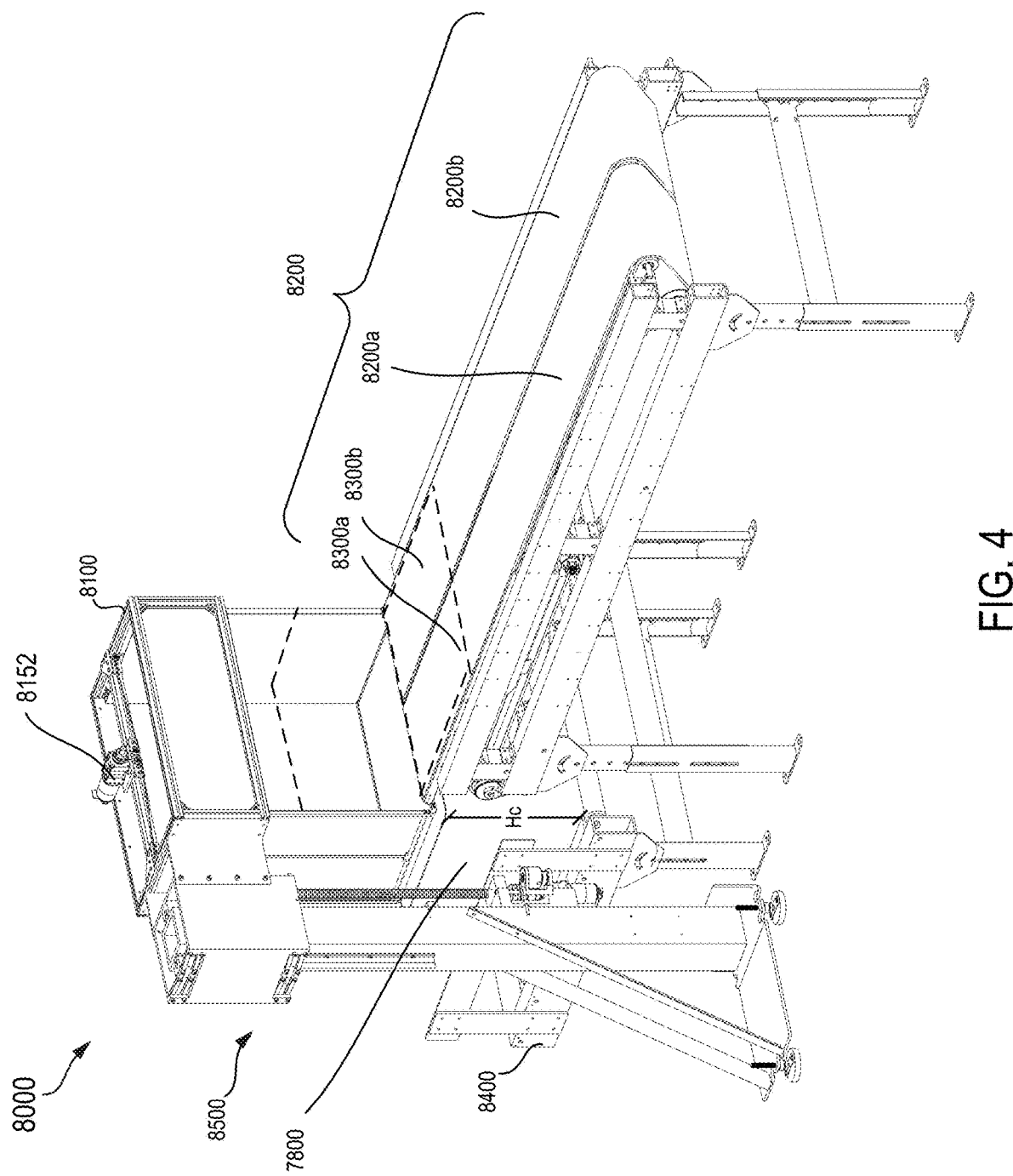
FIG. 4 depicts a perspective view of a portion of the example system of FIG. 3.

In implementations, the packing robot 8000 (also alternatively referred hereinafter as the "packing system 8000") can be a packing system comprising one or more autonomous devices working in concert to pack one or more folded laundry articles into a box or container for return shipping to a residential household from which the items were retrieved for laundering. Turning to FIG. 3, a schematic of an implementation of a packing system 8000 is shown. The packing system 8000 includes one or more of the features described with regard to the embodiments of FIGS. 1 and 2. In implementations, the packing system 300 comprises a plurality of interactive autonomous robotic devices. In implementations the packing system 8000 comprises at least one of a refillable cartridge 8100, a queue conveyor 8200 having one or more folded laundry articles and stacks of folded laundry articles disposed thereon, at least one extendable and retractable loading end 8300 or independent placer conveyor disposed between the refillable cartridge 8100 and the queue conveyor 8200 for loading the folded laundry articles into the refillable cartridge 8100, a container conveyor 8400 configured to align empty container with the refillable cartridge 8100 for filling, a driven lifter 8500 for selectively raising and lowering the refillable cartridge 8100 into and out of the container, and a controller 8005 in operative configuration with processors and drives of all of the foregoing and one or more sensors detecting a fill height of the refillable cartridge 8100. In implementations, an empty container comprises a container pre-loaded with unfolded small articles at the bottom of the container that have bypassed a folding robot, articles such as baby socks and underwear. Each autonomous device will subsequently be described with regard to implementations.

Taking FIGS. 4-8 together, in implementations a refillable cartridge 8100 is configured to receive automatically at least one unbound folded laundry article 7300*a-n* or one or more stacks 7301*a-n* of folded laundry articles for transfer into a container 7800. In implementations, a stack 7301*a-n* can comprise one or more laundry articles 7300*a-n* stacked vertically atop one another as will be described subsequently with regard to implementations. In implementations, the refillable cartridge 8100 comprises a pair of opposing sidewalls 8110*a-b* and a back wall 8115 spanning between the pair of opposing sidewalls 8110*a-b*. In implementations, the pair of opposing sidewalls 8110*a-b* and the back wall 8115 are rigid so that the folded laundry received by the refillable cartridge 8100 is provided with support to keep from toppling and/or unfolding during loading into the refillable cartridge 8100 and from the refillable cartridge 8100 into the container 7800. The pair of opposing sidewalls 8110*a-b* and back wall 8115 can be manufactured of any lightweight, resilient rigid material such as one or more of metal, wood, and plastic. The refillable cartridge 8100 comprises an opening 8120 opposite the back wall 8115. The opening 8120 is configured to receive the at least one unbound folded laundry article 7300*a-n* therethrough. The at least one unbound folded laundry article 7300*a-n* is a folded laundry article that is not wrapped, sealed, restrained, or fastened in any way. The at least one unbound folded laundry article is folded by a folding robot 7000 and delivered to the queue conveyor for packing without being held in a folded state by any shrink wrapping or plastic ties or other restraint wrapped around or otherwise constraining the folded laundry article 7300 or stack 7301 of folded laundry articles 7300*a-n*. Eliminating such ties and wraps reduces waste and environmental damage caused by such waste and facilitates quickly unloading the folded container contents into a dresser drawer or closet upon return to a customer.

In addition to the two opposing sidewalls 8110*a-b* and the back wall 8115, in implementations, the refillable cartridge 8100 further comprises a removable receiving surface 8130 configured to span, in a closed position, between a bottom edge of each one of the pair of opposing sidewalls 8110*a-b* and the back wall 8115. The removable receiving surface 8130 is configured to receive thereon the at least one folded laundry article 7300*a-n* or at least one stack 7301*a-n* in a closed position in which the receiving surface 8130 extends across the bottom opening of the refillable cartridge 8100 to create a selectively sealed floor. The removable receiving surface 8130 moves from the closed position to an open position in which the bottom opening of the refillable cartridge 8100 is exposed so that the received at least one folded laundry article 7300*a-n* or stack at least one stack 7301*a-n* falls through the opening into a receiving container 7800 disposed therebeneath. Returning to FIG. 3, the refillable cartridge 8100 further comprises at least one drive 8135 in communication with the controller 7005 for instructing a drive motor 8151 moving the removable receiving surface 8130 from the closed position to an open position.

Figure 5:
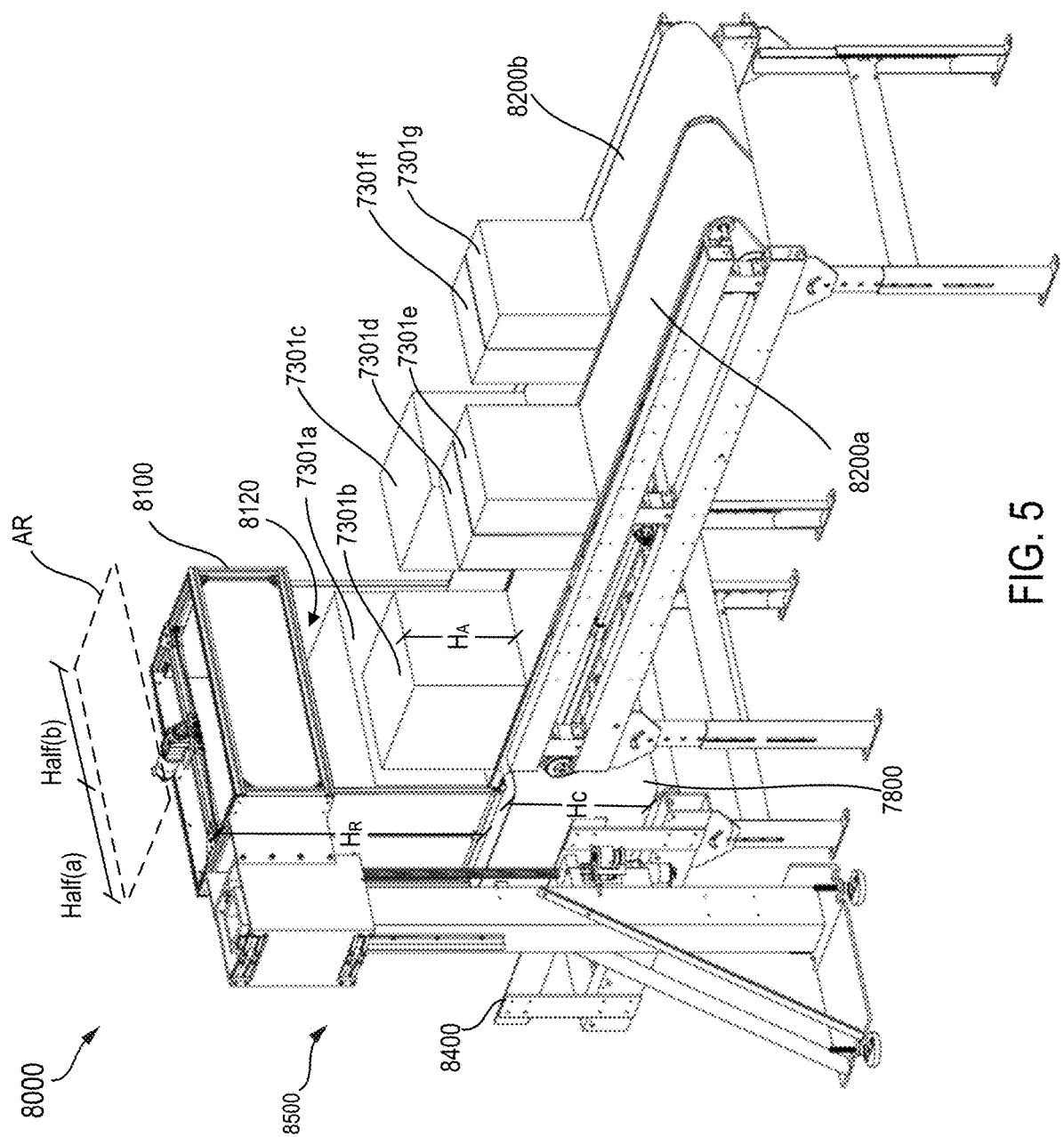
FIG. 5 depicts a perspective view of a portion of the example system of FIG. 3 loaded with unbound folded laundry articles queued for packing.
Figure 6:
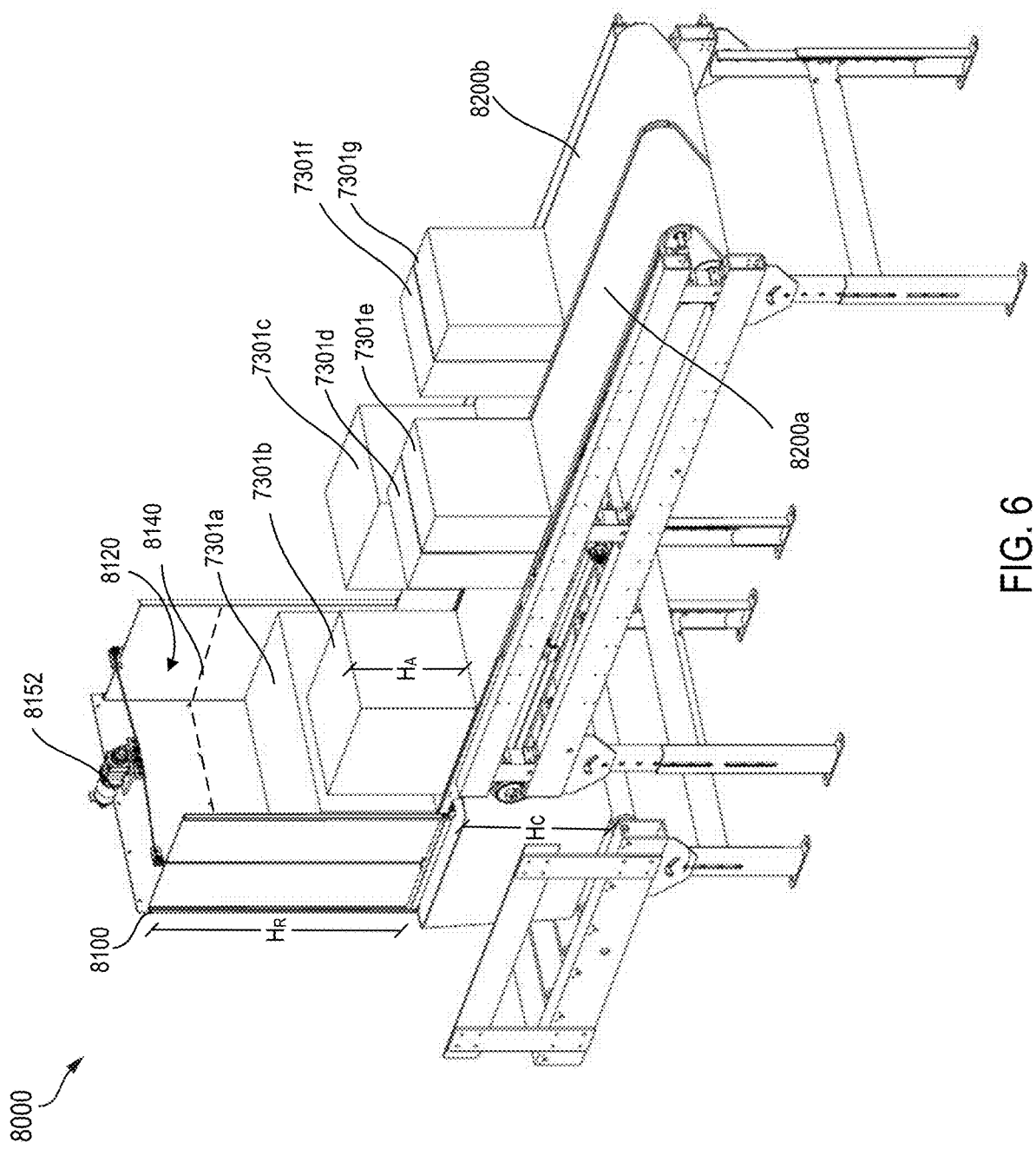
FIG. 6 depicts the system of FIG. 5 with a partial cutaway of a refillable cartridge with folded articles (s) loaded therein.

In implementations, a controller 7005 is in operable communication with the at least one drive 8135 via a wired or wireless communication network (e.g., network 230). In implementations, the controller comprises at least one of a centralized controller 8005 configured to communicate with one or more devices of the system 8000 and a processor 8105, 8205, 8305, 8405, 8505 of one or more of the devices 8100-8500 of the system 8000. In implementations, as shown in FIGS. 5-6, the at least one folded laundry article 7300*a-n* awaiting loading into the container 7800 comprises a plurality of folded laundry articles queued on the queue conveyor 8200 in an intelligent (e.g., pre-determined) order by stack height such that as the stacks 7301*a-n* of folded articles are loaded into the cartridge 8100 the sum total of all of the articles does not exceed a threshold height 8140 of the cartridge. Additionally or alternatively, in implementations, one containers-worth of stacks 7301*a-n* are queued at a single time and the one or more articles are stacked intelligently according to at least one of article type, size, and folded article orientation. A full container's worth of folded articles can be pre-queued on the queue conveyor 8200 and then queued in stacks before being loaded into the refillable cartridge. FIG. 6 depicts an implementation of the refillable cartridge 8100 with a portion of the walls removed to reveal a stack 7301*a* disposed within the refillable cartridge 8100 and not exceeding a threshold height 8140 indicated by dashed lines.

Additionally or alternatively, in implementations, the controller 8005 and/or processor 8105 of the refillable cartridge 8100 is configured to receive via the communication network 230 one or more sensor signals indicative of at least one of the refillable cartridge 8100 being filled to a height at or below a threshold height 8140 by the at least one unbound folded laundry article 7300*a-n* and no additional unbound folded laundry article 7300*a-n* being queued for insertion into the refillable cartridge 8100. Additionally or alternatively, in implementations, one containers-worth of stacks 7301*a-n* are queued at a single time and then loaded into the refillable cartridge.

Figure 31B:
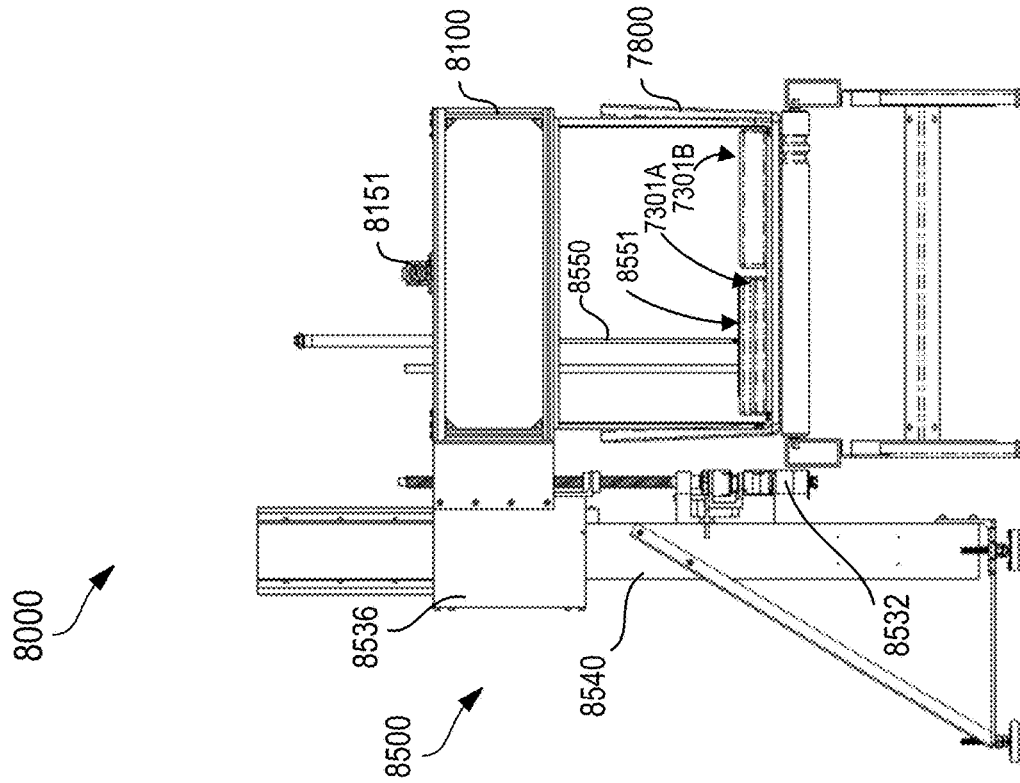
FIG. 31B depicts the front view of 31A with a plunger lowered to press on a leading stack of folded laundry articles.

Additionally or alternatively, as will be described subsequently with regard to implementations, the autonomous packing system 8000 comprises one or more plungers (e.g., FIGS. 31A-B) disposed above and selectively extending through the cartridge 8100 for compressing one or more folded laundry articles 7300*a-n* or stacks 7301*a-n* therein to reduce the total stack height at least down to the height of the container 7800 so that the stacks 7301 delivered into the container do not overflow a top edge of the container. As will be discussed subsequently with regard to implementations, the threshold height 8140 of the refillable cartridge is equal to or less than the height Hc of the container 7800 such that by not exceeding the threshold height Ht with received one or more unbound folded laundry articles 7300 or stacks 7301, the one or more unbound folded laundry articles 7300 delivered by the refillable cartridge to the container 7800 will not overflow the container 7800. In implementations comprising a plunger, the loaded laundry articles 7300 could overfill the container by a small buffer height a buffer height (e.g., 5 cm, 10 cm, 15 cm, 20 cm, 25 cm) compressed by plunging such that the container can be securely covered or closed.

Once the cartridge 8100 is loaded, the controller 8005 and/or processor 8105 is configured to instruct the drive 8135 to move the removable receiving surface 8130 from the closed position to the open position such that the removable receiving surface 8130 is no longer disposed beneath the at least one unbound folded laundry article 7300*a-n* received into the refillable cartridge 8100. As will be described subsequently with regard to implementations, the loaded cartridge 8100 is disposed above or lowered down into the container 7800 before the removable receiving surface 8130 is moved to an open position.

Figure 9:
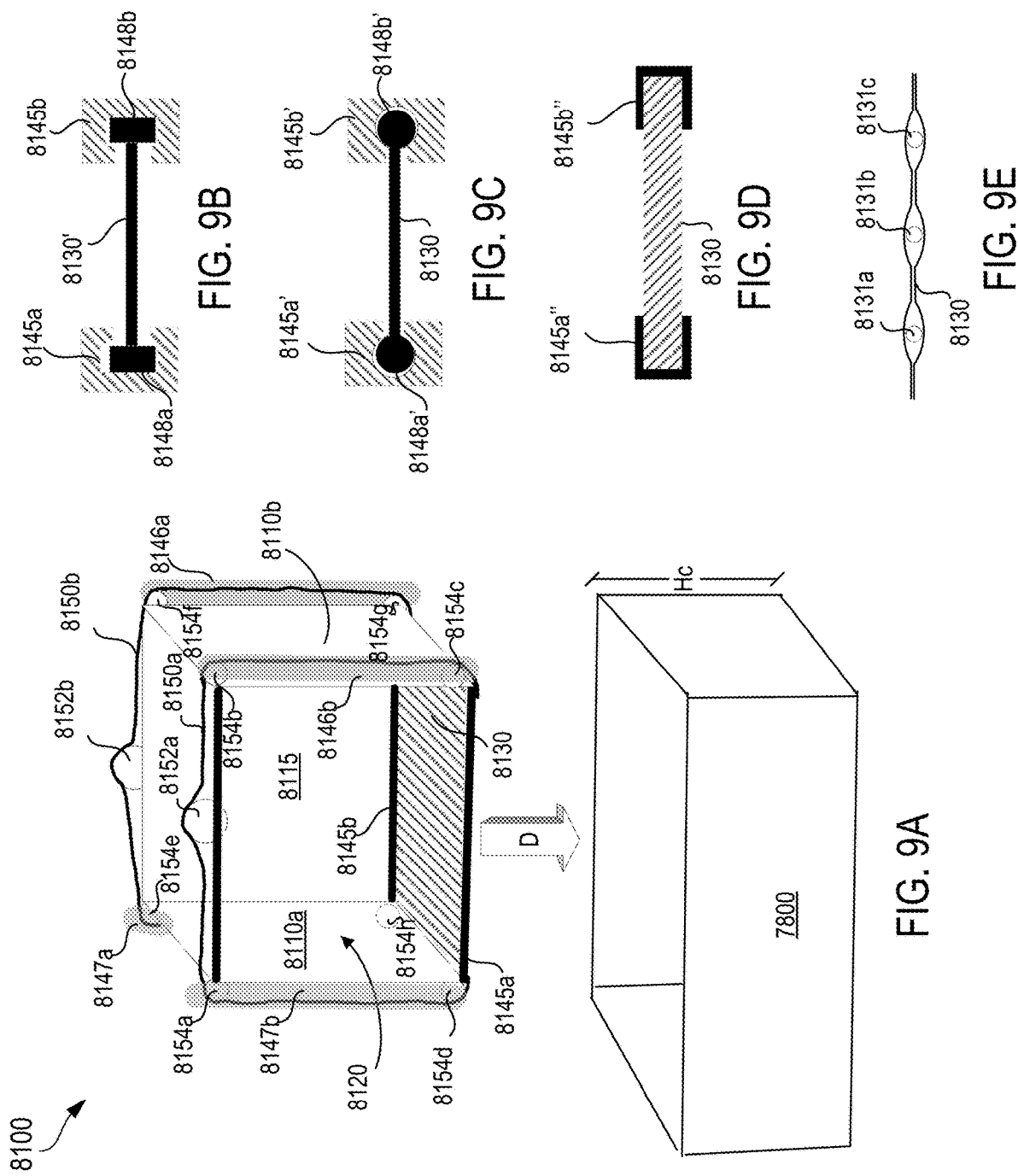
FIG. 9A depicts a front perspective view of an example refillable cartridge positioned above a packing container.
FIGS. 9B-E depict example schematics of a portion of a rail system for a movable receiving surface of the refillable cartridge of FIG. 9A.

In implementations, as shown in FIGS. 9A-D, the refillable cartridge 8100 comprises a pair of horizontal guide rails 8145*a-b*, *a'-b'* spanning between the side walls 8110*a-b* and retaining the edges of the removable surface therein for guided movement during opening and for secure retention in the closed position. In implementations the pair of horizontal guide rails 8145*a-b*, *a'-b'* each comprise a track in which lateral sides of the removable receiving surface 8130 are slidably engaged. For example, in the side cross section view of FIG. 9D, the pair of horizontal guide rails each comprise 8145*a"-b"* a U-channel (e.g., extruded aluminum, welded sheet metal, etc.) and the receiving surface 8130 comprises a rigid plastic linked conveyor belting (e.g., INTRALOX S550/S560) that is retained securely between the two walls by the U-channels. FIGS. 9B and 9C depict alternate retention channels such as "C" shaped channels 8145*a-b*, *a'-b'* configured to retain affixed or preformed side extensions or attached track rollers 8148*a-b*, 8148*a'-b'*, of the receiving surface 8130. The pair of horizontal guide rails 8145*a-b*, *a'-b'*, *a"-b"* are configured to guide the removable receiving surface 8130 into the closed position as shown in FIGS. 7 and 9A.

Figure 7:
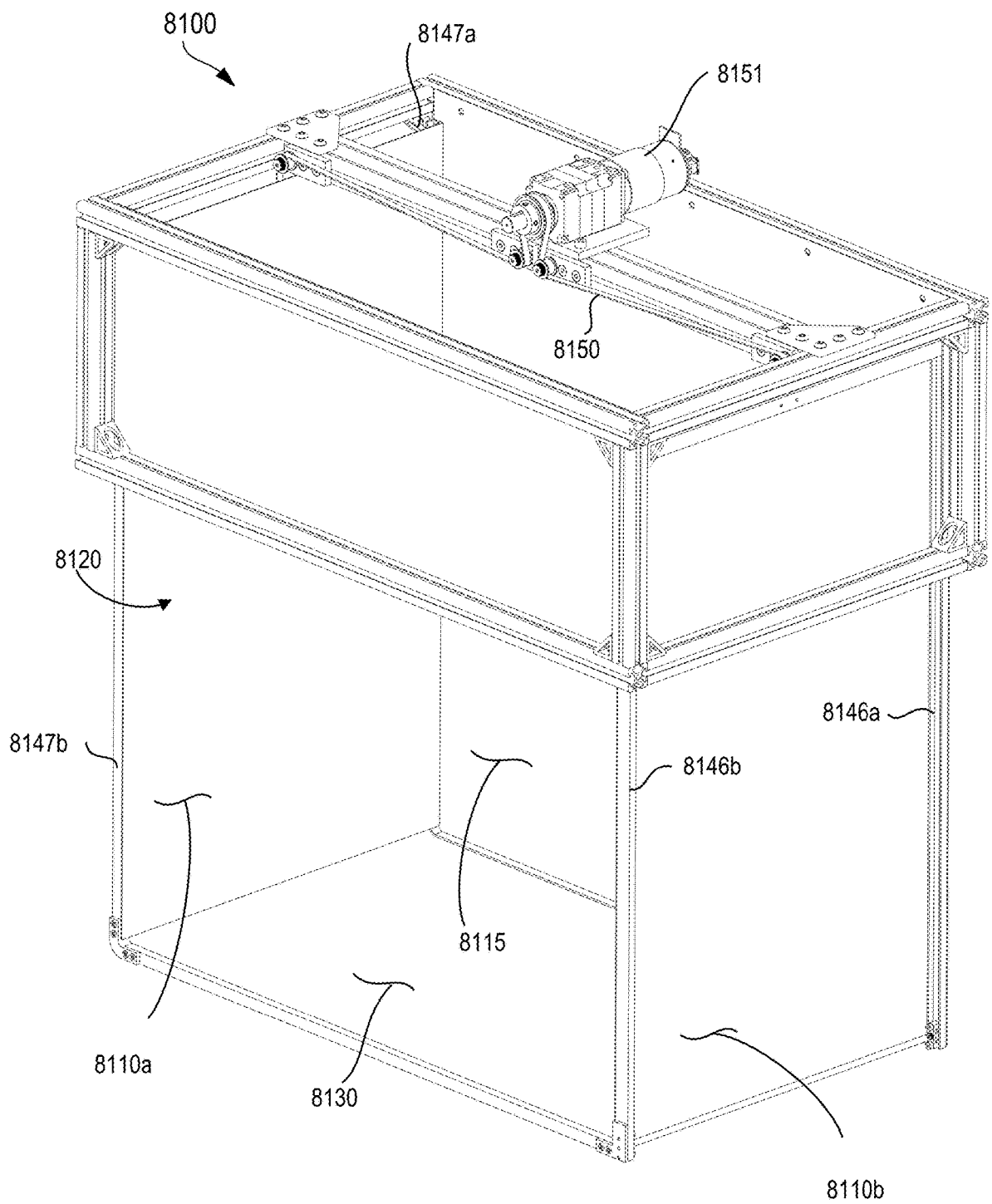
FIG. 7 depicts a perspective view of an implementation of the refillable cartridge of FIGS. 5 and 6.

Additionally or alternatively, as shown in FIGS. 7 and 9A, in implementations, the refillable cartridge 8100 comprises one or more channels 8146*a-b*, 8147*a-b* disposed on at least one of the pair of opposing sidewalls 8110*a-b*. One pair 8147*a-b* of the one or more channels 8146*a-b*, 8147*a-b* is configured to receive the removable receiving surface 8130 in the open position while the other pair 8146*a-b* receives a force transfer rod 8132 and the cables 8133*a-b* (FIGS. 10 and 12) that connect a timing drive belt (cord 8150) to the cables 8133*a-b* to pull the receiving surface 8130 back to a closed position. The one or more tracks or channels 8146*a-b*, 8147*a-b* can comprise a pair of vertical rails disposed on the outer edges of each of the opposing sidewalls 8110*a-b*. In implementations, the one or more channels can comprise vertical rails similar to the horizontal guide rails 8145*a-b*, *a'-b'*, *a"-b"* such that the removable receiving surface 8130 is configured to retract upward and into the one or more vertical channels 8146*a-b*, 8147*a-b* in the open position. Additionally or alternatively, the one or more channels are formed by one or more double-walled sidewall having a gap (e.g., channel) between the layers of the sidewall.

In implementations, the refillable cartridge 8100 comprises one or more cords 8150*a-b* (e.g., timing drive belt) fixedly attached to the removable receiving surface 8130 at both ends so as to form a continuous loop with the receiving surface. In implementations of the refillable cartridge comprising at least one of the horizontal guide rails 8145*a-b*, *a'-b* and vertical one or more channels 8146*a-b*, 8147*a-b*, the one or more cords 8150*a-b* are configured to route within the one or more channels 8146*a-b*, 8147*a-b*.

In implementations, as shown in FIGS. 9A and 10-13 the refillable cartridge 8100 comprises one or more motorized pulleys 8152*a-b* configured to receive the one or more cords 8150*a-b*. In implementations, the one or more motorized pulleys or sprockets 8152, 8152*a-b* comprise the receiving surface drive motor 8151 configured to selectively raise and lower the one or more cords 8150, 8150*a-b* to retract the removable receiving surface 8130 in the open position and return the removable receiving surface 8130 to the closed position. In implementations, as shown in FIGS. 10-13 showing partial views of the receiving surface 8130, drive motor 8151, and cord 8150 (e.g. timing drive belt) of the refillable cartridge 8100, the cord 8150 is attached to both ends of the receiving surface 8130 so that the surface can be pulled in either direction by driving the motor 8151 in forward and reverse directions. In implementations, the at least one controller 8005 is configured to instruct a drive 8135 to operate the motor 8151. In implementations, the drive motor 8151 rotates in a first direction to raise the one or more cords 8150, 8150*a-b* to retract the removable receiving surface 8130 and rotate in a second direction, opposite the first direction, to draw the removable receiving surface 8130 across the bottom of the refillable cartridge 8100 in the closed position. In implementations, as shown in FIG. 9A, the driven one or more motorized pulleys 8152*a-b* around which the one or more cords 8150*a-b* are disposed on opposite ends of a common axle and rotate together with a single drive motor so that the one or more motorized pulleys or sprockets 8152*a-b* rotate synchronously thereby preventing any torque, twisting, or binding of the removable receiving surface 8130 during retraction to the open position or replacement to the closed position.

Figure 10:
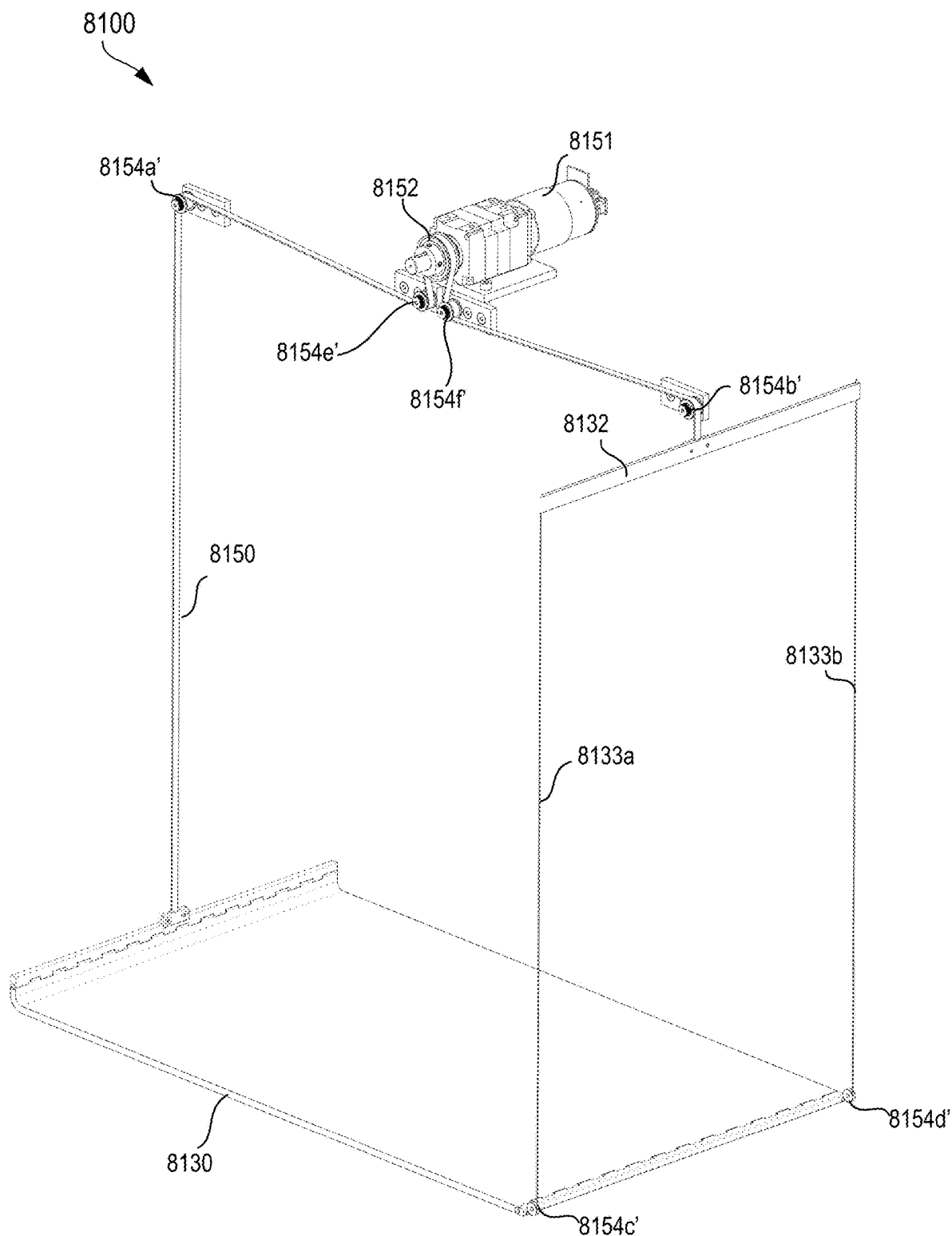
FIG. 10 depicts a side perspective view of the receiving surface and drive mechanism for moving the receiving surface of refillable cartridge of FIG. 7 in a closed position.
Figure 11:
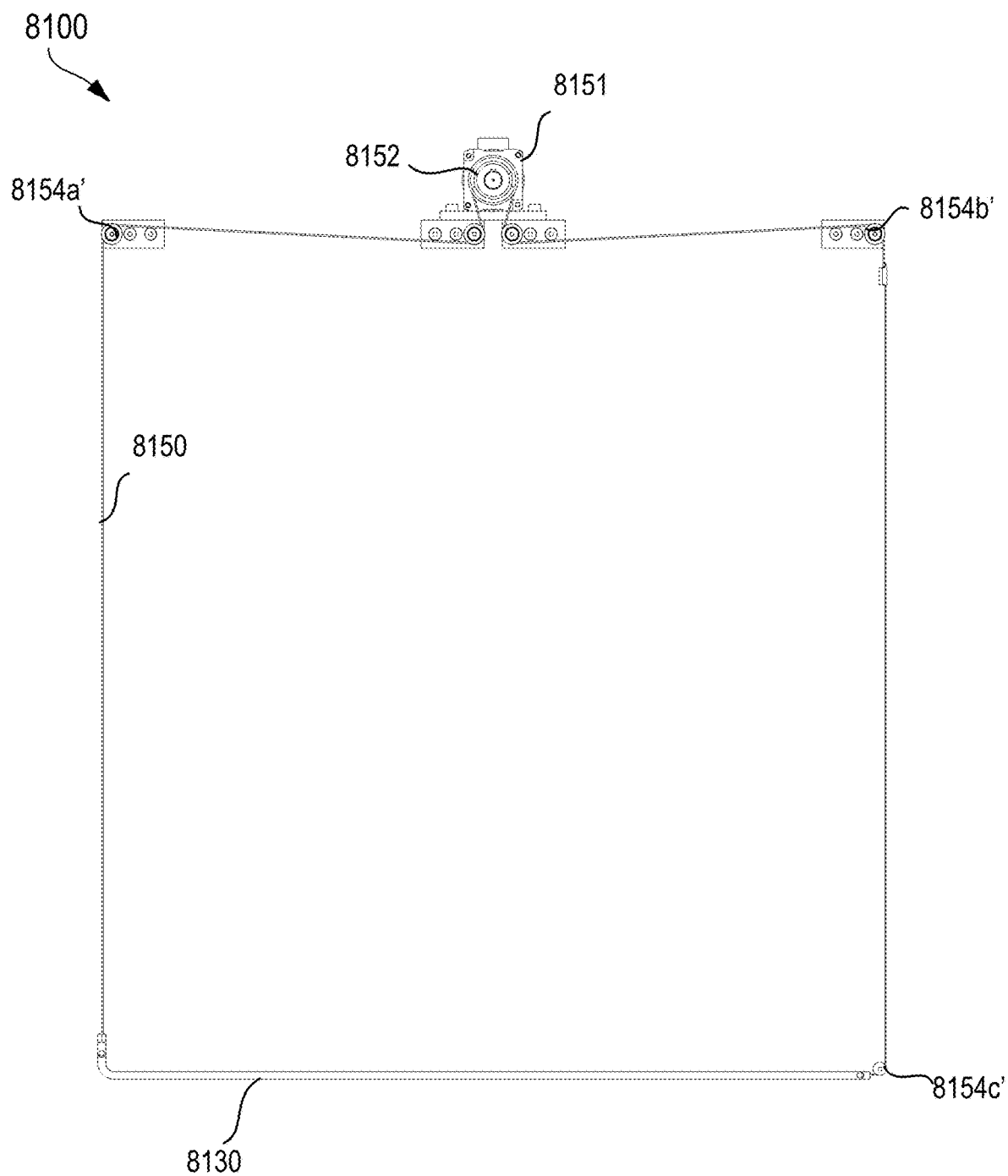
FIG. 11 depicts a front view of FIG. 10.
Figure 12:
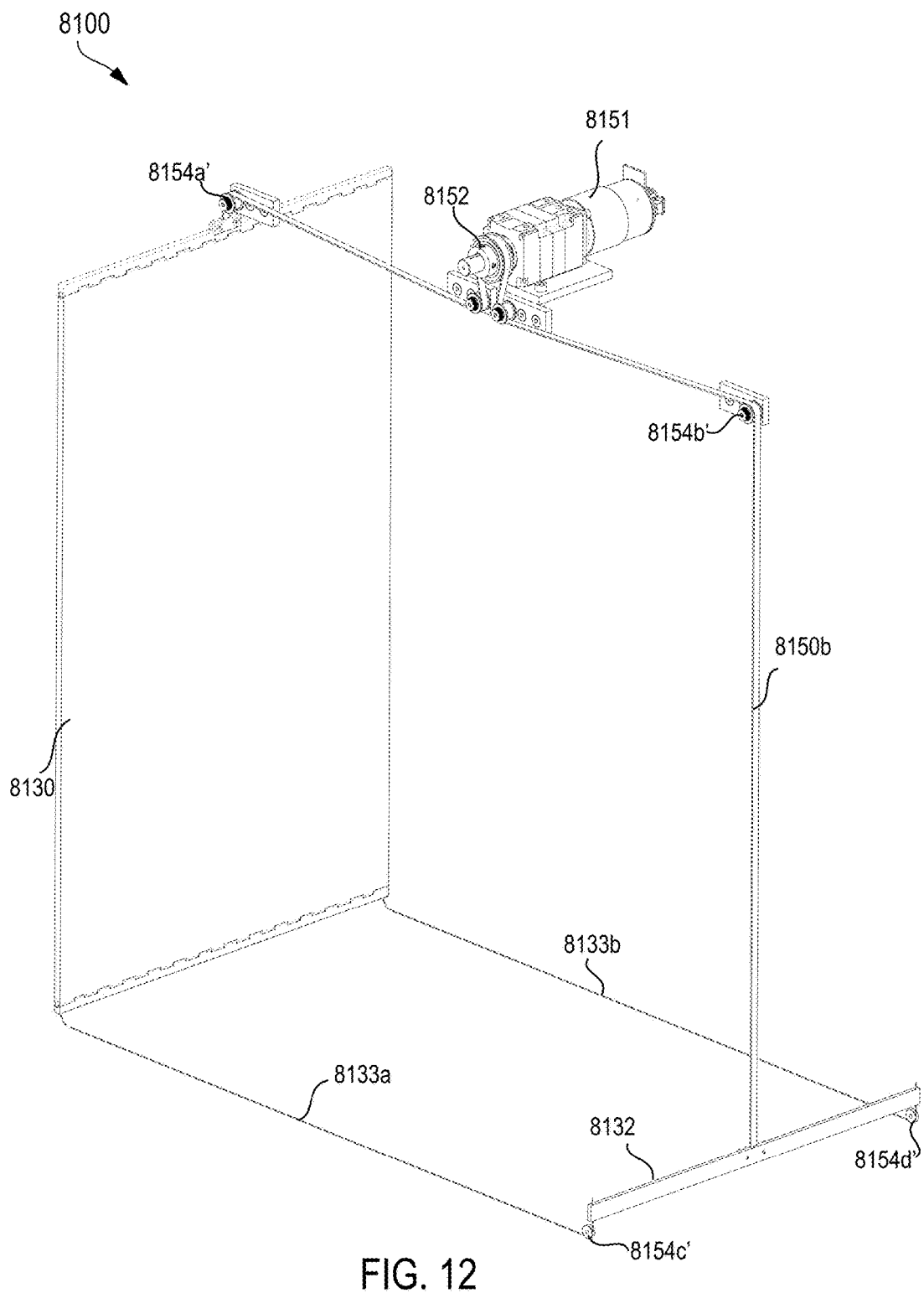
FIG. 12 depicts a side perspective view of the receiving surface and drive mechanism for moving the receiving surface of refillable cartridge of FIG. 7 in an open (withdrawn) position.
Figure 13:
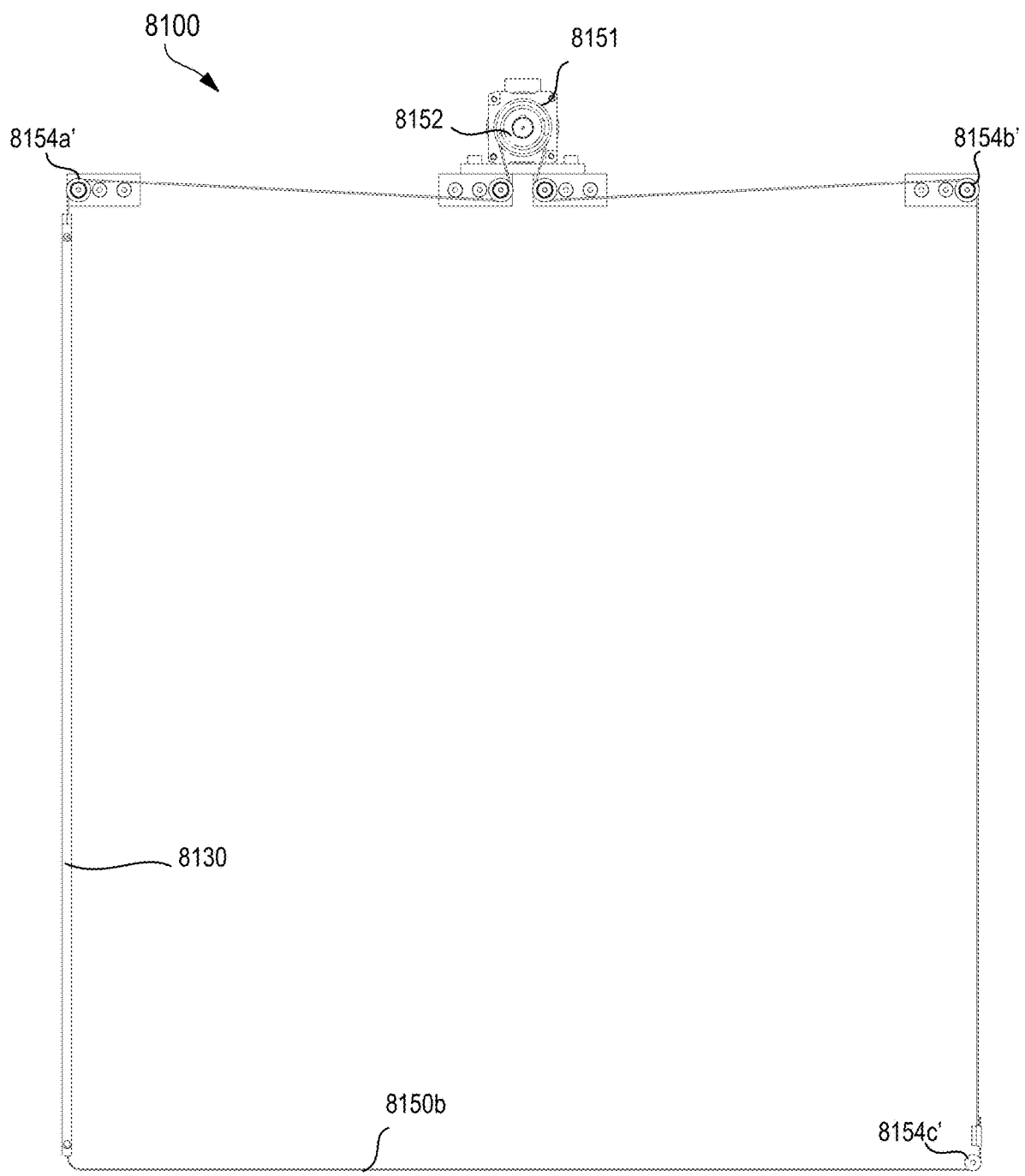
FIG. 13 depicts a front view of FIG. 12.

Alternatively, as shown in FIGS. 10-13, the driven sprocket 8152 is centrally located and a single closed loop cord 8150 (e.g., timing drive belt) engages ends of the receiving surface 8130 directly or indirectly. For example, as shown in FIG. 10, the cord 8150 attaches to a force transfer rod 8132 that engages one end of the receiving surface 8130 via a split pair of cables 8133*a-b* as previously described. The force transfer rod 8132 extend across the width of the receiving surface 8130 to transfer the translational motion of the moving cord 8150 evenly across the ends of the surface 8130 via the two cables thereby preventing twisting or jamming. The force transfer rod 8132 enables driving the timing drive belt (e.g., cord 8150) from a single sprocket and motor 8151 directly, while still allowing the cables on the other side to split and thus be hidden in the side channels 8146*a-b* and away from folded articles loaded into the refillable cartridge 8100. FIG. 10 depicts a perspective view of the receiving surface 8130 in a closed state and FIG. 11 depicts a front view of FIG. 10. FIG. 12 depicts the receiving surface 8130 in an open state, pulled upward by the drive motor 8151 rotating the pulley and cord 8150 wrapped thereon. FIG. 13 depicts a front view of the open state of FIG. 12.

In implementations, the one or more cords 8150, 8150*a-b* are affixed at each end to opposite ends of the removable receiving surface 8130. Between the ends, the one or more cords 8150*a-b* are routed over a plurality of support pulleys 8154*a-h*, 8154*a'-d'* configured to rotate with movement of the one or more cords 8150, 8150*a-b*. In implementations, two additional pulleys 8154*e-f* (FIG. 10) on either side of the drive sprocket 8152 give wrap to the timing drive sprocket 8152 and help tension the belt 8150. In implementations, the plurality of support pulleys 8154*a-h*, 8154*a'-d'* and the one or more motorized pulleys or sprockets 8152, 8152*a-b* are disposed on the refillable cartridge 8100 outside of the interior volume into which one or more folded laundry articles 7300*a-n* are received. The outside mounting of the plurality of corner pulleys 8154*a-h*, 8154*a'-d* and the one or more motorized pulleys or sprockets 8152, 8152*a-b* ensures no interference of moving parts with the folded laundry article or articles 7300*a-n* received into the refillable cartridge 8100. The support pulleys 8154*a-h*, 8154*a'-d'* are configured to guide the one or more cords 8150, 8150a-b to their associated the one or more motorized pulleys or sprockets 8152, 8152a-b and prevent fraying and damage as the one or more cords 8150, 8150a-b slide about, on, and/or within the pair opposing sidewalls 8110a-b in tension.

Alternatively, in implementations some or all of the support pulleys 8154a-h, 8154a'-d' are omitted and the receiving surface 8130 in the closed position spans between the wide walls 8110a-b and extends partially up into one double wall and/or vertical channel. For example, in FIG. 10, the receiving surface 8130 is already rounding the bend on one end in a closed position. The receiving surface then can be pulled further up into the double wall and/or vertical channel when moving to the open position because the receiving surface 8130 has already started rounding a bottom corner of the refillable cartridge 8100 and therefore never has to cross cable-guiding pulleys at that bottom corner. Additionally or alternatively, the refillable cartridge comprises custom formed channels that are curved around that bottom corner to facilitate movement of the receiving surface within the curved channels around the bend at the corner. Additionally or alternatively, the guiding pulley spans the entire width of a sidewall 8810a and comprises grooves for guiding the cables and thereby supports both the receiving surface 8130 and the cables during movement between closed and open positions. (e.g., pulleys 8154d and 8154h in FIG. 9A would be ends of a single rod rotating in bearings, to help keep the receiving surface 8130 flat and guide the receiving surface 8130 around the corner during movement.)

Figure 14B:
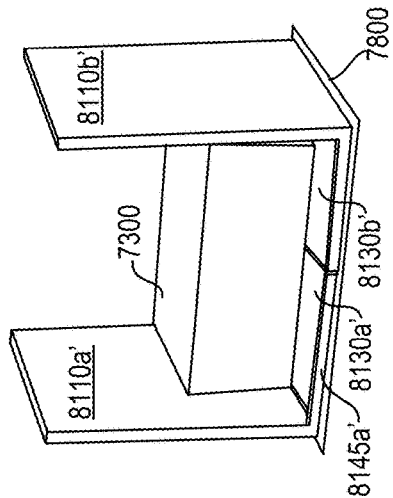
FIGS. 14B-C depict schematic views of the example refillable cartridge of FIG. 14A in sequential stages of releasing folded laundry articles stacked therein.
Figure 14C:
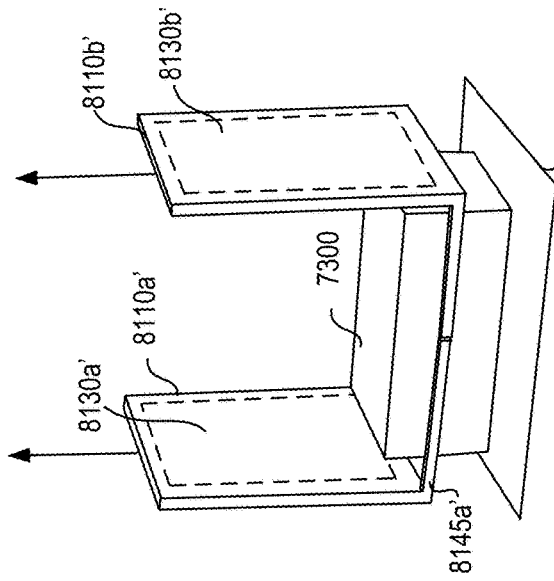
Figure 14A:
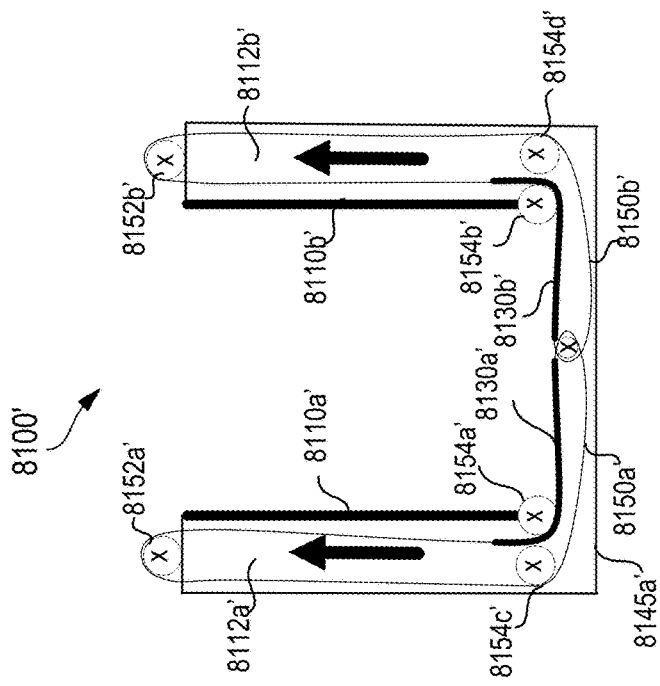
FIG. 14A depicts a schematic front cross section view of an example refillable cartridge comprising a two-part removable receiving surface.

As previously described with regard to FIGS. 7, 9A, and 10, in implementations, the one or more cords 8150, 8150a-b are routed in one or more tracks or channels 8146a-b, 8147a-b disposed on the pair of opposing sidewalls 8110a-b implementations. In other implementations, the one or more cords 8150, 8150a-b are guided by support pulleys 8154a-h, 8154a'-d and not routed in one or more tracks or channels. Additionally, in implementations, each wall of the pair of opposing sidewalls 8110a-b can comprise an inner and outer layer with a hollow channel therebetween configured to receive the one or more cords 8150, 8150a-b, the support pulleys 8154a-h, 8154a'-d and the receiving surface 8130. For example, turning to the implementation of FIGS. 14A-C the refillable cartridge 8100' can comprise a pair of opposing sidewalls 8110a'-b' having inner and outer layers. The one or more cords 8150a'-b' and support pulleys 8154a'-d' are disposed between the inner and outer layers of each one of the pair of opposing sidewalls 8110a'-b'. In implementations, the removable receiving surface 8130 can comprise a pair of receiving surfaces 8130a'-b' configured to move toward one another to form a continuous bottom surface of the refillable cartridge 8100' in the closed position. As shown in FIGS. 14B-C, the pair of receiving surfaces 8130a'-b' are configured to separate and retract upward in the direction of the arrows in the open position into a corresponding hollow 8112a'-b' between each inner and outer layer of each one of the pair of opposing sidewalls 8110a'-b'.

In any of the above implementations, the removable receiving surface 8130, 8130a'-b' (hereinafter collectively referred to as removable receiving surface 8130) can be pliant. The pliant removable receiving surface 8130 can comprise at least one of a flexible and/or jointed material that is stiff and/or can be held taut to receive the one or more folded laundry articles without sagging or otherwise shifting and causing the folded laundry article(s) 7300a-n disposed thereon to unfold or topple. The receiving surface 8130 is pliant and resilient for bending repeatedly during opening and closing without ripping, fraying, or otherwise wearing past a yield point. In implementations, the receiving surface 8130 comprises at least one of rubber, PVC, polycarbonate, acrylonitrile butadiene styrene (ABS), urethane, neoprene, nylon, nitrile, polyester, leather, polyoxymethylene (POM), acetal, KEVLAR, TEFLON, DELRIN, and ultrahigh molecular weight polyethylene. In implementations, such as those of FIGS. 9B-C, the pliant material receiving surface further comprises KEDER sewn or sealed along the outer edges for engaging the horizontal and vertical channels of the refillable cartridges 8100. Alternatively, in implementations, as shown in FIG. 9E, the receiving surface 8130 comprises a fabric material having widthwise oriented rigid rods 8131a-c (e.g., metal or wood) sewed along its length at intervals to stiffen the receiving surface for supporting folded laundry articles without the fabric receiving surface 8130 needing to be pulled taut. In implementations, the rods 8131a-c can be affixed to an outside surface of the receiving surface or disposed in pockets in between two fabric layers to provide rigidity while leaving the surface smooth for receiving folded laundry articles. Alternatively, as shown in FIG. 9D and as previously described with regard to implementations, the receiving surface 8130 comprises a linked belt (e.g., INTRALOX S550/S560). In implementations, the removable receiving surface 8130 is smooth so that the one or more folded laundry articles 7300a-n or stacks 7301a-n thereon are not snagged during refillable cartridge 8100 loading or unloading (e.g., removal of the removable receiving surface 8130 during the transition from the closed position to the open position). Additionally, in implementations, the removable receiving surface comprises a coefficient of friction between about 0.01 and 0.60 to assist with smooth transitioning of the surface 8130 from a closed to an open state with articles 7300a-n or one or more stacks 7301a-n disposed thereon.

Although the foregoing implementations comprise a retractable receiving surface 8130, in implementations, the removable receiving surface can comprise a rigid pair of trap doors 8130a'-b' (e.g., FIG. 41 with sidewalls omitted) configured to open and close to release and receive thereon one or more unbound folded laundry items. In such implementations, the removable receiving surface is hingedly attached to a bottom edge of at least one of the pair of rigid opposing sidewalls and the rigid back wall. Alternatively, in implementations, the receiving surface comprises a pair of sliding surfaces, one on each half of the bottom opening of the refillable cartridge. The pair of sliding surfaces is configured to pull apart to expose the opening and allow folding articles to drop through the opening.

Figure 15:
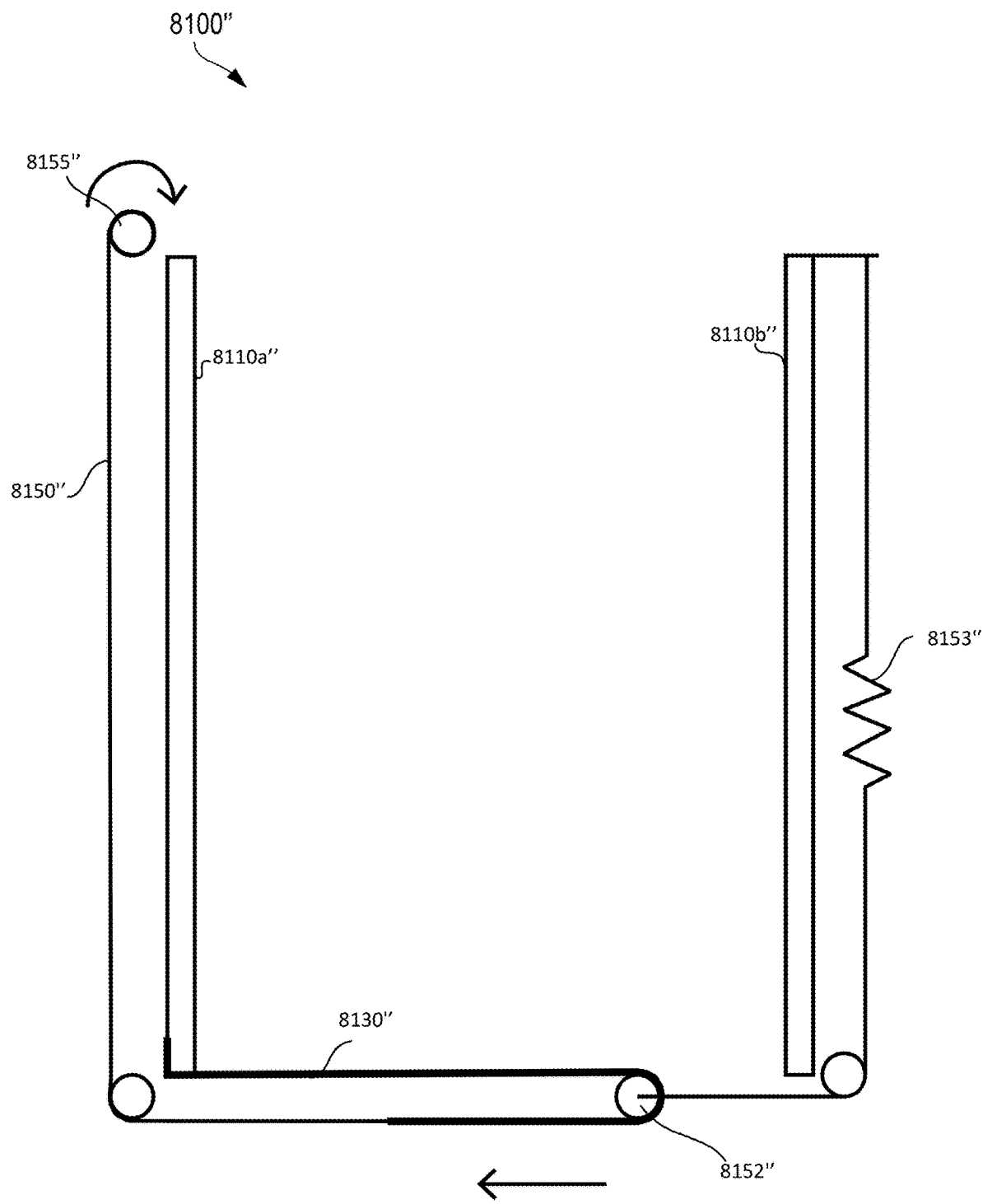
FIG. 15 depicts a schematic front cross section view of an example refillable cartridge comprising a retractable conveyor receiving surface.

In implementations, the retractable receiving surface 8130" can comprise a retractable conveyor. As shown in FIG. 15, a conveyor receiving surface 8130" has one end fixed to a side wall 8110a" of a refillable cartridge 8100" and an opposing end wrapped over a tensioned roller 8152" and then back under itself. The tensioned roller 8152" can ride back and forth in side-rails (not shown but similar to channels 8145a and 8145b) with its ends attached to guide rollers which run along or within the siderails. The tensioned roller 8152" is attached to either one end of a cable drive which allows it to move back and forth, or to a constant-force spring 8153" to maintain tension. The free end of the conveyor belt receiving surface 8130" is actuated with a cable drive 8155, either pulling against the spring of the tensioned roller 8152", or working together to actuate both the receiving surface 8130" and tensioned roller 8152". In its "closed" position, the conveyor belt receiving surface 8130"

covers the bottom of the refillable cartridge 8100", and the tensioned roller 8152" is adjacent to sidewall 8110b". As the cable drive 8155" moves, both the free end of the conveyor belt receiving surface 8130" and the tensioned roller 8152" move away from sidewall 8110b" and towards sidewall 8110a". The conveyor belt receiving surface 8130" rolls up under itself, peeling away from the bottom of the refillable cartridge 8100" to release contents therein (e.g., folded laundry articles 7300a-n).

As previously described with regard to implementations, the cable 8150" can ride through guide pulleys or around additional rollers with guiding grooves which also support the conveyor belt receiving surface 8130". If the tension roller 8152" and conveyor belt receiving surface 8130" are both attached to the same cable drive 8155", the drive 8155" can accommodate the fact that the conveyor belt receiving surface 8130" must move twice the distance of the drive 8155". The rolling conveyor receiving surface 8130" has no pinch points that might pull on one or more of the folded articles during movement of the surface 8130". This implementation reduces or eliminates any sliding surfaces moving against the folded laundry articles 7300a-n which might otherwise cause the bottom-most article or articles to be pulled in one direction or crumple during the retraction and removal of the receiving surface 8130".

Returning now to FIGS. 5-6 and 8, in implementations, a height $H_A$ of the at least one unbound folded laundry article 7300 or unbound stack 7301 of one or more unbound folded articles 7300a-n is less than or equal to a height Hc of the container 7800. Alternatively, in implementations as will be described subsequently with regard to FIGS. 30A-34B, the system 8000 comprises one or more plungers 8550 disposed above the refillable cartridge 8100 for compressing one or more folded laundry articles therein to reduce the height $H_A$ to at or below the height Hc of the container if an article or stack of articles exceeds the height Hc by no more than about 10 cm (e.g., ~4 inches). In implementations, the at least one unbound folded laundry articles 7300 comprises a plurality of unbound folded laundry article stacks 7301a-g disposed sequentially and spaced apart on the queue conveyor 8200. In implementations, the queue conveyor 8200 is a single conveyor. Alternatively, in implementations, the queue conveyor 8200 comprises two side by side conveyors 8200a-b configured to rotate independently or simultaneously in tandem.

In implementations, the plurality of unbound folded laundry article stacks 7301a-f comprises household laundry belonging to a single household, and the folded laundry articles are packaged to return to the household from which they came. In implementations, the household laundry comprises two or more article types of at least one of different sizes and different shapes. In implementations, each of the two or more article types comprises a longest dimension of between about 4 cm to 500 cm.

For example, the unbound folded laundry article stacks 7301a-g comprise a plurality of laundry articles comprising a single load of household laundry. Household laundry can comprise many types of bodily worn garments and cloth articles requiring washing (e.g., sheets, tablecloths, curtains, bath rugs). These garments and articles are deformable meaning they do not hold their shape. Because garments and other cloth articles are supple, they deform when manipulated. Different items of the plurality of laundry articles may have different thickness and stiffness values depending on the material and style of the item. For example, a woven bath mat will be stiffer than a silk blouse. The plurality of laundry articles 7300a-n in a single load of household laundry also can comprise many different laundry articles each having a different weight. Additionally, the size of each deformable article 7300 of the plurality of laundry articles 7300a-n can vary greatly within a single load of laundry, such that folding each deformable article 7300a-n requires maneuvers particular to each article as determined by at least one of article type (e.g., shirt, pants, sock, bathrobe, zippered top, hooded sweatshirt, blouse, button front shirt, sweater, baby clothes, coats, blankets, coats, curtains, bed sheets, and towels), article size, and article material thickness. Because of these variations, size of the area footprint (e.g., area (Lx*Wx) occupied on the surface of the queue conveyor as shown in FIG. 8) of each unbound folded article 7300 or stack 7310a-f of one or more articles will vary.

Figure 8:
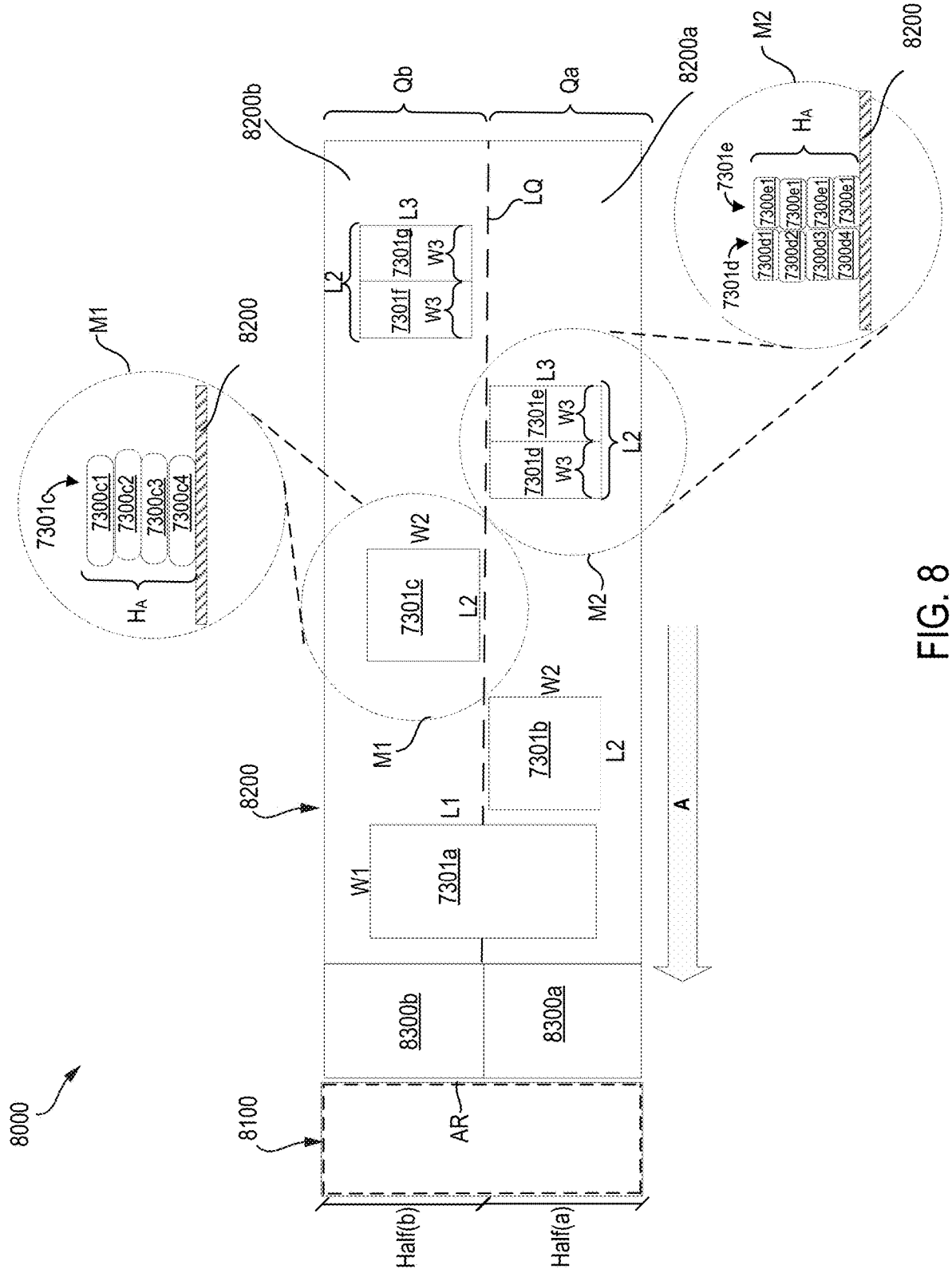
FIG. 8 depicts a perspective schematic plan view of the example system of FIGS. 3 and 5-6.

As shown in the magnified, rotated views M1, M2 of FIG. 8, in implementations, one or more stacks 7301c, d, e comprise a plurality of folded laundry articles 7300c1-c4, d1-4, e1-4 stacked atop one another. (e.g., The magnified views M1, M2 of portions of the top down plan view of the plurality of unbound folded laundry article stacks 7301a-g are rotated out of the plane to depict a side view of a stack 7301c, d, e of folded laundry articles disposed on the surface of the queue conveyor 8200.) In implementations, a height $H_A$ of the at least one stack 7301c of folded laundry articles 7300c1-4 is less than or equal to a height Hc of the container 7800. In implementations, the refillable cartridge 8100 comprises a height $H_R$ greater than the height Hc of the container 7800 so that the top end of the cartridge can attach to a lifter for lowering and raising a bottom end of the refillable cartridge (e.g., receiving surface 8130) into and out of the container 7800, as will be described subsequently with regard to implementations. In implementations, a maximum height $H_A$ of the at least one stack 7301 of folded laundry articles comprises a range of between about 25 to 65 cm and a height Hc of the container 7800 comprises a range of between about 30 to 75 cm. In implementations, the threshold height 8140 (FIG. 6) of the refillable cartridge 8100 is equal to or less than the height Hc of the container 7800 such that by not exceeding the threshold height with received one or more stacks 7301 of one or more unbound folded laundry articles 7300a-n, the stacks 7301 of one or more unbound folded laundry articles 7300 delivered by the refillable cartridge 8100 to the container 7800 will not overflow the container 7800. Additionally or alternatively, as described previously with regard to implementations, the height $H_A$ of a stack can exceed the height Hc of the container by a small amount (e.g., approximately 10 cm) if the stack is compressible, as is the case with most deformable laundry articles 7300.

In implementations, at least one of the at least one controller 8005 and queue conveyor processor 8205 is configured to receive one or more sensor signals indicative of a height $H_A$ of the at least one stack 7301 of folded laundry articles. In implementations, the sensor signal is output from one or more sensors 8160, 8210a-n disposed proximate the refillable cartridge 8100. In implementations, such as that depicted in FIG. 16, the one or more sensors 8160, 8210a-n comprises one or more optical sensors, where "n" indicates a number greater than 1. The one or more optical sensors can include at least one of a 3-D camera, an IR sensor, a 2-D camera, LIDAR, LADAR, a sonar proximity sensor, an ultrasonic ranging sensor, a radar sensor, and a pair of stereo depth cameras. Additionally or alternative, the height $H_A$ of the at least one stack 7301 of folded laundry articles 7300a-n can be provided via the network 230 by a sensor (e.g., optical sensor, an absolute position sensor mounted to a mechanical plunger, break beam, etc.)

disposed proximate one or more robots configured to load the queue conveyor 8200 with the plurality of unbound folded laundry articles 7300a-n. Additionally or alternatively, in implementations, a load cell mounted on a plunger 8550 detects when the plunger has reached a threshold compression force indicative of the stack 7301 of folded laundry articles being compressed and an absolute position sensor of the plunger driven by a motor or an additional sensor disposed on or adjacent to the piston can provide a signal indicative of the height of the stack 7310. In implementations, the position sensor can be a magnetic encoder disposed on the drive motor.

In implementations, as shown in the magnified, rotated views M1, M2 of FIG. 8, the at least one stack 7301c-e comprises a plurality of folded laundry articles 7300c1-c4, 7300d1-d4, 7300e1-e4. In implementations, each unbounded folded laundry article 7300c1-c4, 7300d1-d4, 7300e1-e4 of the at least one stack 7301c-e of folded laundry articles comprises at least one of a common article type and common area footprint. For example, the plurality of folded laundry articles 7300c1-c4, 7300d1-d4, 7300e1-e4 can be stacked according to common article type (e.g., a stack of pants, a stack of towels, a stack of button front shirts, etc.). Additionally or alternatively, the plurality of folded laundry articles 7300c1-c4, 7300d1-d4, 7300e1-e4 can be stacked according to an area footprint. In implementations, the at least one stack 7301c, 7301d, 7301e of unbound folded laundry articles 7300c1-c4, d1-d4, e1-e4 comprises an area footprint (Lx*Wx, where "X" is a numeral indicative of a measured length or width) less than or equal to an area AR (e.g., projected area AR above the refillable cartridge 8100 in FIG. 5) bounded by the rigid opposing sidewalls 8110a-b, the rigid back wall 8115, and the opening 8120 of the refillable cartridge 8100. The area AR is less than or equal to an area footprint of the container 7800 such that the receiving surface 8130 of the refillable cartridge 8100 and the floor space occupied by one or more articles 7300 thereon fit within the confines of the container 7800 for packing and return to a customer in a neatly folded and stabilized array.

In implementations, at least one of the controller 8005 and queue conveyor processor 8205 is configured to receive one or more output signals from one or more sensors 8210, 8210a-f (FIGS. 3, 16) configured to output signals indicative of an area footprint of the at least one stack of deformable articles. Additionally or alternative, the area footprint of the at least one stack 7301 of folded laundry articles 7300a-n can be provided via the network 230 by a sensor (e.g., optical sensor, a hall sensor, etc.) disposed proximate one or more robots configured to orient and/or load the queue conveyor 8200 with the plurality of unbound folded laundry articles. Additionally or alternatively, locations of stacks 7301 of deformable laundry articles are predefined along the queue conveyor 8200 as designated absolute positions along the queue conveyor length (LQ, FIG. 8). Limit switches and magnetic encoders on the drive motor of a movable gantry rail extending the length LQ of the queue conveyor 8200 ensure an absolute position as a cantilevering conveyor 8855 travels along the gantry rail 8857 and deposits folded articles 7300 on the packing queue conveyor 8200. Additionally or alternatively, a series of magnets and/or limit switches disposed at each stack position along the gantry rail 8857 are assigned to a plurality of folded laundry article sorting categories for the plurality of household laundry articles 7300a-n being queued and packed alone or in stacks 7310a-n.

Taking FIGS. 8, 17A-B, and 30A-34B together, in implementations, the at least one stack of unbound folded laundry articles comprises at least two stacks 7301b-c. In implementations, the refillable cartridge 8100 is configured to receive two or more stacks 7301b-c of unbound folded laundry articles on top of one another and side by side, such as stacks 7301b1-b4, c1-c4 side-by-side. In implementations, two or more stacks 7301a-n of unbound folded laundry articles are configured to be received at least one of side-by-side and atop one another. In implementations, the two or more stacks 7301a-n of unbound folded laundry articles 7300a-n can be received atop another at least one unbounded folded laundry article 7300 or stack 7301 of a plurality of unbounded folded laundry articles 7300a-n. In implementations, a height $H_A$ of each of the two or more stacks 7301a-n is less than or equal to a height Hc of the container. In implementations, the two or more stacks are at or about the same height $H_A$ for added stability in loading and shipping the container 7800 without the unbound folded laundry articles 7300 toppling or unfolding. Additionally or alternatively, the two or more stacks 7301a-n of unbound folded laundry articles 7300a-n can be received atop one another, and a combined height of the received two or more stacks 7301a-n is less than or equal to a height Hc of the container. Additionally or alternatively, the two or more stacks 7301a-n of unbound folded laundry articles 7300a-n are configured to be received side-by-side and a total area footprint of the received side-by-side stacks is less than or equal to an area AR bounded by the rigid opposing sidewalls 8110a-b, the rigid back wall 8115, and the opening 8120.

Returning to the schematic plan view of the queue conveyor 8200 of FIG. 8, two or more stacks 7301a-g of folded laundry articles 7300b-g are disposed adjacent the refillable cartridge 8100 in at least one queue "Q". In implementations the at least one queue comprises two parallel queues $Q_{a-b}$, each one of the two parallel queues $Q_{a-b}$ being disposed on a bilateral half 8200a-b of the queue conveyor 8200 as divided along its length LQ, and each bilateral half 8200a-b of the queue conveyor 8200 is aligned with one half (Half (a), Half(b)) of a volume of the refillable cartridge 8100. In implementations, the two parallel queues $Q_{a-b}$ are staggered along a length LQ of the queue conveyor 8200. In implementations, the two parallel queues $Q_{a-b}$ are disposed on a movable queue conveyor 8200 in operable communication with the at least one controller 8005 for moving in the direction of arrow A during loading of the refillable cartridge 8100. As described previously, in implementations, the queue conveyor 8200 is a single conveyor. Alternatively, in implementations, the queue conveyor 8200 comprises two side-by-side conveyors 8200a-b (e.g., bilateral halves of the conveyor 8200) configured to rotate independently or simultaneously. By staggering the folded laundry articles 7300b-g in two parallel queues $Q_{a-b}$ along the queue conveyor length LQ, rotating the queue conveyor 8200 advances one stack of folded laundry articles 7300b-g at a time onto one or the other of the parallel loading ends 8300a-b. As will be described subsequently with regard to embodiments, this alternating pattern allows the parallel loading ends 8300a-b to load first one side and then the other side of the refillable cartridge 8100, keeping the unbound folded laundry articles received therein as even in height as possible between bilateral halves (e.g., Half(a), Half(b)) and therefore as stable as possible to prevent shifting, toppling, and/or unfolding.

In an implementation in which the two queue halves are separate and comprise integrated loading ends, the alternating pattern of stacks and empty spaces allows articles to be sorted into one of two duplicate stacks (e.g. stacks of duplicate article type), helping the system 8000 maintain the ability to sort folded articles into all required categories while keeping the two queues Qa-b even in overall height. The staggered pattern also allows a cantilevered placing conveyor 8855 to place articles in a stack 7301 on the far queue Qa-b without running through stacks on the near queue Qa-b.

In implementations, the parallel loading ends 8300*a-b* are each a unified retractable and extendable portion of one of the side-by-side conveyors 8200*a-b*. Alternatively, in implementations, the parallel loading ends 8300*a-b* are separate retractable and extendable conveyors, one each aligned with ends of the side-by-side conveyors 8200*a-b*. Although the parallel loading ends 8300*a-b* are shown as separate placer conveyors 8300 in the system 8000 schematic of FIG. 3, it is understood that the separate placer conveyors 8300 are an optional implementation and in other implementations, the side-by-side conveyors 8200*a-b* each include the selectively extendable and retractable portions and the corresponding controls shown FIG. 3.

Additionally or alternatively, in implementations, because some stacks 7301 of folded laundry articles 7300 can be queued simultaneously on the parallel loading ends 8300*a-b*, the parallel loading ends 8300*a-b* could load several smaller stacks from one of the two parallel queues $Q_{a\text{-}b}$ at a time to help keep the loaded stacks even in height within the refillable cartridge 8100. Additionally or alternatively, the two side by side, separately actuated conveyors 8200*a-b* of the queue conveyor 8200 need not alternate to achieve a final loaded height in the refillable cartridge 8100 that is even across the tops of two or more loaded stacks. For example, two stacks 7301 of folded laundry articles could be loaded from one queue of two parallel queues $Q_{a\text{-}b}$ before one stack is loaded from the other. Additionally or alternatively, in implementations, sorting categories can be duplicated in each one of the two parallel queues $Q_{a\text{-}b}$ such that folded laundry articles 7300 can be placed in either queue $Q_{a\text{-}b}$ regardless of category (e.g., article type or likely wearer). The controller 8005 therefore can be configured to sort the folded laundry articles on the queue conveyor 8200 solely based on a cumulative height of each queue from the refillable cartridge loading end to the opposite end of the queue $Q_{a\text{-}b}$.

As depicted in the schematic embodiment of FIG. 3, the queue conveyor 8200 can comprise at least one processor 8205 configured to operate a conveyor drive 8215 and configured to communicate wired or wirelessly with the controller 8005 via the communication network 230. In implementations, the two or more stacks 7301*b-g* of the two parallel queues $Q_{a\text{-}b}$ are disposed on the queue conveyor 8200 in order of size. For example, at least one of the at least one unbound folded laundry article 7300*a* and the two or more stacks of folded laundry articles 7300*b-g* comprising a largest folded area is disposed closest to the refillable cartridge 8100. In implementations, when a full container height Hc of articles has been queued in at least one of the two queues $Q_{a\text{-}b}$, the two or more stacks 7301 of folded laundry articles 7300 are then loaded into the refillable cartridge 8100, from largest size (e.g., area footprint W*L) to smallest size (e.g., area footprint). By stacking the largest articles at the bottom of the refillable cartridge 8100, the unbound folded laundry articles loaded into the container 7800 are more stable during loading and transport and less likely to topple or unfold.

For example, returning to FIG. 8, from closest to furthest from the refillable cartridge 8100, the area footprints W1×L1 of the closest stack 7301*a* comprises dimensions of at least one of approximately 12"×20" (e.g., 30.5×50.8 cm). The area footprints W2×L2 of the next closest two or more stacks 7301*b-c* of folded laundry articles comprises dimensions of approximately 10"×12" (e.g., 25.4×30.5 cm), and the area footprints W3×L3 of the furthest two or more combined, smallest side-by-side stacks comprises dimensions of approximately 6"×10" or 5"×6" (15.24×25.4 cm or 12.7×15.24 cm such that all of these area footprints alone or in combination fit within a container having area footprint dimensions of about 17"×27.5" (e.g., 43.2×70 cm). The smaller sizes (e.g., 6"×10" and 5"×6") can combine to make 10"×12" sets of stable, side-by-side stacks. In other words, in implementations, smaller rectangle sizes (e.g., smaller area footprints W2×L2, L2×L3) of stacks 7301 are chosen as fractions of the full-stack area footprint W1×L1, such that they can be queued together, side-by-side as a single "full-stack". This aids in filling a container 7800 because stack layers within the refillable cartridge 8100 can be filled all the way across the halves of the cartridge 8100. The at least one placing end 8300*a-b* can place full-rectangle stacks of folded laundry articles, even if comprised of two or more combined side-by-side stacks 7301 of smaller sizes.

Additionally, in implementations, as shown in FIG. 8, smaller stacks 7301*d-g* can be oriented with their longest dimension L3 perpendicular to the queue length LQ. This adds stability during depositing by the cantilevering conveyor 8855 because the folded articles are supported for longer by the cantilevering conveyor 8855 without toppling off the angled portion of the conveyor during depositing on to the queue conveyor 8200. Alternatively, in implementations, the smaller sized stacks 7301*d-g* can be oriented on the packing queue conveyor 8200 with their longest dimension parallel to the queue length LQ for added stability when the queue conveyor 8200 rotates its belt to move the stacks 7301*a-n* of folded laundry articles 7300*a-n* toward the refillable cartridge 8100. Having the stacks 7301*d-g* with smaller area footprints be fractions of a full stack area footprint simplifies determining when stacks 7301 will combine to fill a container 7800 because only the heights of the stacks of folded laundry articles need to be added to compare against the known height Hc of the container. The controller 8005 does not need to determine a more complicated stacking order of folded laundry articles 7300*a-n* having non-uniform area footprints.

Figure 16:
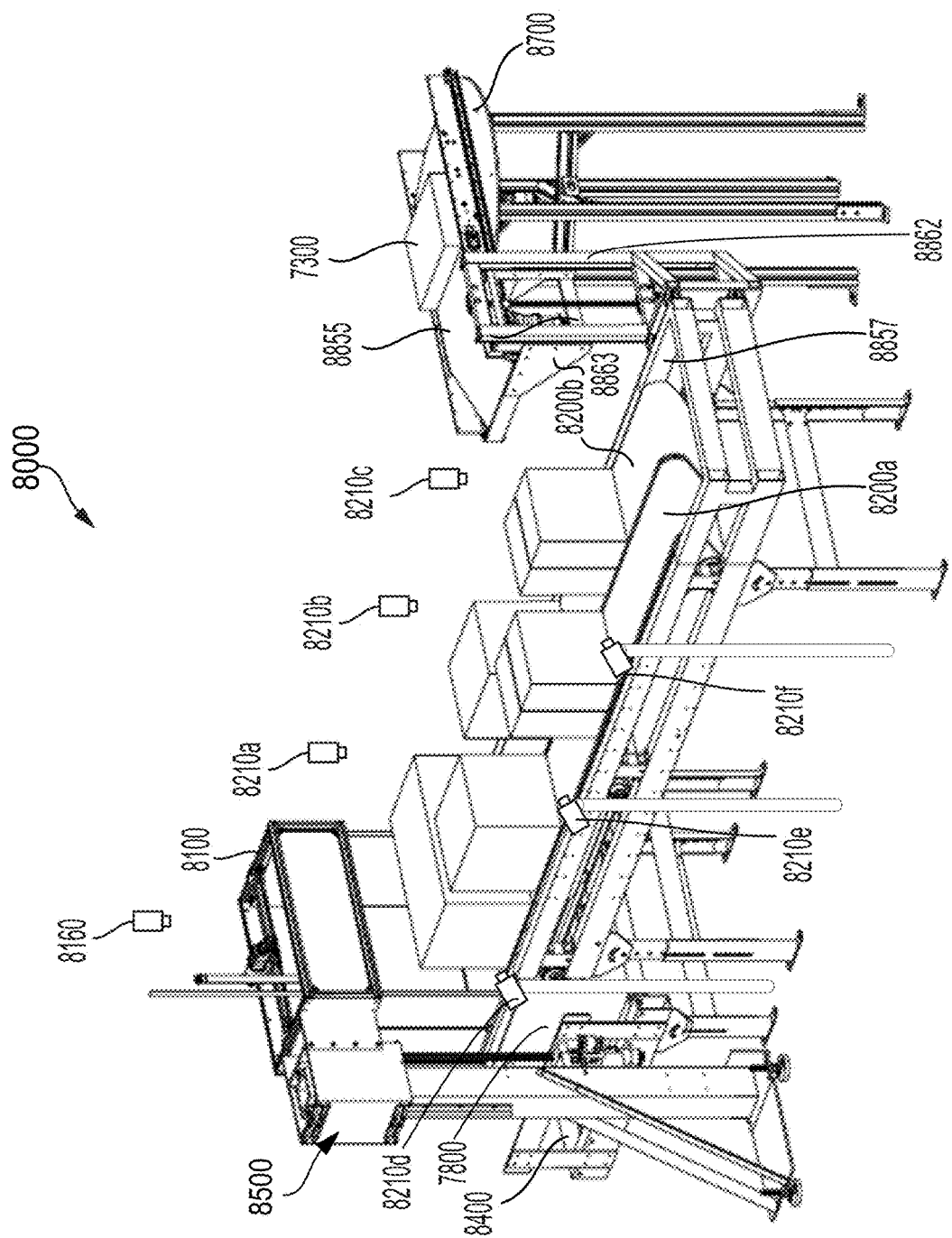
FIG. 16 depicts a perspective view of the example system of FIG. 3 loaded with unbound folded laundry articles queued for packing.

As described previously with regard to FIGS. 4 and 5, the at least one loading end 8300*a-b* is an extendable and retractable portion of the 8300*a-b* of the queue conveyor 8200*a-b* or the at least one loading end 8300*a-b* is a separate, aligned conveyor disposed between the queue conveyor 8200 and the refillable cartridge 8100. The at least one loading end 8300*a-b* is configured to carry and convey the at least one unbound folded laundry article 7300 or stack 7301 into the refillable cartridge 8100. In implementations, as shown in FIGS. 3 and 16, at least one sensor 8160, 8210*a* is configured to detect the presence of one or more unbound articles 7300 or stacks 7301 disposed adjacent the refillable cartridge 8100 in the two parallel queues $Q_{a\text{-}b}$.

Figure 35:
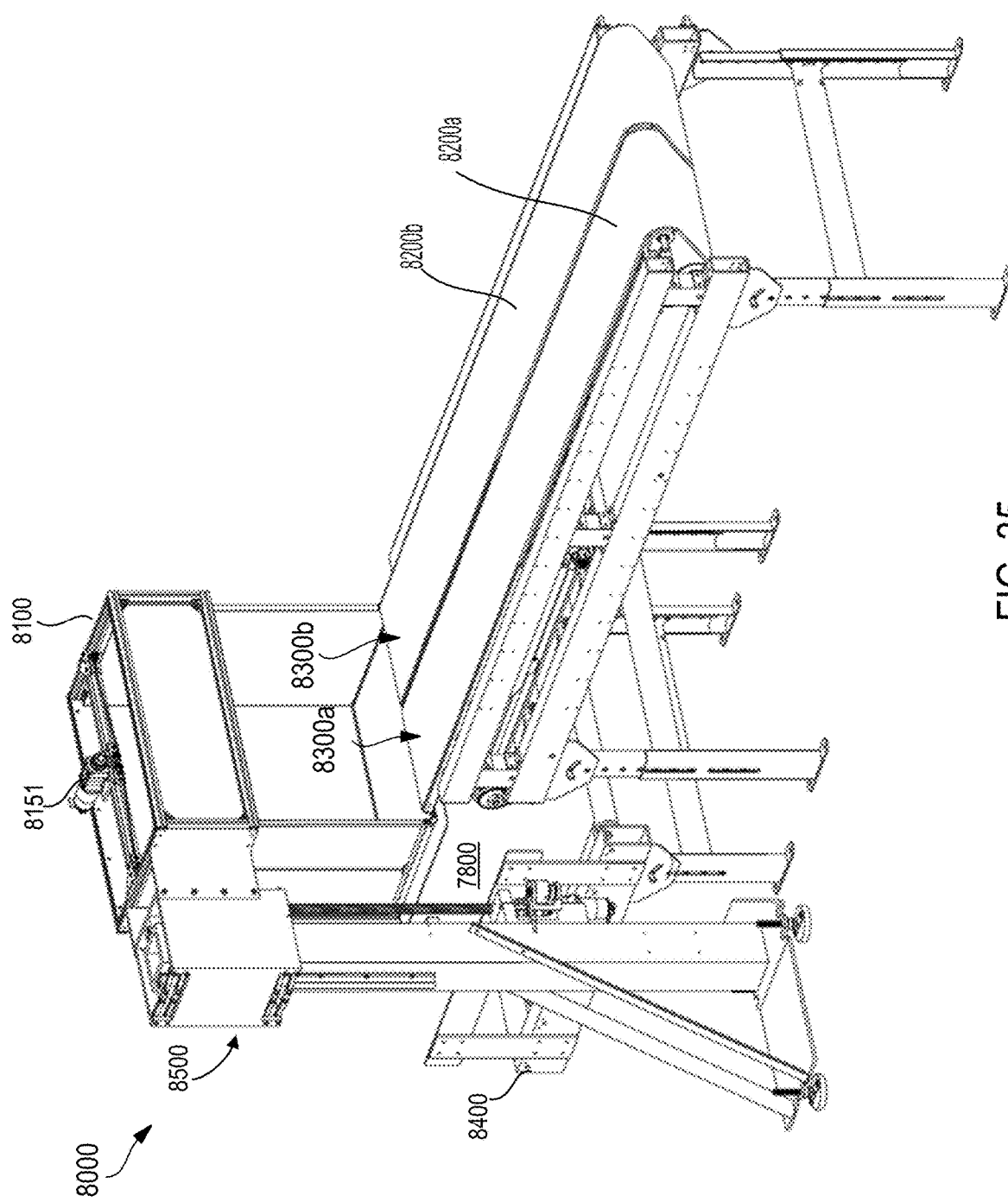
FIG. 35 depicts a a schematic perspective view of a packing system of FIG. 3 including an example motorized lifter and two side by side retracted queue conveyors with minimal or no spacing between them because no motors and pulleys or other mechanics extend beyond the width of the conveyor belt.
Figure 36:
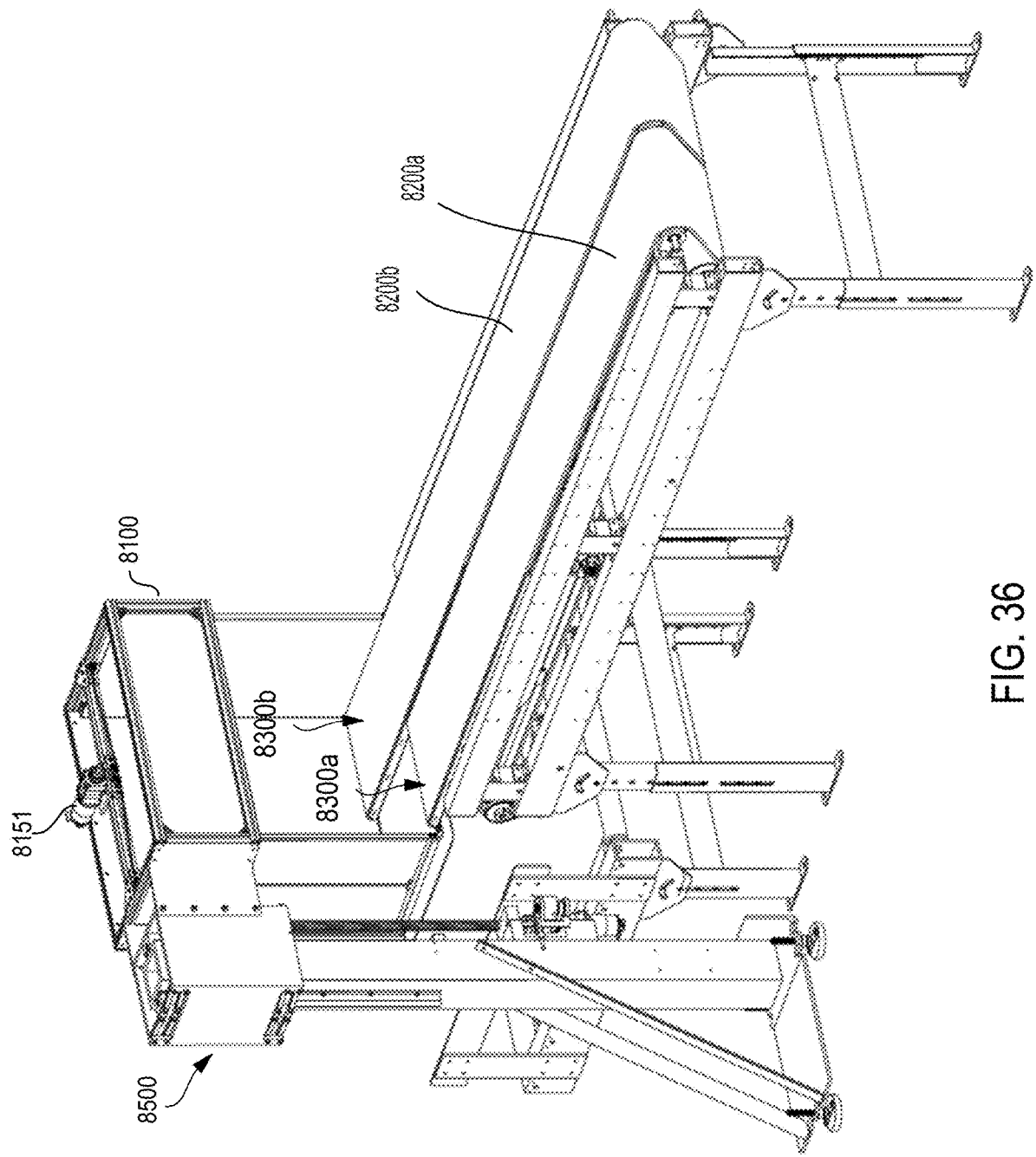
FIG. 36 depicts the view of FIG. 35 with one conveyor extended.
Figure 37:
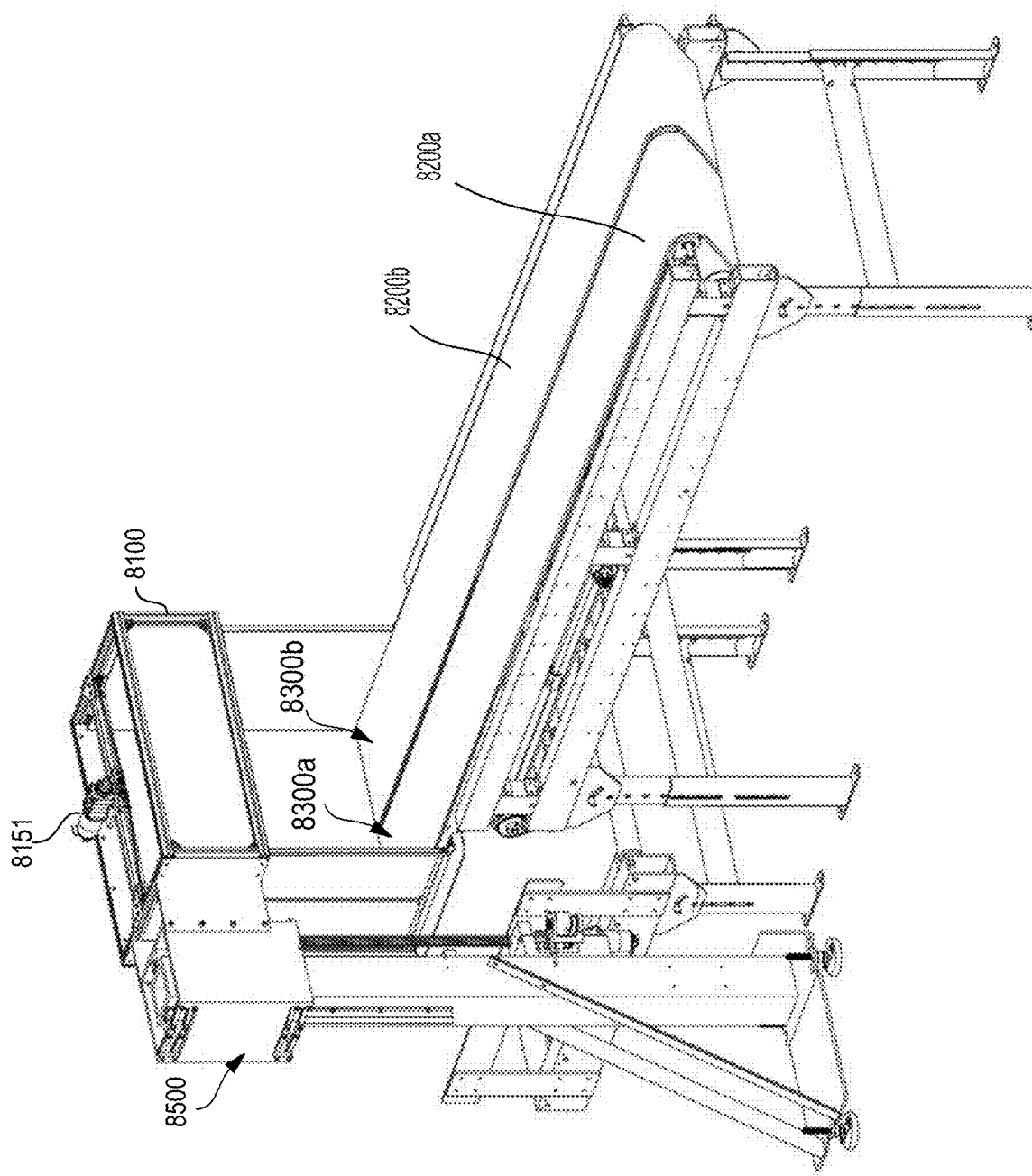
FIG. 37 depicts the view of FIG. 35 with both conveyors extended.

The at least one sensor 8160, 8210*a* can be in communication with at least one of the refillable cartridge processor 8105 via a sensor interface 8162, the queue conveyor processor 8205 via the queue conveyor sensor interface 8220, and the at least one controller 8005 via an associated network interface 8165, 8225 in at least one of wired and wireless communication with the communication network 230. In implementations, at least one loading end 8300 comprises two parallel loading ends 8300*a-b*, and each one of the two parallel loading ends 8300a-b is aligned with a corresponding one of the two parallel queues $Q_{a-b}$ of the queue conveyor 8200. In implementations, the queue conveyor 8200 comprises two parallel conveyors 8300a-b configured to be spaced apart by between about 1 mm to 25 mm so that they can rotate simultaneously with the combined effect of a single, double-wide conveyor. In implementations, the two parallel loading 8300a-b are configured to operate at least one of independently and simultaneously. For example, as shown in FIGS. 5-6, 8, and 37, the two parallel conveyors loading are operating simultaneously to deliver to the refillable cartridge 8100 a stack 7301a having an area footprint W1×L1 spanning both of the two parallel loading ends 8300a-b. Additionally, each one of the two parallel loading ends 8300a-b services a dedicated half of the refillable cartridge 8100 for delivering unbounded folded articles having an area footprint sized for placement entirely on a single one of the two parallel loading ends 8300a-b and placement in a corresponding aligned half (e.g., Half (a), Half (b)) of the refillable cartridge 8100. For example, as shown in FIG. 35, both without stacks 7301 thereon, two parallel loading ends are simultaneously retracted. As shown in FIG. 36, on loading end 8300b is extended into one half of the refillable cartridge 8100, and, as shown in FIG. 37, both loading ends 8300a-b are extended into both halves of the refillable cartridge 8100. Although implementations herein describe a double conveyor 8200a-b, double wide refillable cartridge 8100, other implementations are considered including a triple wide receivable cartridge 8100 and corresponding conveyors and a single wide receivable cartridge and a single wide conveyor. The double wide implementation is configured for stable stacking and easy maintenance of moving components in the system 8000.

Turning now to FIGS. 18-29, in implementations, each one of the two parallel loading ends 8300a-b comprises an extendable leading edge 8310 (e.g., a front nose roller), a snub roller, and a tensioned conveyor belt 8312 configured to be let out selectively in the direction of arrow E and retracted in the direction of arrow R. A movable carriage including the leading edge 8310 and a snub roller 8315 (FIGS. 18A-B) are operable communication with a nose extend drive 8320 and a processor 8305 (FIG. 3) and move together to extend out the front section of the tensioned conveyor belt. The leading edge 8310 can be a nose roller or "knife edge" to minimize height, or thickness such that a folded laundry article 7300 or stack 7301 of folded laundry articles is separated from a landing surface (e.g., the receiving surface 8130 or the top of another loaded folded laundry article) by a minimal vertical distance (e.g., 1-25 mm). By minimizing any vertical drop, the thin leading edge 8310 prevents stacks 7301 from toppling and articles 7300 from unfolding during loading into the refillable cartridge 8100.

In implementations, as shown in FIGS. 20B, 21, 22, and 23 for example, the snub roller 8315 and nose roller at the leading edge 8310 travel together on SBR rails 8319 driven by a motor 8317. The motor 8315 drives a timing belt 8316 attached to the carriage comprising the leading edge 8310 and a snub roller 8315, driving the carriage back and forth on the rails 8319. Because of this, the belt 8312 does not need to run while the nose roller is extending. As shown in FIGS. 18A-B, the length of belt 8312 between a drive roller 8318 and the snub roller 8315 is shortened by the amount that the leading edge 8310 (e.g., the snub carriage) extends, allowing the belt 8312 to be unfurled to increase the upper length of belt to accommodate the extension. (e.g., the belt 8312 is unfurled from below the leading edge 8310 as it is extended). Alternatively, the belt 8312 can be driven at the same time as extending (even though this is not necessary for extension) to start moving one or more stacks 7310 into position in the refillable cartridge 8100 while simultaneously extending. If the belt 8312 isn't circulating while the leading edge 8310 is extended, the belt 8312 subsequently must circulate to move one or more stacks 7301 forward to enter the cartridge.

The controller 8005 is configured to extend the leading edge 8310, run the belt 8312 to move the folded articles or stacks 7301 to the leading edge 8310, and then retract the leading edge 8310 to deposit the folded article or stack 7301. Additionally or alternatively, in implementations a hard stop enables the controller 8005 to keep track of where full extend and full retract positions of the leading edge 8310. For example, in implementations, the hard stop comprises a cross bar (not shown) extending across the rails 8319. Additionally, the belt 8312 does not need to circulate while retracting from the cartridge to deposit one or more folded articles 7300 or stacks 7301 therein. While the drive roller 8318 holds its position, the length of belt 8312 between the drive roller 8318 and the snub roller 8315 increases by the amount the leading edge 8310 is retracted by, allowing take-up of the length by which the top conveyor surface must be shortened. This effectively allows the conveyor belts 8312 to roll itself up underneath the stacks the top belt surface and any articles 7300 or stacks 7301 thereon remain stationary while the conveyor pulls the belt 8312 away from beneath.

Figure 23:
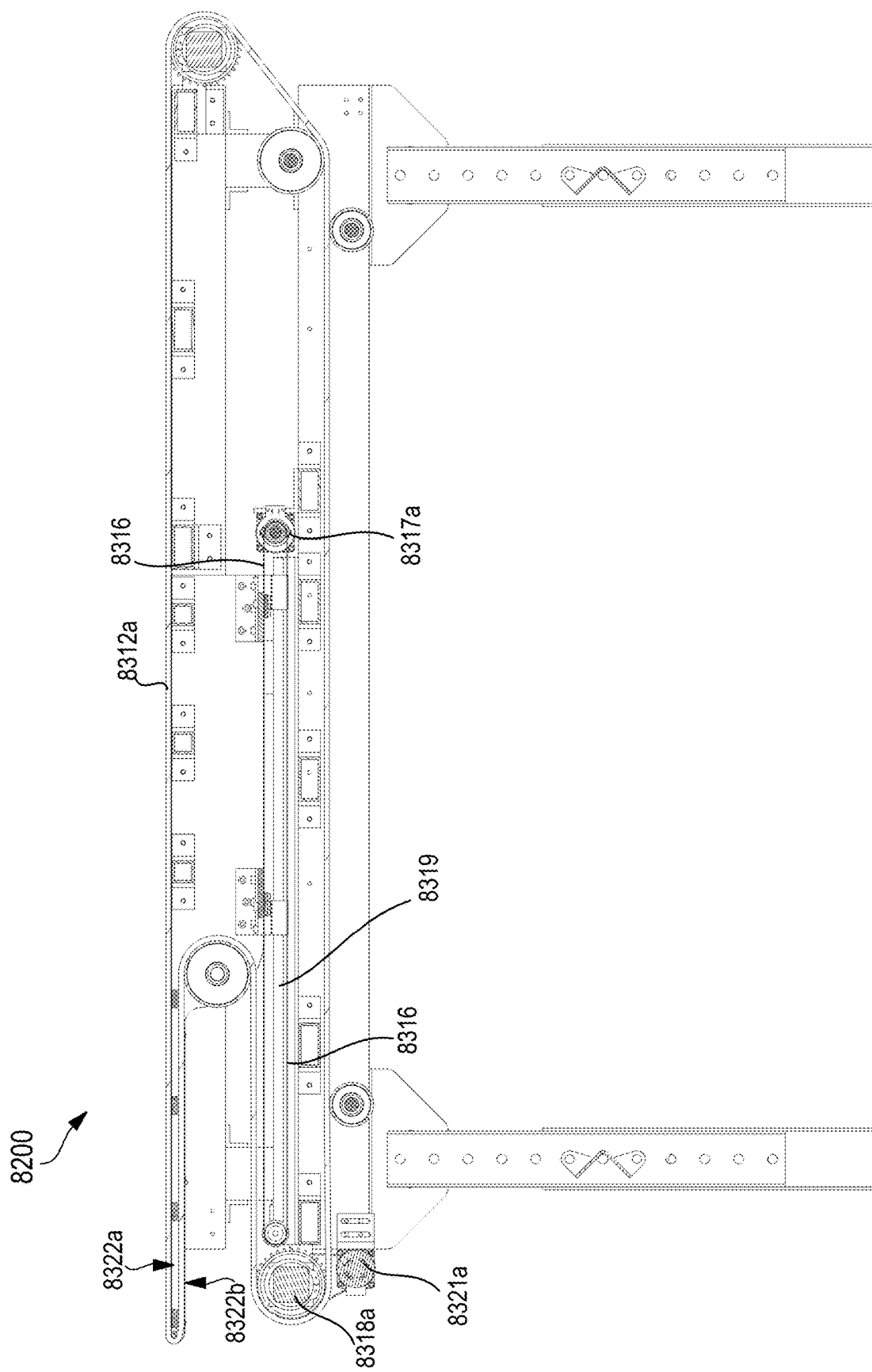
FIG. 23 depicts a cross sectional side view of a retracted conveyor of FIG. 22.

Additionally, in implementations, as shown in FIG. 23 the loading end 8300 comprises a slider bed 8322a disposed under the top of the belt 8312 and a slider bed 8322b disposed under the second layer of belt wrap. The slider bed 8322b under the second layer of belt wrap prevents already loaded folded articles from being disturbed by the running conveyor load ends 8300a-b that are extending into the refillable cartridge 8100. The slider bed 8322b underneath prevents the return side of the conveyor loading end 8300 from sagging and disturbing folded articles; the upper slider bed 8322a supports the conveyor belt 8312 and the stacks 7301 moving along it.

Figure 19:
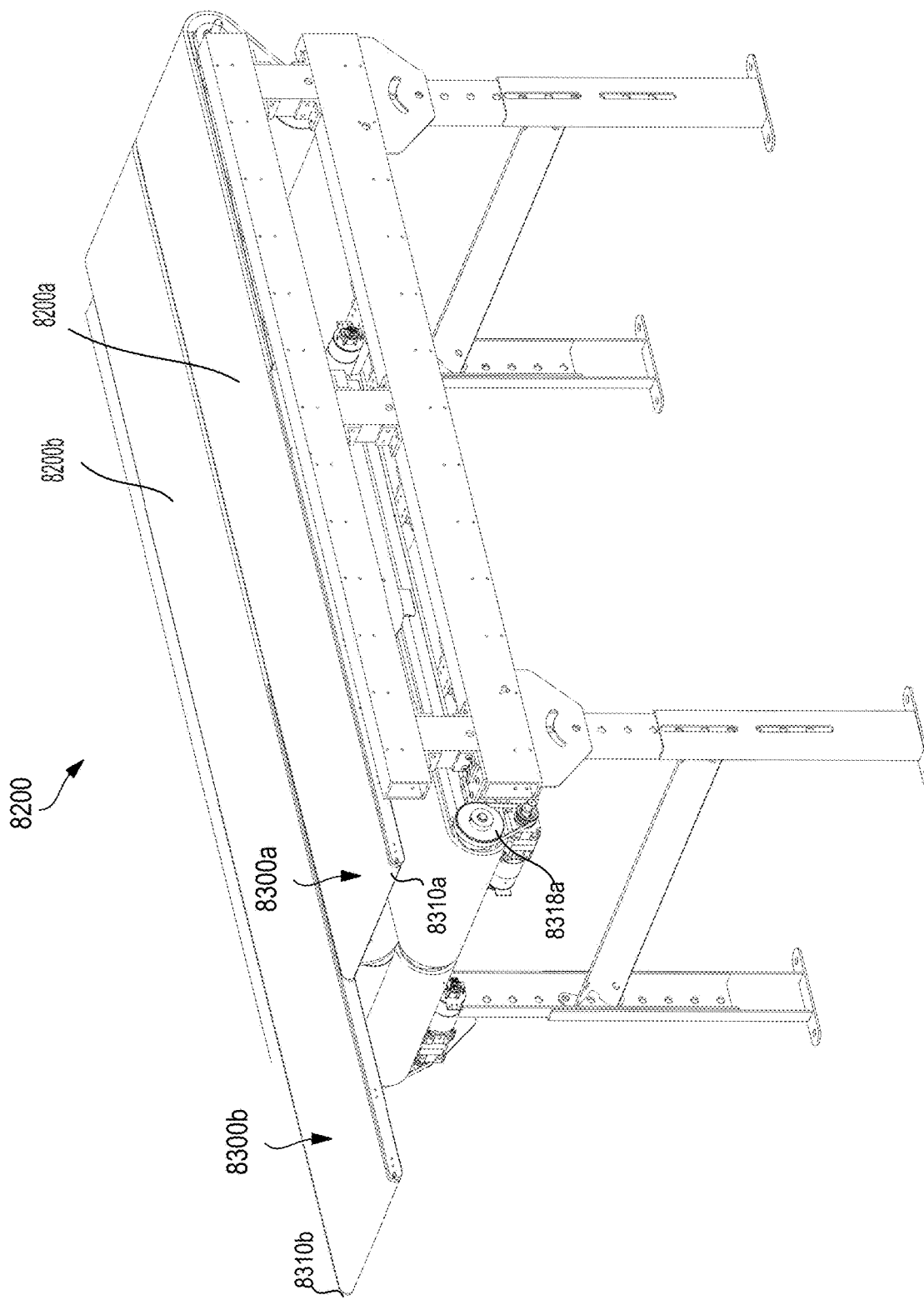
FIG. 19 depicts an implementation of a loading end of one of two side-by-side parallel queue conveyors extended out and the other retracted.
Figure 22:
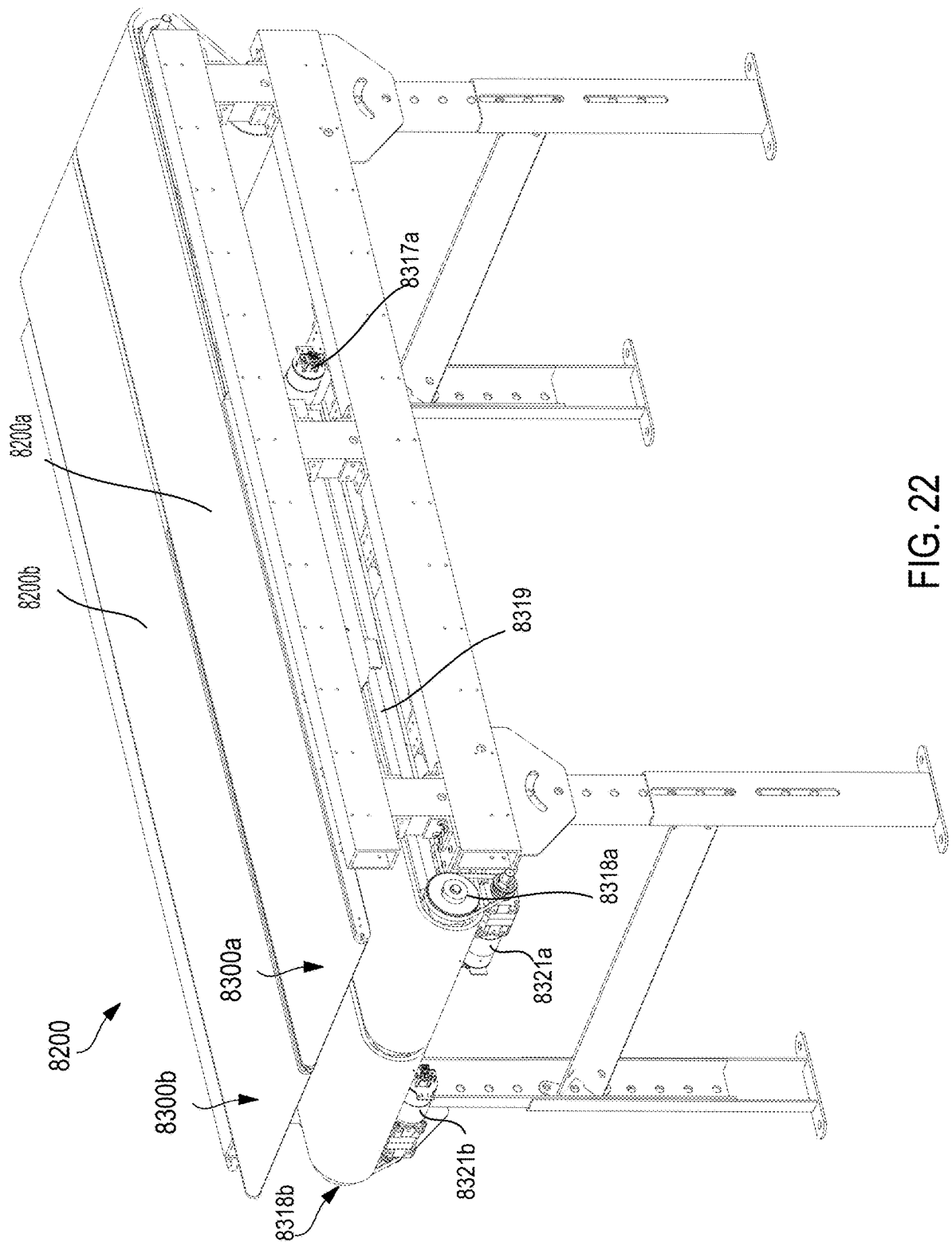
FIG. 22 depicts both of two parallel queue conveyors with their loading ends both retracted.

Additionally, in implementations, the belt 8312 comprises a plastic belt driven by a drive roller 8318 and associated sprocket on each side of a cartridge end of the queue as shown in FIGS. 19 and 22. In implementations, the drive motors 8321a-b can be mounted within the bounds of the conveyor and can drive the sprockets with a timing belt. The sprockets track the belt and prevent side-to-side drift while the belt is running.

Figure 21:
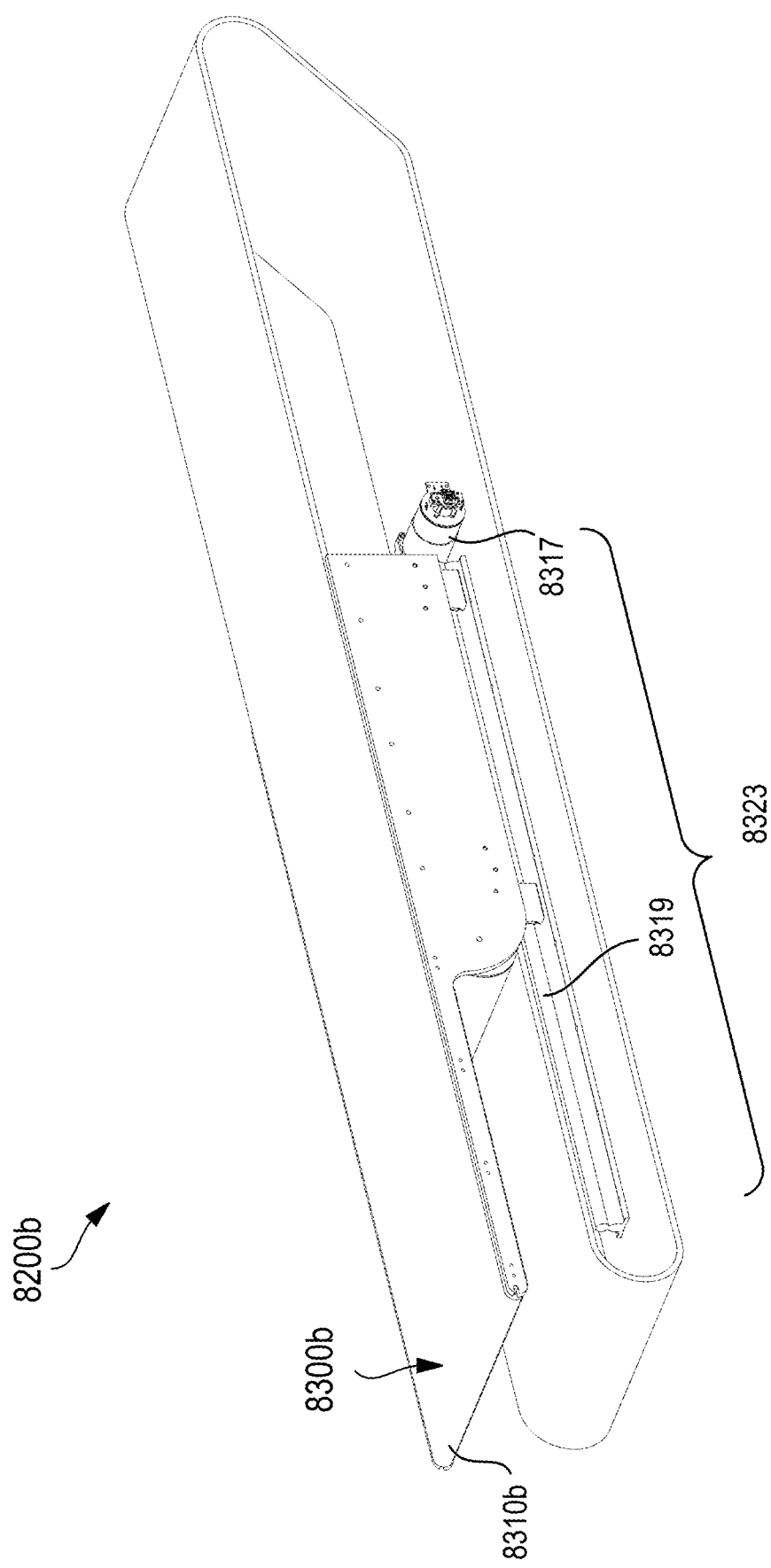
FIG. 21 depicts an implementation of a loading end of one of two parallel queue conveyors retracted.
Figure 24:
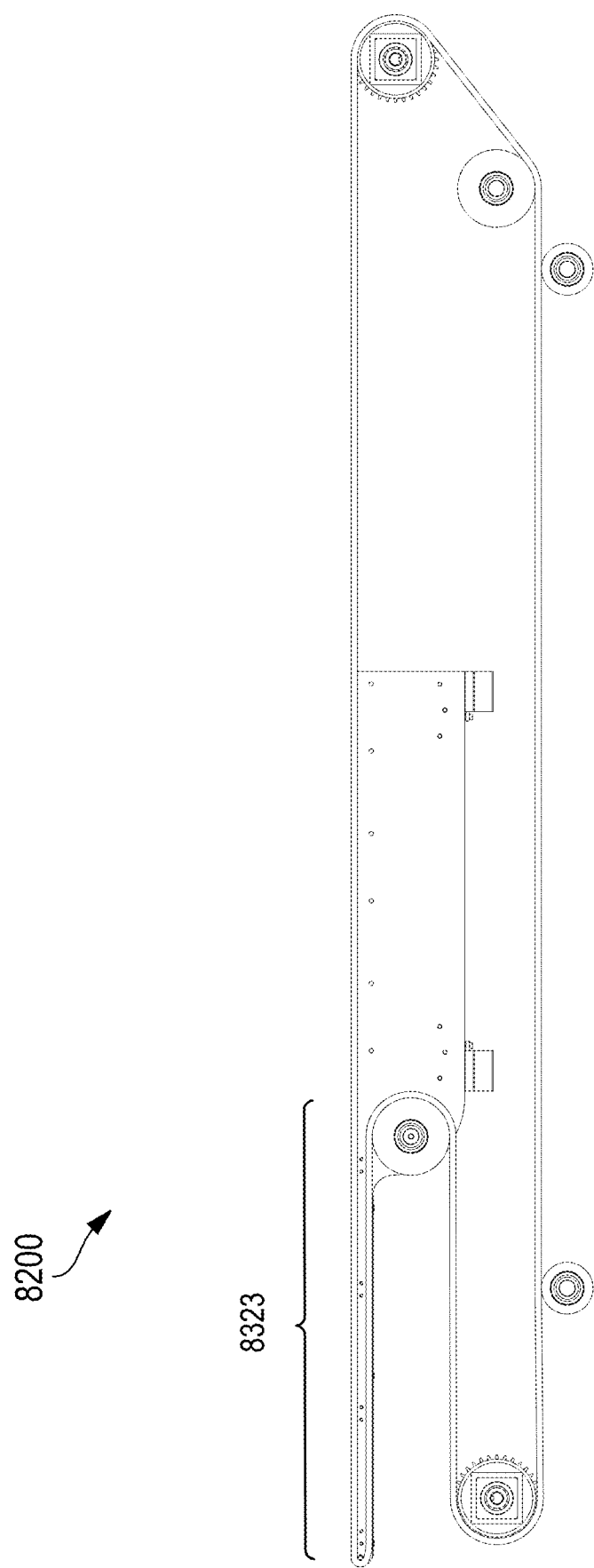
FIG. 24 depicts a side view of a retracted conveyor of FIG. 22.
Figure 25:
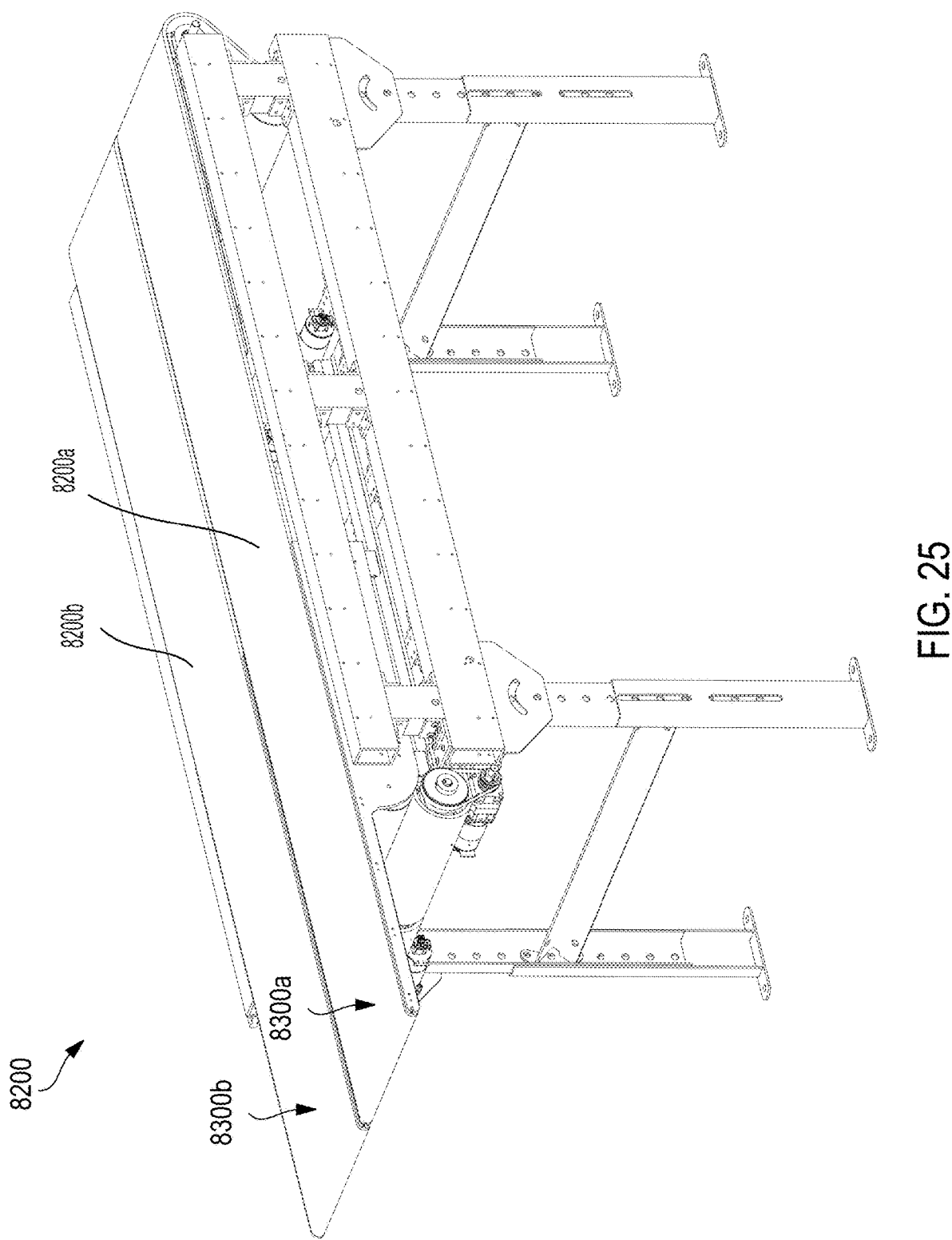
FIG. 25 depicts two parallel queue conveyors with their loading ends both extended.

FIG. 19 depicts an implementation of a loading end 8300b a far conveyor 8200b of two parallel queue conveyors 8200a-b extended out and the other near conveyor 8200a retracted. FIG. 20A depicts a side view of the two parallel queue conveyors 8200a-b of FIG. 19 with conveyor structure eliminated for clarity, and FIG. 20B depicts a cross sectional view of the retracted conveyor of FIG. 20A with the conveyor structure depicted. FIG. 21 depicts an implementation of a retracted loading end 8300b one of two parallel queue conveyors 8200a-b and its actuated carriage 8323 (comprising a leading edge nose roller 8310 and a snub roller 8315) disposed on rails 8319 and the extend drive motor 8317 configured to drive the carriage 8323 along the rails. This view depicts an embodiment of the moveable carriage 8323 portion of the conveyor 8200 that does the extending/retracing of a leading edge 8310. FIG. 22 depicts both of two parallel queue conveyors with their loading ends 8300a-b both retracted. FIG. 23 depicts a cross sectional side view of a retracted conveyor of FIG. 22. FIG. 24 depicts a side view of a retracted conveyor belt of FIG. 22 and its drive and support rollers, along with the movable extend carriage 8323, and illustrates which rollers are part of the actuated extend assembly of FIG. 21. FIG. 25 depicts both of two parallel queue conveyors with their loading ends 8300a-b both extended. FIG. 26A depicts a portion of the conveyor of FIG. 25 with the conveyor support structure omitted and showing just the belt, drive and support rollers, and the movable carriage of FIG. 21. FIG. 26B depicts a cross section side view of the two parallel queue conveyors 8200a-b of FIG. 25.

Figure 27:
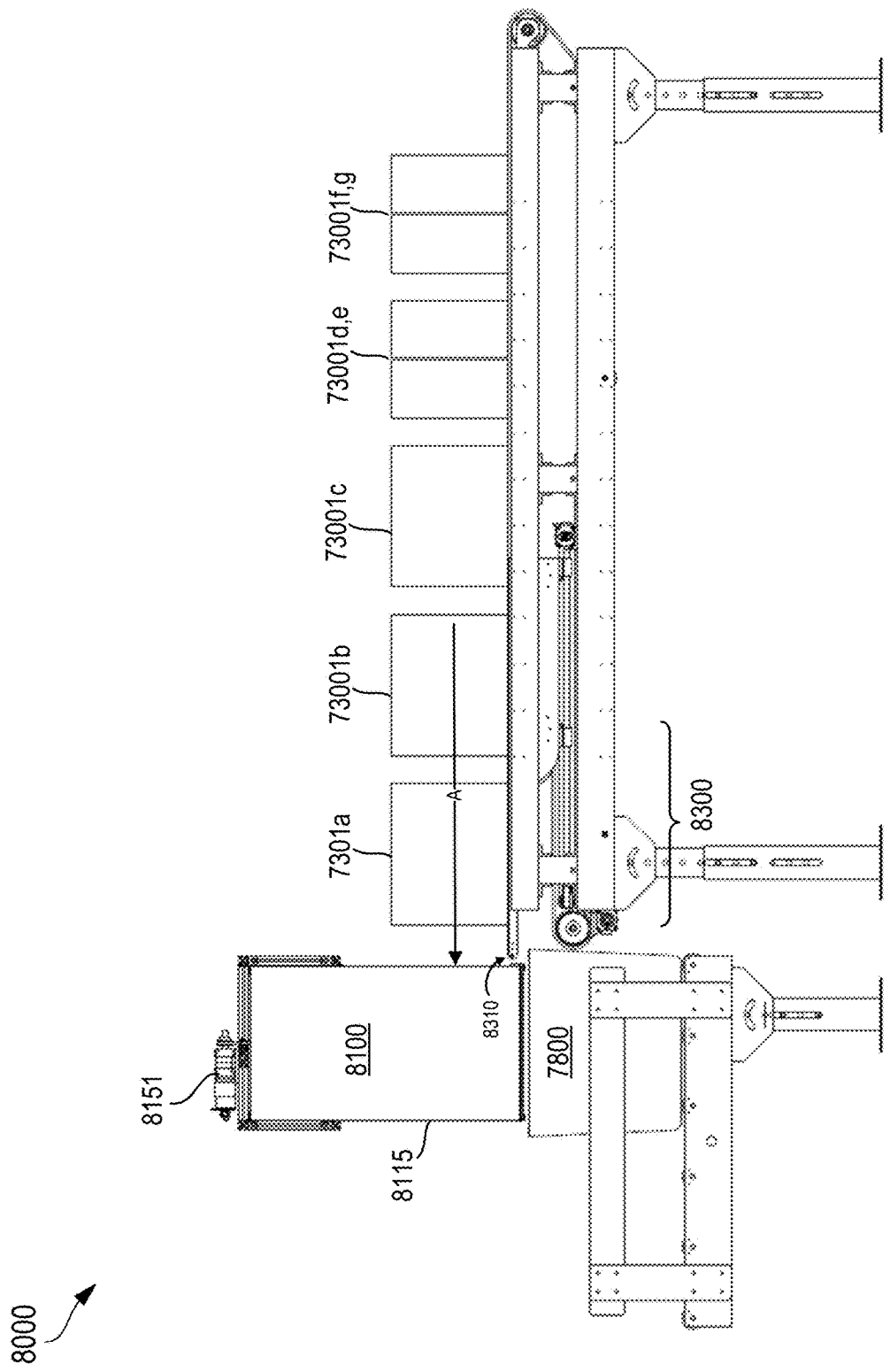
FIG. 27 depicts a side view of the system of FIG. 5 including an example loader conveyor in a retracted position.
Figure 28:
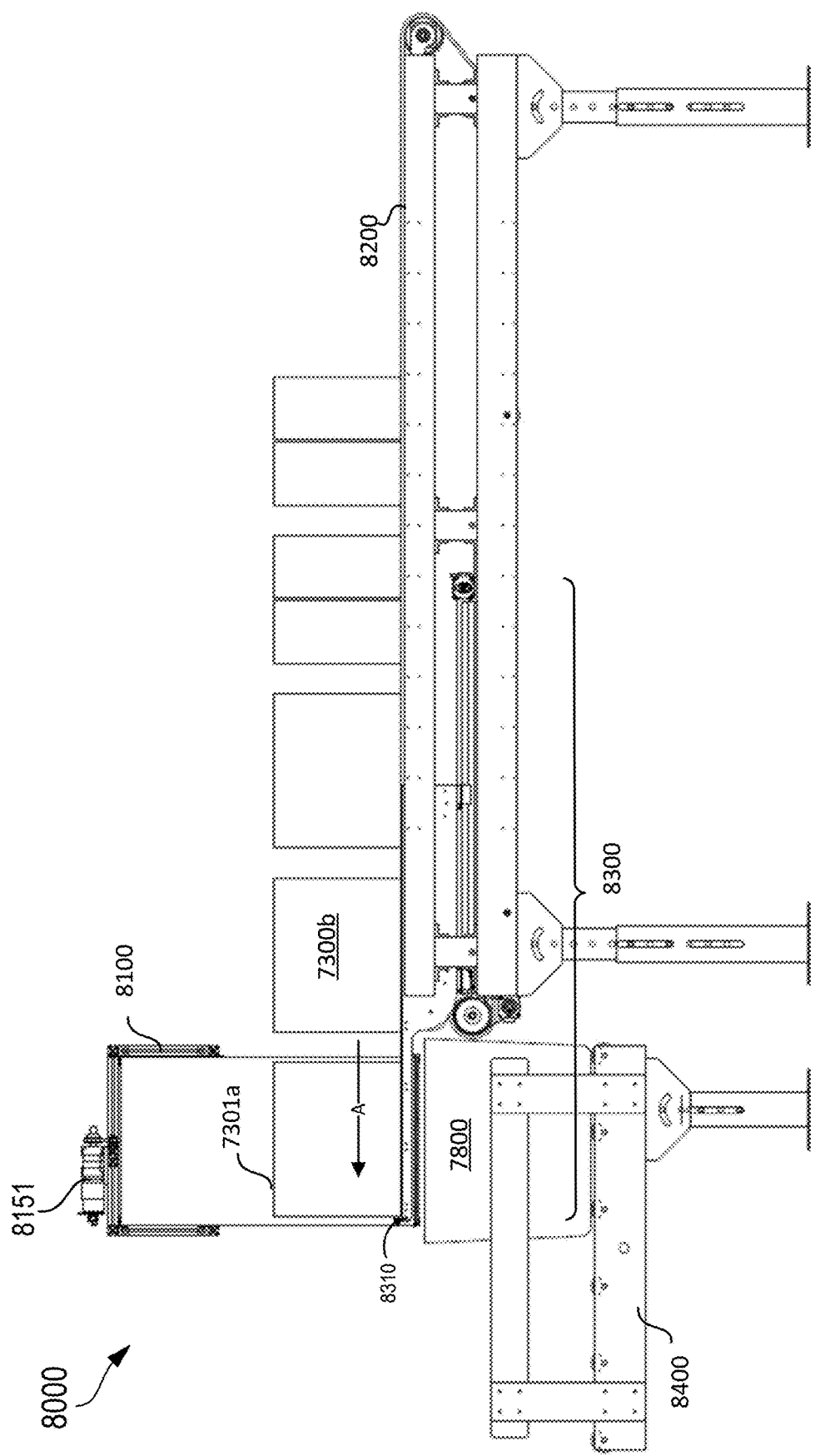
FIG. 28 depicts a side view of the system of FIG. 27 including an example load end of a queue conveyor in an extended position during loading of a folded laundry article or stack of folded laundry articles.
Figure 29:
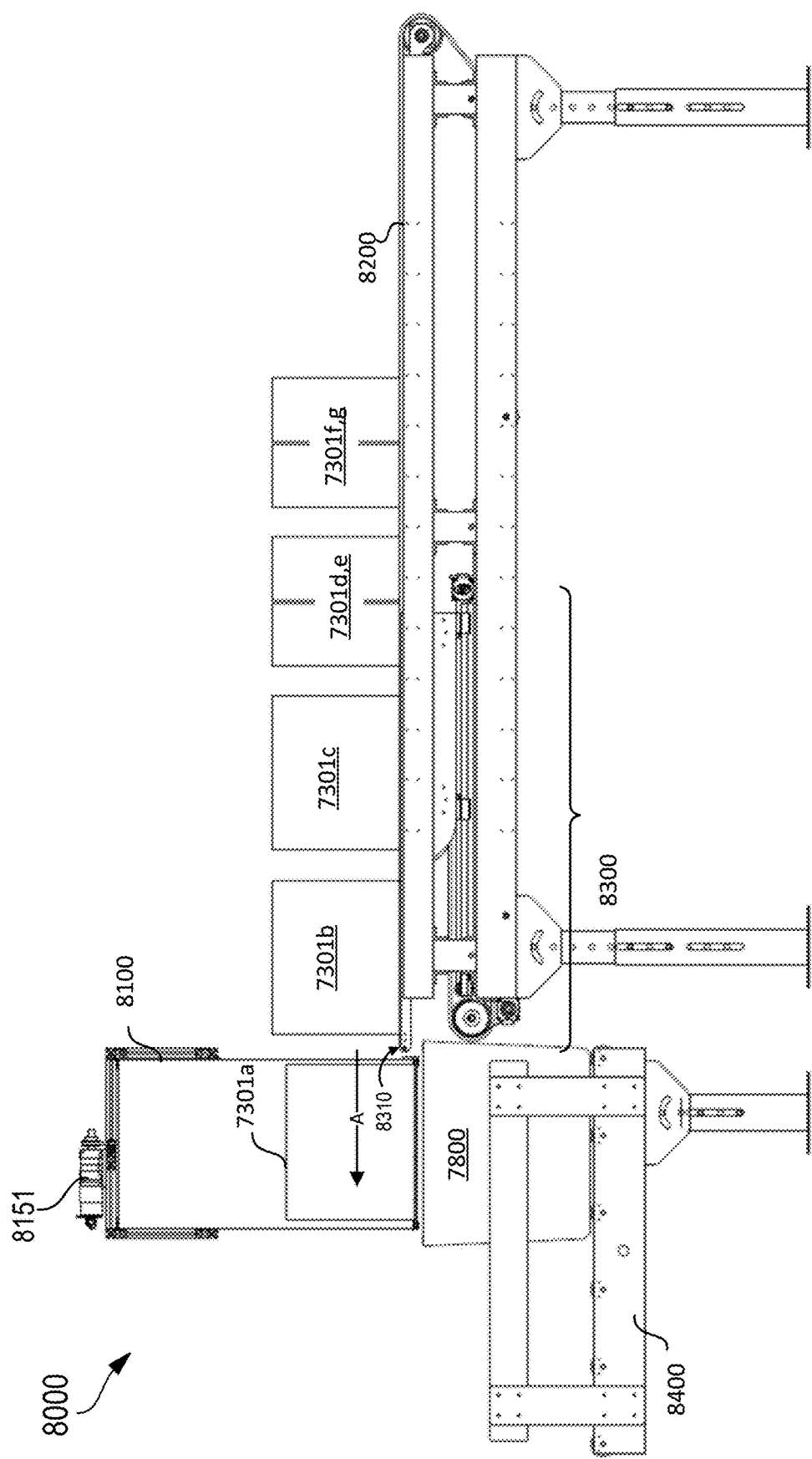
FIG. 29 depicts the system of FIG. 28 with the load end retracted and the folded laundry article or stack of articles deposited in a refillable cartridge.

As depicted in FIGS. 27-29, In implementations, each one of the two parallel conveyors 8300a-b is configured to extend its associated leading edge 8310a-b (collectively 8310 in side views) out to the rigid back wall 8115, rotate the associated conveyor belt 8312a-b to advance the at least one of the at least one unbound folded laundry article 7300a and the two or more stacks 7301b-g toward the rigid back wall 8115, and optionally rotating the conveyor belt 8312a-b while retracting backward to deposit at least one of an unbound folded laundry article 7300 or stack 7301 of articles into the refillable cartridge 8100. As described previously, the conveyor belt does not need to circulate to deposit the at least one article 7300 or stack 7301. In implementations, each one of the two parallel conveyors 8300a-b comprises a position sensor comprising at least one of as a hall sensor, a drive encoder, and a limit switch that detects the leading edge 8310a-b reaching the back wall 8115 of the refillable cartridge. In implementations, the position sensor outputs a signal to the nose extend drive 8320 via a sensor interface in communication with the nose drive through directly and/or through a processor 8305. Additionally or alternatively, the one or more drives 8320, 8325 and sensors 8330 of the retractable conveyor are in communication with the controller 8005 via a network interface 8340 in wired or wireless communication with the communication network 230. Additionally or alternatively, the loading ends 8300a-b are sized and their position calibrated relative to the refillable cartridge 8100 such that the leading edge 8310a-b reaches a position adjacent the back wall 8115 at full extension.

In implementations in which the loading ends 8300a-b comprise standalone placer conveyors, the stand alone placer conveyors (not shown) can comprise an inclined (e.g., angled) trailing end (e.g., a nose bar or "knife edge") abutting an oppositely inclined leading end of the movable queue conveyor 8200. By nesting the trailing end of the placer conveyor version of the loading end 8300 with the leading end of the queue conveyor, the top surface of each can be abutted up to each other with a negligible gap so that the top surfaces of both the loading end placer conveyor 8300 and the queue conveyor 8200 create a continuous plane on which the at least one unbound folded laundry article 7300 and stacks 7301 ride without any gaps, inclines, or declines that might otherwise cause the unbound folded laundry articles or stacks 7301 to topple and/or unfold. In such an implementation, each one of the two loading end placer conveyors 8300a-b and the queue conveyor 8200 (e.g., pair of parallel queue conveyors 8200a-b) are rotated together at the same speed by their respective conveyor drives 8215, 8325. Rotational speeds can be in a range of between about 2 in/sec to 20 inch/sec. In implementations, rotational speeds can be approximately 12 in/sec. Slowly ramping up speed, moving slowly, and stopping slowly all prevent the at least one unbound folded laundry article 7300 and stacks 7301 of unbound folded laundry articles from toppling during transit.

Although the two loading ends 8300a-b are herein described as pull nose conveyors with an extending and retracting leading edge 8310a-b, in other implementations, the two loading ends 8300a-b can comprise a cantilevered conveyor configured to entirely extend and retract, moving back and forth between the refillable cartridge and the queue conveyor. In other implementations, the loading ends 8300a-b can comprise independent conveyors supported by a wheeled base and driven back and forth between the refillable cartridge 8100 and the queue conveyor 8200, 8200a-b along a restraining track or pair of channels for receiving the wheels. Additionally or alternatively, the independent loading conveyor can be a single conveyor configured to move side to side on a sideways oriented track to pick up articles from a single queue conveyor or either queue conveyor of a pair of queue conveyor and also receive thereon an article with an area footprint wider than a single one of two parallel queue conveyors for passing off directly to a refillable cartridge without first being queued on a queue conveyor by a queuing placer. In this implementation, the independent conveyor has a longitudinal axis perpendicular to that of the loading queue conveyor and parallel to the loading direction of the queuing placer, and moves in the direction of its longitudinal axis.

Figure 45:
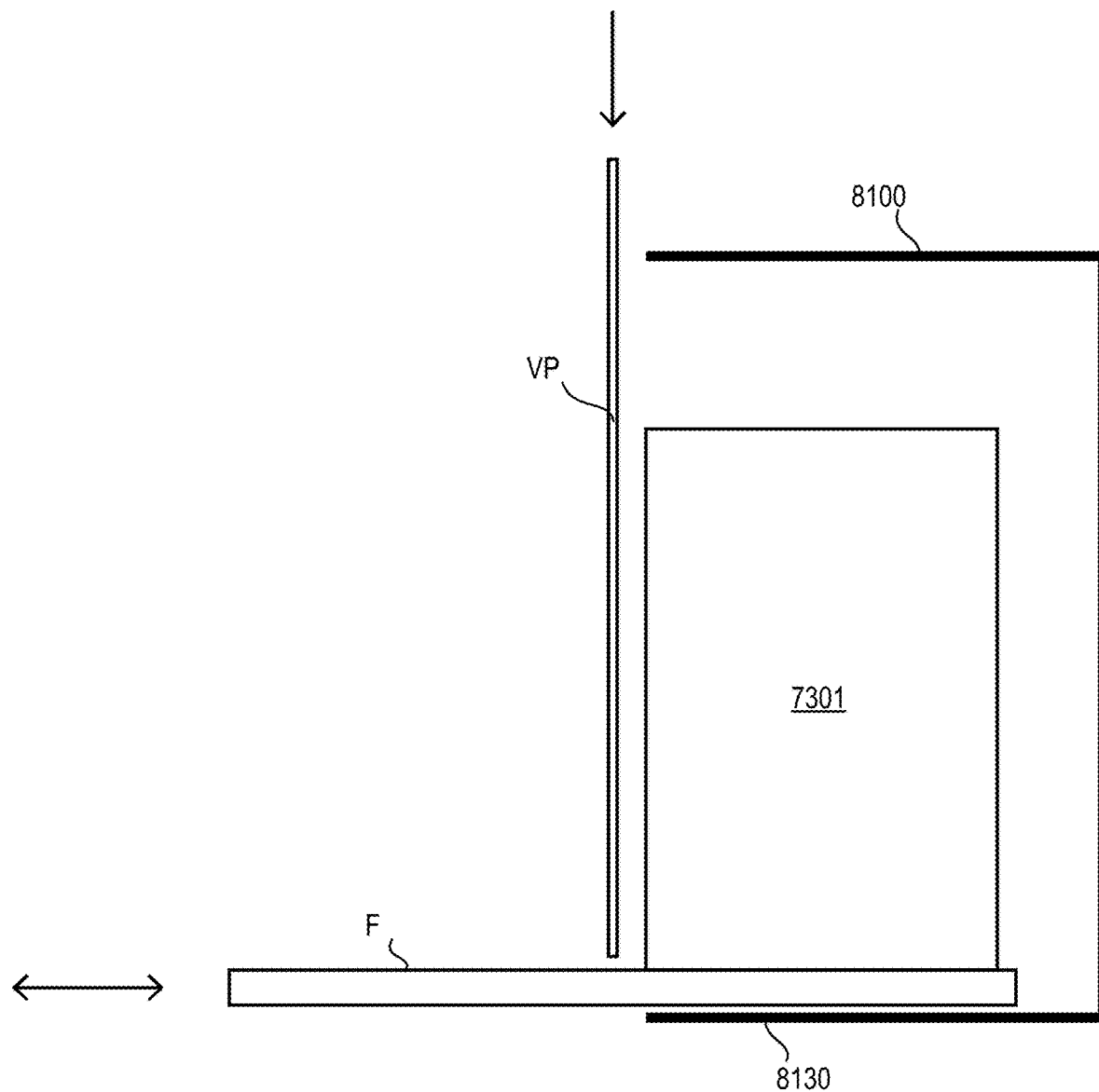
FIG. 45 depicts a schematic example of an example loader plate.

Alternatively, as shown in FIG. 45, instead of two pull nose loading ends 8300a-b, the system can comprise a flat surface F and a pusher that pushes stacks 7301 of folded laundry off of the flat surface F. The flat surface F would be made of a material having relatively low surface friction such that that stacks 7301 can be pushed off of the surface F onto the receiving surface of the refillable cartridge. The flat surface F can be extended into the refillable cartridge 8100 and then retracted depositing the stacks 7301 in the refillable cartridge 8100. In implementations, a vertically oriented plate VP can lower and hold the one or more stacks in place in the cartridge while the flat surface F is retracted.

Alternatively, as shown in FIGS. 46A-C, a combination placer fork PF and rotating loader belt LB is configured to receive a stack 7301 of folded laundry articles 7300 from the queue conveyor 8200 for loading into a refillable cartridge 8100. As shown in FIGS. 46A-B, the loader belts LB raise between fork teeth of the placer fork PF and rotate to receive the stack 7301 from the conveyor 8200. The loader belt then lowers, as shown in FIG. 46C, until the stack 7301 rests on the placer fork PF. The placer fork then extends into the refillable cartridge 8100 to place the stack 7301 and retracts to leave the stack 7301 deposited within the refillable cartridge 8100. In implementations, a plunger 8550 lowers to compress and hold the stack 7301 against the receiving surface 8130 or another already loaded folded laundry article 7300 or stack of folded laundry articles between the fork teeth prior to the placer fork PF retracting from the refillable cartridge 8100. The stack 7301 is then held in place by friction forces between the stack 7301 and the receiving surface 8130 or the stack 7301 and the already loaded article 7300 or stack of articles. Additionally, in implementations, a vertically oriented plate, such plate VP of FIG. 45, can lower and hold the one or more stacks in place in the cartridge while the fork retracts.

As previously described with regard to FIG. 3 and as shown in FIGS. 16 and 30A to 34B, in implementations, the refillable cartridge 8100 is configured to be engaged with a motorized lifter 8500 for raising and lowering the refillable cartridge 8100. The motorized lifter 8500 is configured to engage with the refillable cartridge 8100, and raise and lower the refillable cartridge 8100 to at least one of one or more loading positions (FIG. 17A, 30, 32) for receiving the at least one unbound folded laundry article, and an unloading position (FIG. 17B, 31A-B, 33A-B)) within the container 7800. The various lift positions can be dynamically determined and/or predetermined, and the motorized lifter 8500 can comprise at least one of a lift drive 8510, a position encoder 8515 (e.g., an incremental encoder on the back of the motor that determines incremental position from a limit switch), one or more hard stops, and a height sensor 8520 in communication with a processor 8505 and a sensor interface 8525 (FIG. 3). Additionally, in implementations, the motorized lifter 8500 comprises a network interface 8530 in at least one of wired and wireless communication with the communication network 230.

Turning now to FIGS. 30A-30B, in implementations, the motorized lifter 8500 comprises a carriage 8536 configured to receive thereon the refillable cartridge 8100. In implementations, the refillable cartridge 8100 can be affixed to the carriage 8536 by fasteners. The carriage 8536 is configured to engage one or more rails 8542 (any linear rails, such as SBR) affixed to a vertical support beam 8540. The carriage is driven by a ball screw 8534 in operative engagement with a motor 8532 and an intermediate gearbox 8533. In implementations, the one or more SBR rails 8542 comprise one or more hard stops 8543 limiting a bottom end of the vertical travel of the refillable cartridge and a hard stop at the top end of the vertical travel so that the nut doesn't disengage from the screw and the linear bearings don't disengage from the rails. Additionally, in implementations, the motor 8532 comprises a brake to prevent the refillable cartridge from dropping in an event of power loss. In all implementations, the structure of the motorized lifter 8500 is stiff enough to prevent sagging as folded articles are added to the refillable cartridge 8100.

Alternatively, in implementations (not shown), the motorized lifter 8500 comprises bearings for receiving two or more rails disposed on a top half of each one of the opposing rigid sidewalls of the refillable cartridge 8100. The two or more rails are configured to engage bearings disposed on a stationary support structure of the motorized lifter 8500. In implementations, the support structure can comprise two support columns, one disposed adjacent either side of the refillable cartridge 8100 for receiving the two or more rails. In implementations, the two support columns comprise at least one of a rack and pinion, timing belt drive, a counterweight, and a leadscrew configured to move the refillable cartridge upward and downward along the support structure.

Figure 38:
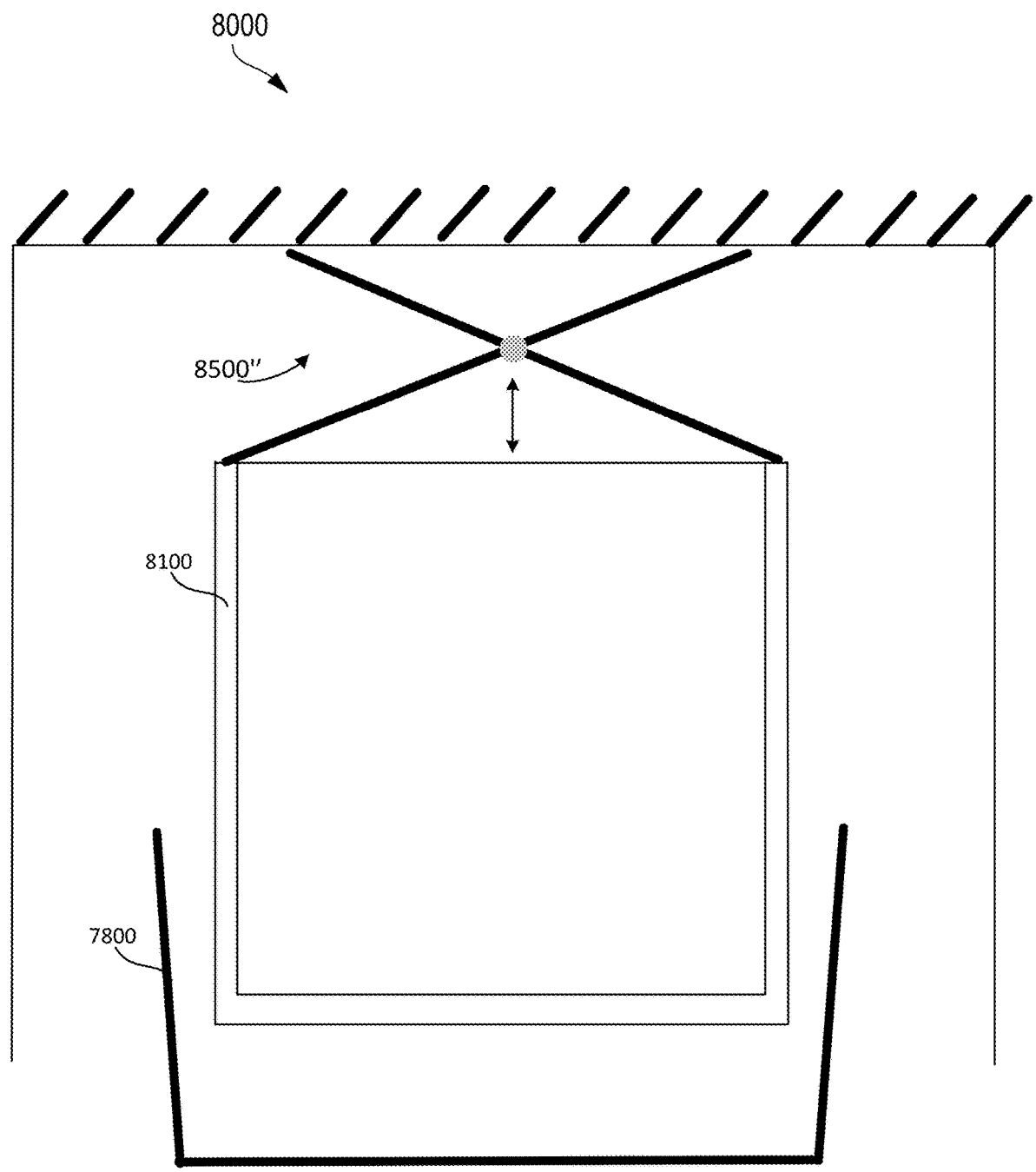
FIG. 38 depicts a schematic front view of a portion of the example system of FIG. 3 including an example overhead motorized lifter.

Alternatively, in implementations, as shown schematically in FIG. 38, the motorized lifter 8500" comprises an overhead scissor lift that is disposed entirely above the refillable cartridge 8100, out of the way of other moving devices of the system 8000, and ensures during actuation that the refillable cartridge raises and lowers in a level position.

Returning now to FIGS. 30A to 31B and 32A to 34B, the movable lifter 8500 is configured to raise and lower the refillable cartridge 8100 such that at least one of the removable receiving surface 8130 and a top surface of an unbound folded laundry article 7300 received within the refillable cartridge 8100 is positioned below a bottom surface of the at least one conveyor loading end 8300 prior to loading an unbound folded article into the refillable cartridge 8100. In implementations, the at least one of the receiving surface 8130 and the top surface of the unbound folded laundry 7300 received within the refillable cartridge is configured to be positioned below a bottom surface of the at least one conveyor 8300 by a distance in a range of between about 1 mm to 100 mm prior to loading.

In implementations, the refillable cartridge 8100 is configured to be lowered between one or more selectable loading heights and lowered to a preset unloading height within the container 7800. In implementations, at least one of the controller 8005 and the processor 8105 is further in operable communication with the lift drive 8510 of the motorized lifter 8500 and configured to raise and lower the refillable cartridge 8100 between the one or more selectable loading heights and the preset unloading height. In implementations, the at least one conveyor loading end 8300 is fixed at a predetermined height, and the motorized lifter 8500 further comprises one or more position sensors 8515 configured to sense at least one of a height of the motorized lifter 8500 and a distance traveled along the stationary support beam 8540. In implementations, the one or more position sensors 8515 comprises a rotary encoder disposed on a drive motor of the motorized lifter 8500, the rotary encoder being configured to output a signal to at least one of the processor 8505 and the controller 8005 indicative of an absolute of position of the removable receiving surface 8130 on the motorized lifter support structure 8540. Additionally or alternatively, the one or more position sensors comprises a depth sensor configured to detect a change in height relative to a known height at fixed position.

Figure 39B:
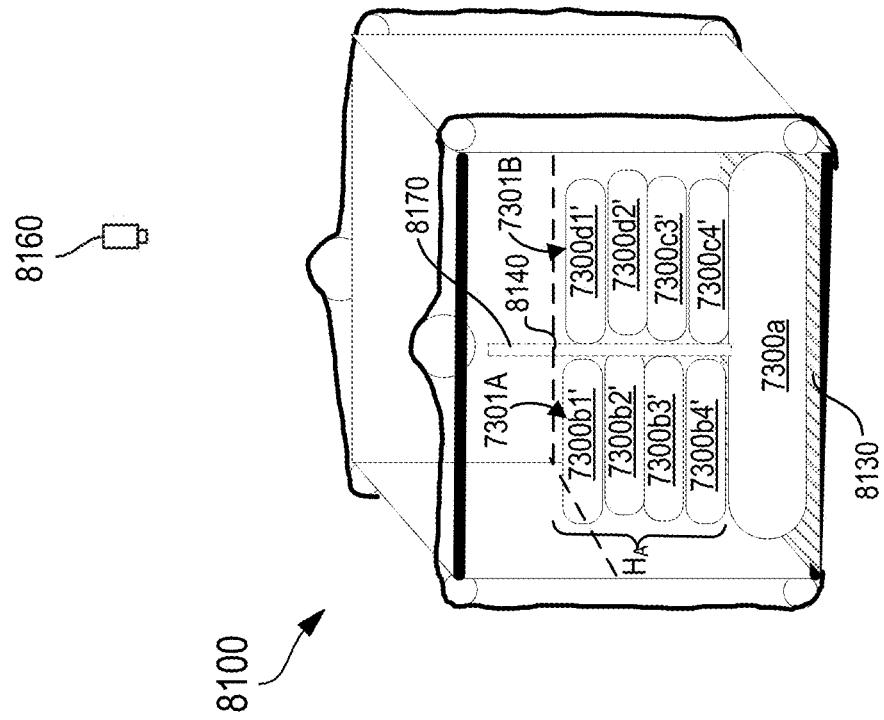
FIGS. 39A and 39B depict perspective schematic views of an example refillable cartridge of the system of FIG. 3 in partially filled and filled states.
Figure 39A:
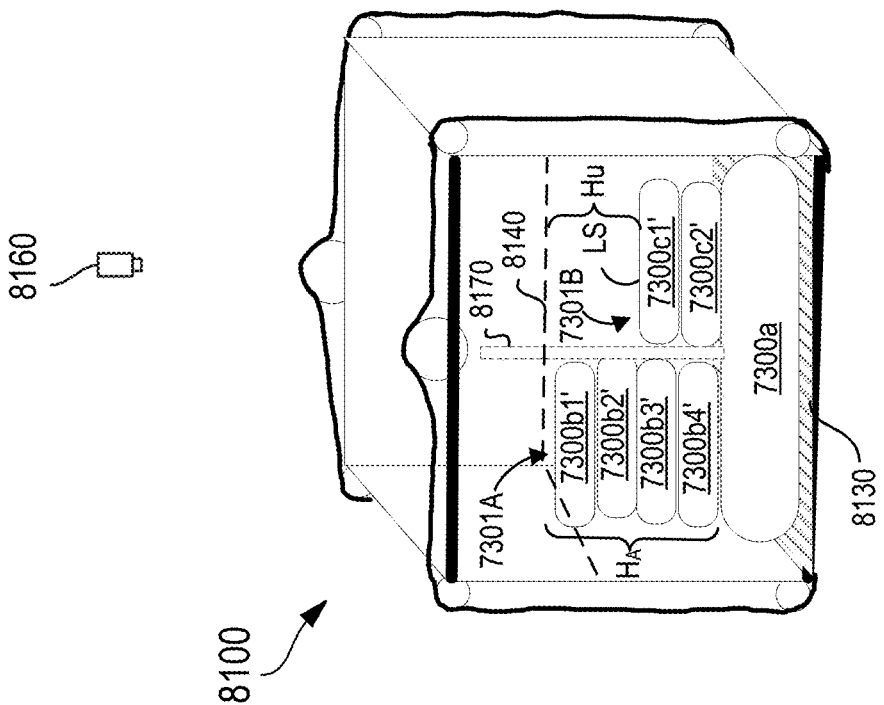

In implementations, the motorized lifter 8500 is configured to lower the refillable cartridge 8100 to the lowest top surface within the refillable cartridge 8100 to receive the next folded laundry article or stack of laundry articles on the lowest top surface. For example, as depicted in FIGS. 39A-B, the controller 8005 is configured to receive an output signal from the one or more position sensors 8515 and a sensed signal of at least one sensor (e.g., sensor 8160) in wired or wireless communication with the controller 8005, the sensed signal being indicative of a height of the at least one unbound article 7300 or stack 7301 received within the refillable cartridge 8100. Additionally or alternatively, in implementations, the system 8000 comprises a break-beam sensor in communication with the controller 8005 for indicating when a lowering stack is no longer sensed such that a top surface is detected. For example, a break-beam sensor can be positioned horizontally to detect the presence of one or more stacks 7301 in the cartridge. As the refillable cartridge lowers, the break beam sensor will detect when at least one of the two halves Half(a), Half(b) has no detectable stack at a set loading height in line with the loading ends 8300*a-b* or loading conveyors.

For example, in FIG. 39A, the height of the at least one unbound article received within the refillable cartridge comprises two heights, one for stack 7301A comprising a plurality of folded laundry articles 7300*a*, 7300*b*1'-*b*4', and one for stack 7301B, comprising a plurality of folded laundry articles 7300*a*, 7300*c*1'-*c*2' that have a cumulative height less than the stack height $H_A$ of the other stack 7301. In this case the lifter 8500 could lower the cartridge 8100 until the lower of the two stacks, 7301B, is in a position to receive another article 7300 or stack 7301*n* from the queue. The lifter 8500 thus lowers the refillable cartridge 8100 incrementally as stacks 7301 are added from the queue Qa-b to the lower of two sides (e.g., 7301B) until the queue Qa-b is empty and/or the container 7800 is full, and the cartridge 8100 can be fully lowered for unloading. In implementations, the at least one sensor 8160 configured to detect a height of the at least one unbound article received within the refillable cartridge 8100 is at least one of a break beam, a 3-D camera, an IR sensor, a 2-D camera, LIDAR, LADAR, a sonar proximity sensor, an ultrasonic ranging sensor, a radar sensor, and a pair of stereo depth cameras. In implementations, the at least one sensor 8160 can be configured to output 3-D image data to the at least one controller 8005. Additionally or alternatively, in implementations, the at least one sensor 8160 can be configured to output one or more 2-D images to the controller. In implementations the one or more sensors 8160 comprises a REALSENSE camera, positioned above the refillable cartridge 8100.

Based on the sensed one or more detected heights of the at least one unbound article 7300 or stacks 7301 of articles received within the refillable cartridge 8100 relative to the height of the removable receiving surface, the at least one controller 8005 is configured to determine whether the height of the at least one unbound folded laundry article 7300 or stacks 7301 of articles reaches the threshold height 8140. In implementations, the threshold height 8140 can be a range of heights slightly shorter than a maximum threshold height such that no additional folded laundry article could be received without exceeding the maximum threshold. In implementations, the threshold height 8140 of the refillable cartridge is equal to or less than the height Hc of the container 7800 such that by not exceeding the threshold height with received one or more unbound folded laundry articles 7300, the one or more unbound folded laundry articles 7300 delivered by the refillable cartridge to the container 7800 will not overflow the container 7800. Additionally or alternatively, as described previously with regard to implementations, the height of the stack height $H_A$ can exceed the height Hc of the container by a small amount (e.g., approximately 10 cm) if the stack is compressible to within the height Hc of the container. Additionally or alternatively, as described previously with regard to implementations, one containers-worth of stacks 7301*a-n* are queued at a single time and the one or more articles are stacked intelligently according to at least one of article type, size, and folded article orientation. A full container's worth of folded articles can be pre-queued on the queue conveyors 8200*a-b* and then queued in stacks before being loaded into the refillable cartridge. The queue conveyors 8200*a-b* can keep loading the refillable cartridge until the queued stacks are all loaded because they are already determined to fit within the target volume of the container 7800 as indicated by the threshold height Ht.

Alternatively, in implementations, the at least one controller 8005 is configured to determine an unoccupied height $H_U$ between the threshold height 8140 and at least one of the removable receiving surface 8130 and a top surface LS of an unbound folded laundry article 7301*c*1' received within the refillable cartridge 8100. Based on the determination of the unoccupied height $H_U$, the at least one controller 8005 is configured to at least one of: instruct the drive motor 8532 of the motorized lifter 8500 to lower the refillable cartridge 8100 until the output signal from the one or more position sensors 8515 is indicative of a lowest top surface LS of the at least one unbound article being below a bottom surface of at least one loading end 8300*a-b*, and instruct the drive motor 8532 of the motorized lifter 8500 to lower the refillable cartridge 8100 until the output signal from the one or more position sensors 8160 is indicative of the refillable cartridge 8100 being positioned at the unloading height within the container 7800.

Figure 31A:
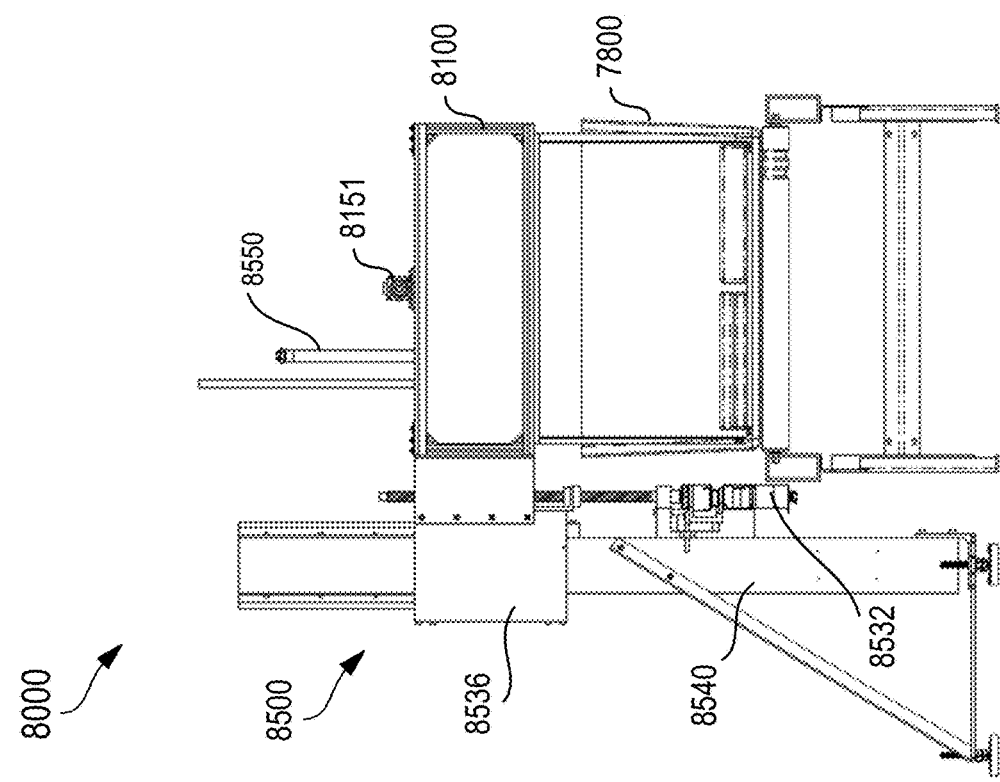
FIG. 31A depicts a front view of 30A with the refillable cartridge fully lowered within a container for delivering fold laundry thereto and with the container front wall cross sectioned to show the cartridge deposited therein.
Figure 32B:
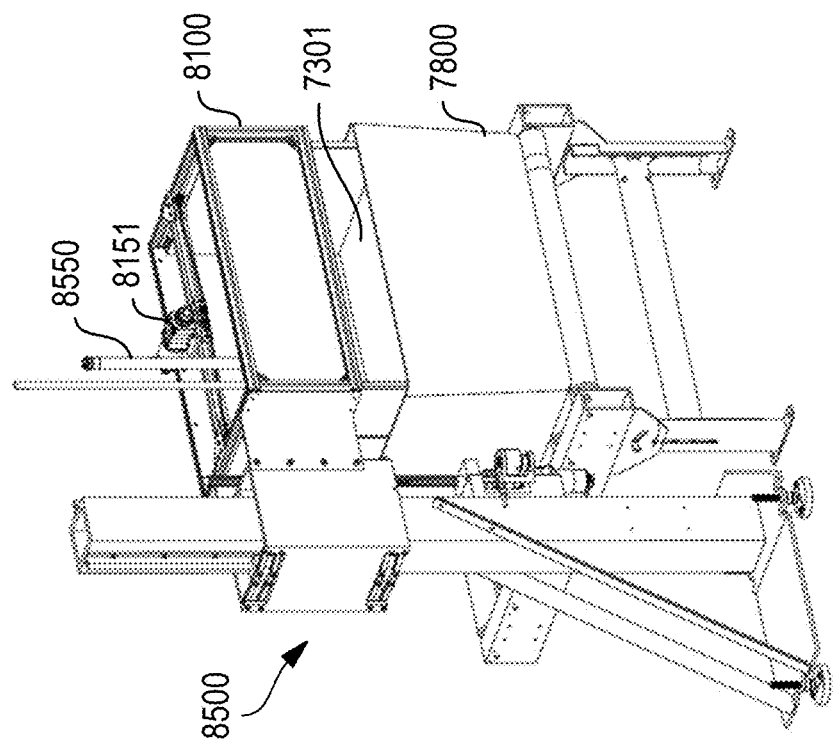
FIG. 32B depicts the system of FIG. 32A with the refillable cartridge fully lowered into a container thereunder.
Figure 32A:
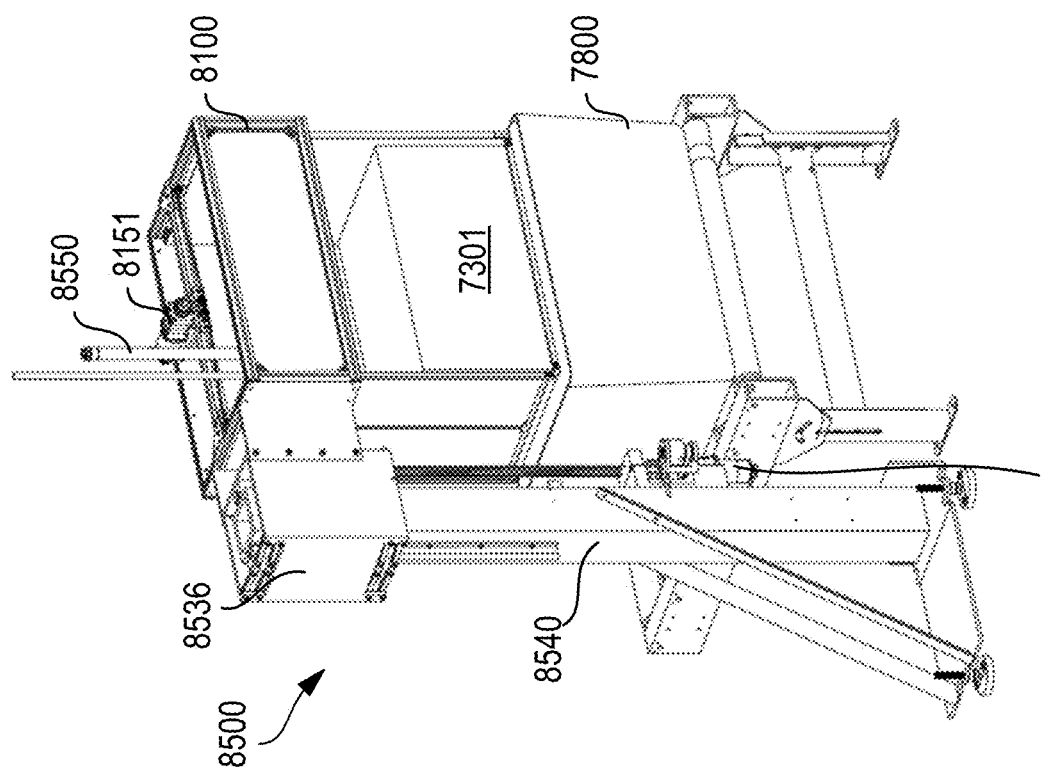
FIG. 32A depicts a perspective view of refillable cartridge disposed on a movable support for loading folded laundry into a container thereunder.

For example, in FIG. 39A, the plurality of folded laundry articles 7300*b*1'-*b*4' in the first stack 7301A reaches the threshold height 8140, and the plurality of folded laundry articles 7300*c*1'-*c*2' in the second stack 7301B has a top surface LS lower than the threshold height 8140. The unoccupied height $H_U$ is determined to be large enough to accommodate two additional unbound folded laundry articles 7300*d*1' an 7300*d*2' as depicted in FIG. 39B. Once the plurality of folded laundry articles in the two stacks 7301A-B reach or nearly reach the threshold height 8140 such that no additional folded laundry articles can be added to the refillable cartridge 8100 without exceeding the threshold height 8140, the at least one controller 8005 instructs the lift drive 8510 to lower the refillable cartridge 8100 to the unloading position within the container 7800 as depicted in FIGS. 31A, 33A, and 40A.

Although implementations of height sensing of one or more unbound folded laundry articles 7300*a-n* received within the refillable cartridge 8100 have been described in some implementations, additionally or alternatively, the controller 8005 is configured to determine whether or not the received one or more unbound folded laundry articles exceeds the threshold height by tracking the heights of the queued articles 7300*a-n* or stacks 7301*a-n* of articles on the queue conveyor 8200 and establishing their order along the parallel queues $Q_{1-2}$ for optimized filling of the refillable cartridge 8100. For example, the one or more unbound folded laundry articles 7300*a-n* can be queued in stacks 7301*a-n* of known heights. The controller 8005 can calculate the appropriate number of stacks to insert into the refillable cartridge 8100 to optimize filling the container 7800 with as little empty space as possible and without exceeding the hold volume of the container 7800. The controller 8005 is configured to queue folded laundry articles 7300*a-n* and stacks 7301*a-n* of folded laundry articles on the queue conveyor 8200 until a sum total of the stacks 7301*a-n* queued would fill the container 7800. Stacking on the queue conveyor 8200 is then paused and the queued stacks 7301*a-n* are then loaded into the container 7800.

Alternatively to queuing in stacks of predetermined height and increasing number, In implementations, queuing comprises queuing articles of an unknown number and type with proper sorting by article type and/or size until a fill container's worth of folded articles are queued. As previously described with regard to FIG. 8, in implementations, the platform 8200 comprises two parallel queue conveyors 8200*a-b*, and each one of the two parallel queues Qa-b is disposed on one of two parallel queue conveyors 8200*a-b*. In implementations, the two parallel queues Qa-b are laterally spaced, and stacks 7301*a-n* are staggered between near and far ones of the two parallel queues Qa-b. Additionally, in implementations, each pairing of staggered stacks 7301 (e.g., 7301*b* and 7301*c*) comprises substantially even stack heights. Alternatively, a pair of staggered stacks 7301 need not have to have even stack heights $H_A$ as long as the sum height of all the stacks 7301 on one side Qa-b is even with the sum height of all stacks on the other side. In implementations, the controller 8005 is in communication with a controller of a preceding robot, such as the controller 7005 of the folding robot 7000. The controller 8005 of the packing robot 8000 can communicate the cumulative height difference between the two sides of the queue $Q_{a-b}$ back to the folding robot controller 7005 and/or the processor 8805 of the placer conveyor 8855 so that it can distribute a newly added folded article 7300 to queue with the shorter sum total height to even the sum total heights between the queues $Q_{a-b}$. In implementations, pairs of staggered stacks comprise doubled-up categories so that an article type (e.g., pair of pants) of that paired category (e.g., pants) could be added to either stacked in either queue to help balance out the total sum of a particular queue Qa-b and keep the two halves of articles loaded into the refillable cartridge 8100 and then the container 7800 at relatively even height. This adds stability to the folded articles within the container during shipping and transport so that the articles remain folded for delivery to a customer.

Figure 33B:
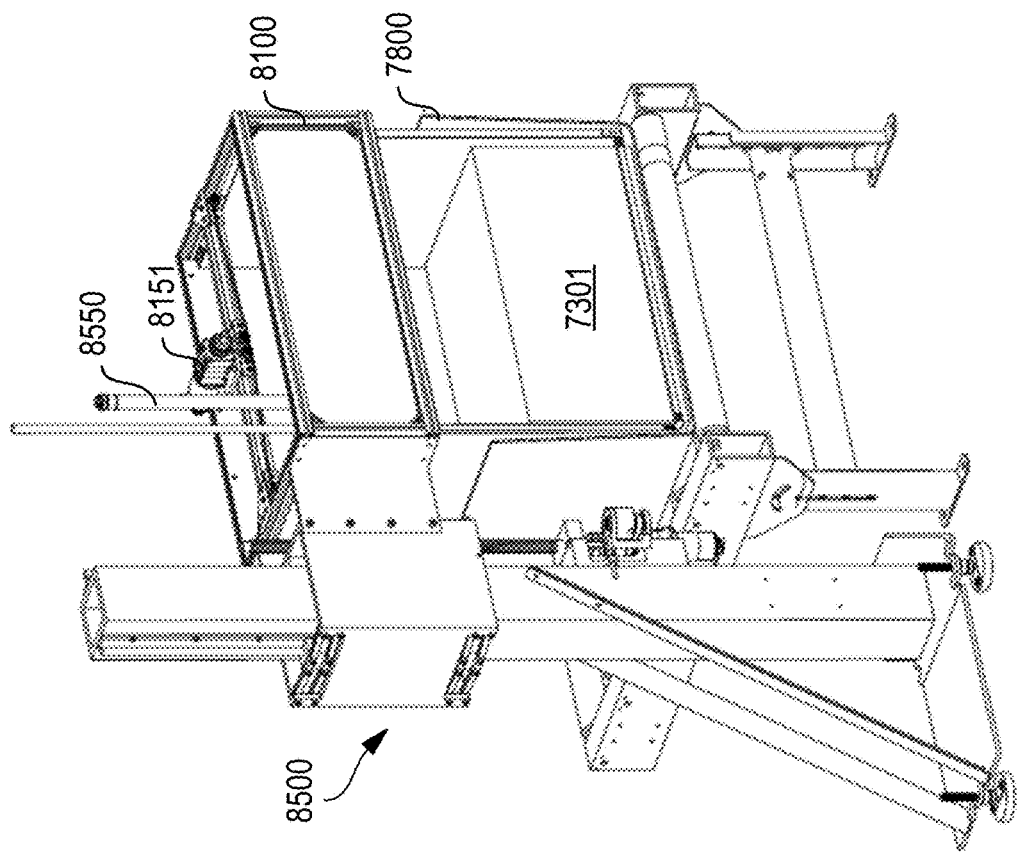
FIG. 33B depicts the view of 32A with the refillable cartridge fully lowered within a container for delivering fold laundry thereto with the receiving surface removed (e.g., retracted up the movable support side of the refillable cartridge) and with the container front wall cross sectioned to show the cartridge deposited therein.
Figure 33A:
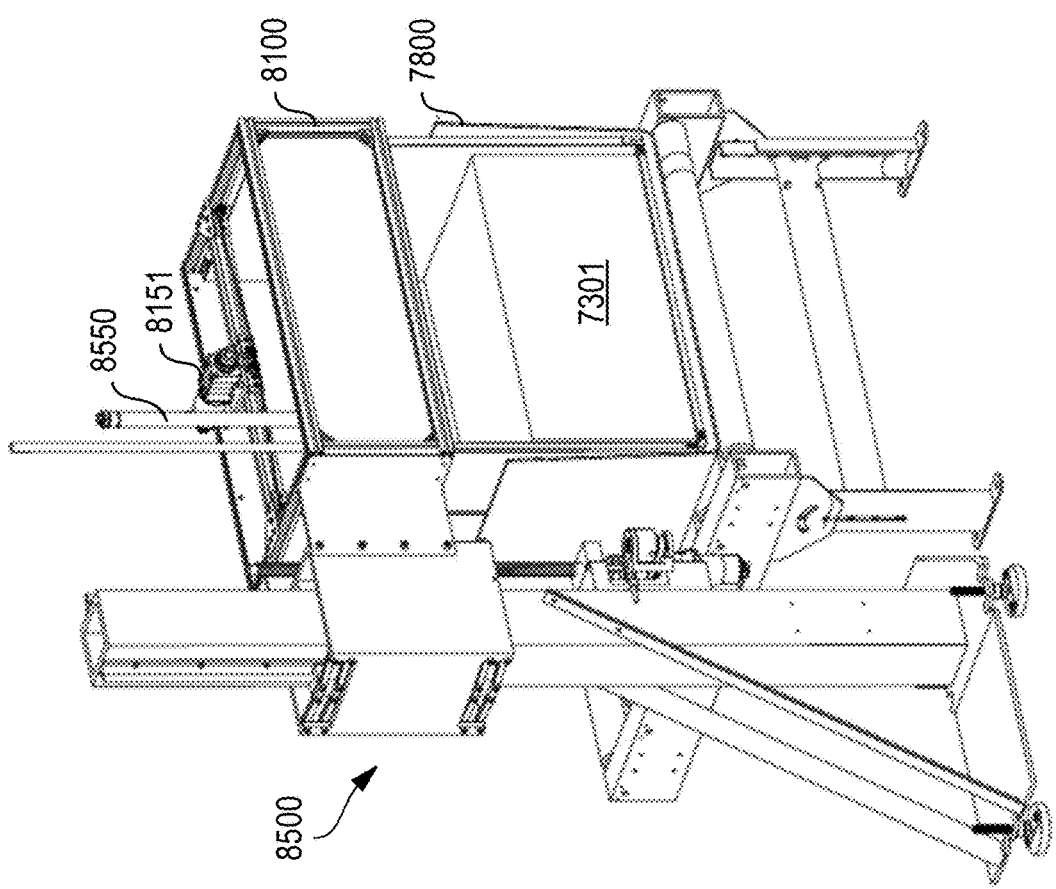
FIG. 33A depicts the view of 32B with the refillable cartridge fully lowered within a container for delivering fold laundry thereto with the receiving surface still in place and with the container front wall cross sectioned to show the cartridge deposited therein.

As shown in FIG. 33B, in implementations, the at least one controller 8005 is configured to instruct the at least one drive 8135 to retract the removable receiving surface 8130 in response to receiving a signal of the one or more position sensors indicative of the refillable cartridge 8100 being positioned at the unloading height. Additionally or alternatively, the actuation of the drive motor 8151 retracting the receiving surface 8130 can be triggered by a signal output from a proximity sensor (not shown) mounted at least one of in or on the exterior surface of the refillable cartridge or the interior surface of the container 7800.

In implementations, as shown in FIGS. 30A-31B, the motorized lifter 8500 comprises one or more plungers 8550 configured to engage the received at least one unbound folded laundry article 7300 received within the refillable cartridge 8100, apply a compression force, and retract from the at least one unbound folded laundry article 7300. Additionally or alternatively, in implementations, the one or more plungers 8550 are configured to remain engaged with the received at least one unbound folded laundry article 7300 or a stack 7301 during a descent of the refillable cartridge 8100 into the container 7800. In implementations, a plunger compression force comprises a range of between about 0.25 lbf to 5 lbf. In implementations, each pneumatic cylinder driving a plunger is driven by pressurized air at 20 PSI. In implementations, each one of the one or more plungers 8550 can comprise a plunger drive 8555 in operative communication with the one or more plungers 8550 and at least one position sensor 8560 disposed on the one or more plungers 8550$a$-$b$. The at least one position sensor 8560 is configured to sense a height of the at least one unbound folded laundry article 7300 or stack 7301 received within the refillable cartridge 8100 and output a signal indicative of the height to at least one of the processor 8505 and the at least one controller 8005. In implementations, the at least one position sensor 8560 comprises an encoder on a drive motor of the one or more plungers 8550 and/or a distance sensor measuring the height of at least one of the one or more the plungers 8550 from some fixed point. Alternatively, the one or more plungers 8550$a$-$b$ are actuated with at least one pneumatic cylinder. The compressive force of the one or more plungers 8550 is set by the size of the cylinder (e.g., the air pressure). This eliminates a need for load sensing such that the one or more plungers 8550 would always press down with a constant force. A distance sensor mounted above the one or more plungers 8550 then measures the height of the plunger and/or the height of the stack 7301 of folded laundry articles 7300$a$-$n$.

Additionally or alternatively, in implementations, a plate 8551 of the at least one plunger 8550 comprises a compliant surface therebeneath for accommodating a stack having an uneven height, or in the instance of the plate spanning more than one stack of varying heights, for accommodating a height variance across two stacks 7301. In implementations, the plate comprises a thin rigid material, such as metal or plastic, that is about ⅛" to ½" thick (e.g., 3 mm to 12 mm) and the complaint contact surface therebeneath comprises a compliant material such as a foam layer making the overall combined height of the plate and plunger between about ⅛" to 5" (e.g., 3 mm to 12 cm) deep in a vertical direction.

Additionally, in implementations, the at least one plunger 8550$a$-$b$ is a single plunger disposed within the refillable cartridge 8100 in alignment with a leading stack half (Half (a)), the half of the cartridge 8100 closest to the side on which the receiving surface 8130 retracts. Plunging the leading stack assists with preventing the folded articles in that stack 7301 from crumpling and/or unfolding as the receiving surface 8130 is retracted.

Although implementations of height sensing of one or more unbound folded laundry articles received within the refillable cartridge 8100 have been described in some implementations, additionally or alternatively, the controller 8005 is configured to determine whether or not the received one or more unbound folded laundry articles exceeds the threshold height by tracking the heights of the queue articles or stacks of articles on the queue conveyor and establishing their order along the parallel queues $Q_{1-2}$ for optimized filling of the refillable cartridge 8100. For example, the one or more unbound folded laundry articles 7300$a$-$n$ can be queued in stacks 7301$a$-$n$ of known heights so that the at least one controller 8005 can calculate the appropriate number of stacks 7301 to insert into the refillable cartridge 8100 to optimize filling the container 7800 with as little empty space as possible and without exceeding the hold volume of the container 7800. Additionally or alternatively, in implementations, one containers-worth of stacks 7301$a$-$n$ are queued at a single time and the one or more articles are stacked intelligently according to at least one of article type, size, and folded article orientation. A full container's worth of folded articles can be pre-queued on the queue conveyor 8200 and then queued in stacks before being loaded into the refillable cartridge. For example, the articles can be stacked in two queues Qa-b and each queue's sum total height can be approximately even with the other queue's sum total height for even loading of a container, as described previously with regard to implementation.

In implementations, the selected location) for depositing each folded laundry article of a plurality of folded laundry articles 7300$a$-$n$ is one of a plurality of predetermined locations along the packing queue conveyors 8200$a$-$b$ at which to deposit the folded laundry article. Additionally, in implementation, one containers-worth of stacks 7301$a$-$n$ are queued at a single time. Alternatively, in implementations, an ordered packing queue Qa-b can be determined based on information about article sizes provided by a previous robot in the process line, such as the dirty laundry separating and sorting robot 3000, and the controller 8005 can predetermine locations of area footprints of folded articles on one or more packing queue platforms 8200$a$-$b$ or vertically stacked queue platforms 8200$a$ and platforms 8200$b$ (FIG. 44) so as to fill a smallest number of packing containers 7800 (e.g., packing boxes or bags) as fully as possible and reduce physical labor of delivery personnel and delivery vehicle wear and tear. In implementations, each one of the predetermined queue locations comprises at least a horizontal position along the length LQ of the packing queue conveyor 8200 or platform. In implementations, the plurality of predetermined locations can be designated in advance of queuing a plurality of folded laundry articles 7300$a$-$n$ such that designated areas of the packing queue platform or conveyor 8200 are designated for receiving articles of at least one of one or more particularly sized area footprints (W*L) and one or more article types or other sorting categories.

Alternatively, the at least one controller 8005 can be configured to execute a predictive modelling routine (e.g., algorithm running on a processor 8015) that maps out the queue location of each one of the laundry articles in a plurality of household laundry articles 7300$a$-$n$ that has been folded or will be folded. For example, the one or more article types and one or more article sizes of the plurality of folded household laundry articles are detected by one or more sensors of one or more preceding autonomous devices. The one or more preceding autonomous devices comprise at least one of the autonomous folding device 7000 and at least one autonomous separating device 3000, 5000 configured to separate individual items from the plurality of household laundry articles. The at least one controller 8005 is in operable communication with the one or more preceding autonomous devices and predetermines queue locations for each one of the plurality of household laundry items based on the known (e.g., detected) quantities of each article type and size preceding the packing queue and a predicted folded article area footprint for each one of plurality of household laundry items.

Figure 44:
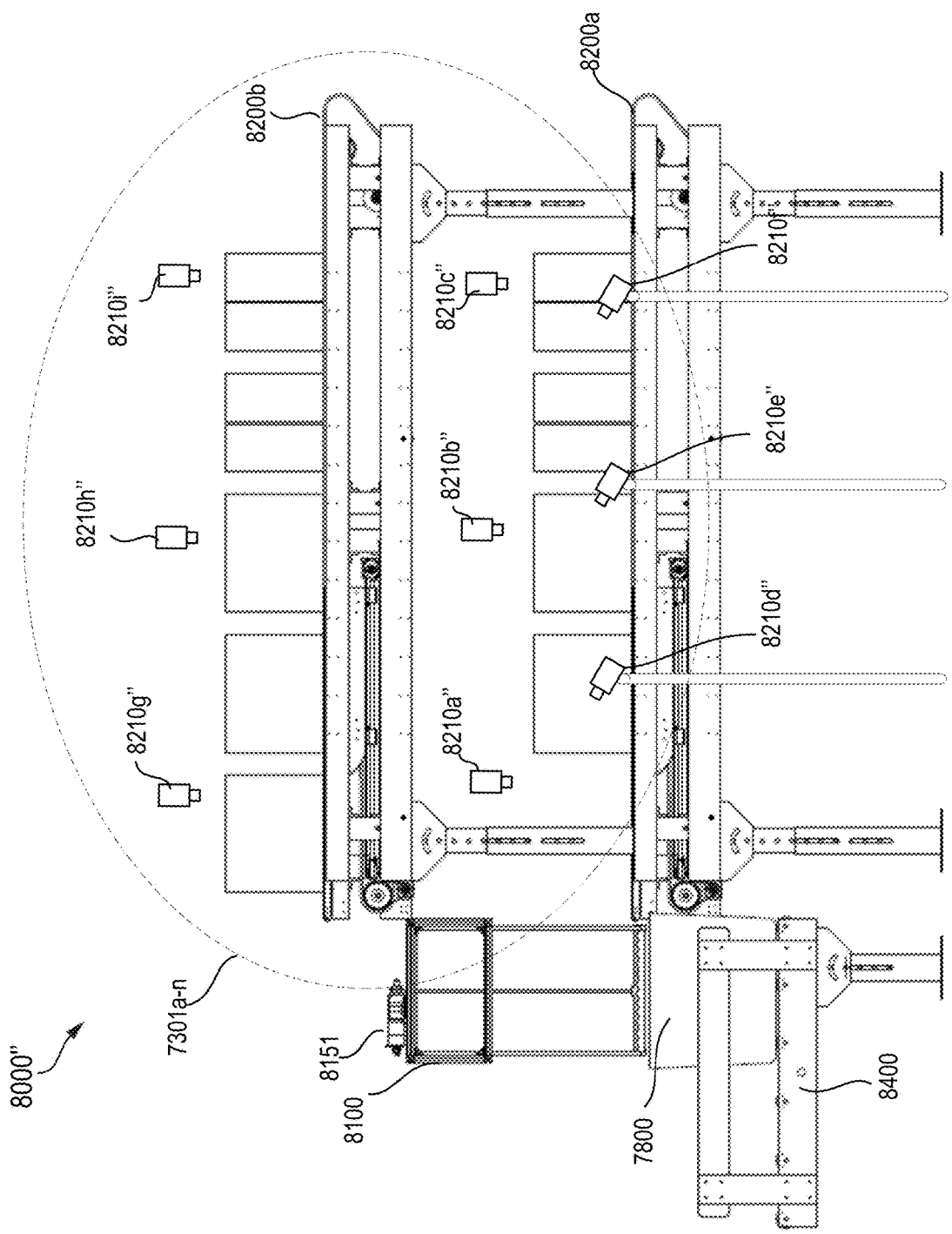
FIG. 44 depicts an example of a system for packing folded laundry articles disposed on in two or more stacked queue surfaces.

Additionally or alternatively, in implementations, as depicted in FIG. 44 the packing queue platform comprises two or more vertically stacked platforms 8200$a$-$b$, which can be conveyors or static holding shelves or a combination of one or more static holding shelves positioned above a packing queue conveyor. A cantilevered conveyor 8855 can distribute folded laundry articles 7300$a$-$n$ belonging to a single household among the two or more vertically stacked platforms 8200$a$-$b$ and store in a database at least one of the area footprint, height, and article type of each of the stacks of folded laundry articles. The cantilevered conveyor 8855 can then redistribute folded laundry articles and/or stacks of folded laundry articles from the upper shelf 8200$b$ or shelves onto the packing queue conveyor 8200$a$ for combining articles 7300$a$-$n$ and stacks 7301$a$-$n$ in order for fully loading the containers while producing a smallest number of partially filled containers 7800 to return to a customer household. This reduces the amount of space occupied in a delivery truck, the amount of effort for a delivery driver to return the containers, and reduces the risk of folded items toppling within a partially filled container 7800.

In implementations, such as that of FIG. 44, the vertically stacked platforms are two or more queue conveyors 8200$a$-$n$ and the refillable cartridge 8100 is configured to be actuated vertically at the height of each conveyor to accept stacks from any of the stacked queue conveyors 8200$a$-$n$. In this system 8000" predetermined sorting locations are based on at least one of stack size and article type and folded articles 7300$a$-$n$ and stacks 7301$a$-$n$ of one or more folded articles are loaded sequentially into the cartridge 8100 for loading one or more containers 7800, but there's much more room for more predetermined sorting categories than along a single queue conveyor. This is important in the sorting algorithm because each possible sorting category has its own predetermined location, allowing the conveyor 8855 to sort and queue new folded articles 7300 as they arrive without needing to know in advance what is in the load of laundry (e.g., plurality of deformable articles 7330$a$-$n$). For example, if the controller 8005 does not know a large article of dimensions 12×20" (e.g., a towel) is arriving for queuing and several stacks of smaller articles are queued, the conveyor 8855 can place the article with the larger area footprint further back in the queue Q$a$-$b$ on one of the queue conveyors 8200$a$-$b$ to leave space for each category in advance. In this way, the conveyor can always add articles in a preferred order for loading by spacing them out along and among two or more queue conveyors.

Figure 41:
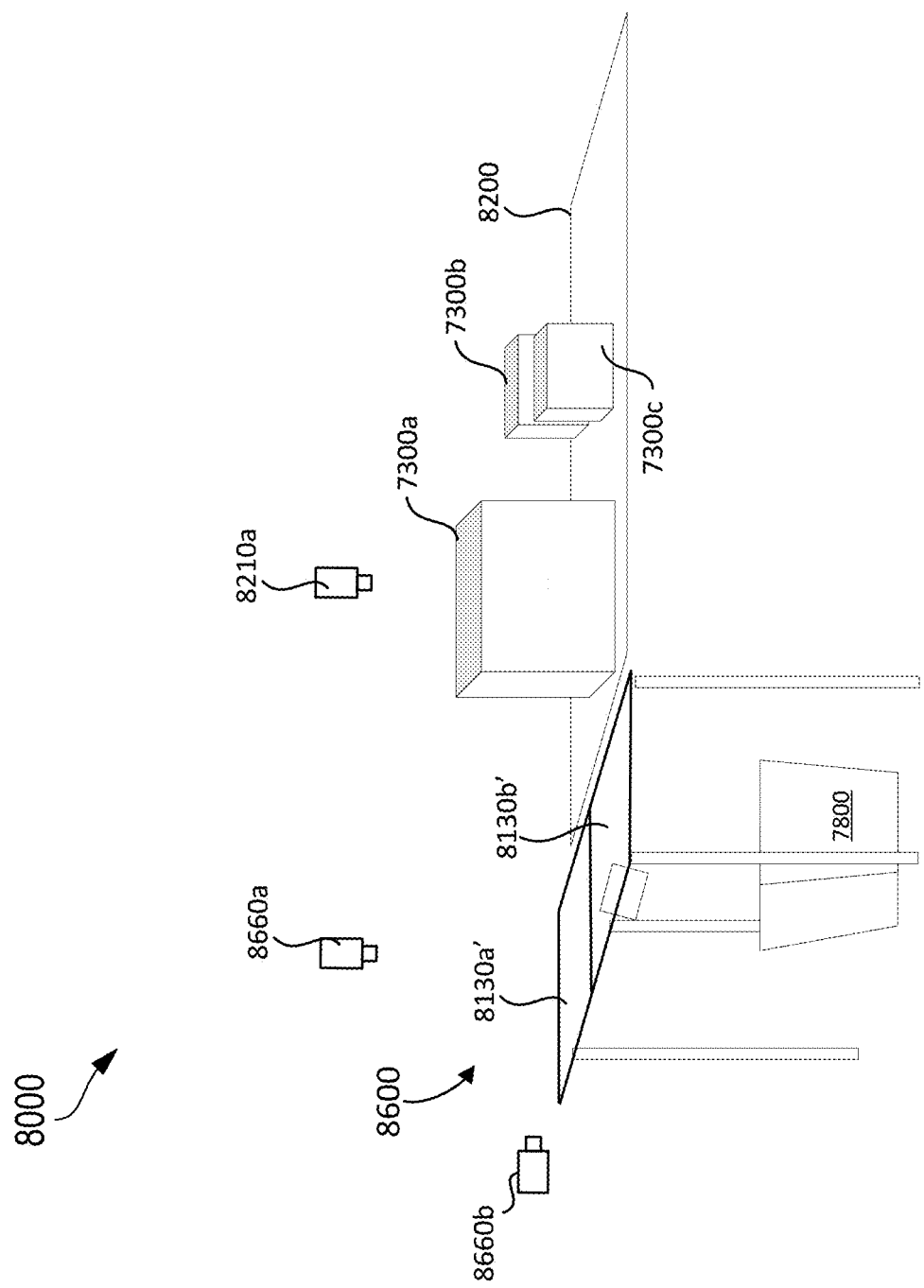
FIG. 41 depicts a schematic example of a trap door device for delivering folded laundry articles to a packing container.

In addition to the implementation of the refillable cartridge 8100 described herein having a removable receiving surface that retracts up an outside wall of at least one of the opposing rigid sidewalls, other implementations, as shown in FIG. 41, can include a trap door 8600 configured to receive one or more unbound folded laundry articles or stacks of unbound folded laundry articles directly from the queue conveyor 8200 or from one or more placer conveyors 8300 disposed there between. The trap door 8600 can open to release the folded laundry articles 7300$a$-$n$ disposed thereon into a container 7800 positioned therebeneath. In implementations, two or more side-by-side stacks of folded laundry articles 7300$a$-$n$ can be disposed on the trap door and a middle support wall can be inserted between the side-by-side stacks for added stability during loading and packing. For example, the middle support wall can be lowered into place between the two detected side-by-side stacks of folded laundry articles.

Figure 42A:
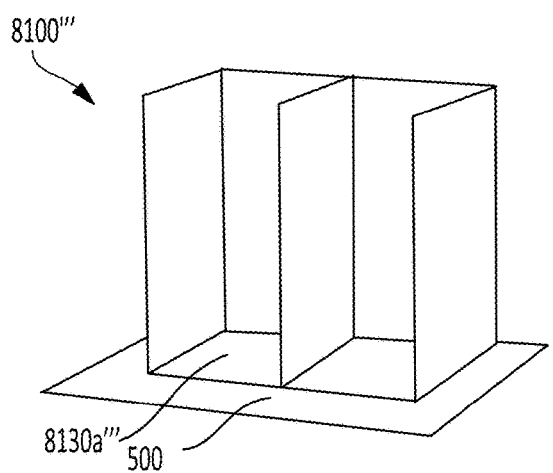
FIGS. 42A-42C depict schematic examples of a rotating cartridge for delivering folded laundry articles to a packing container.
Figure 42B:
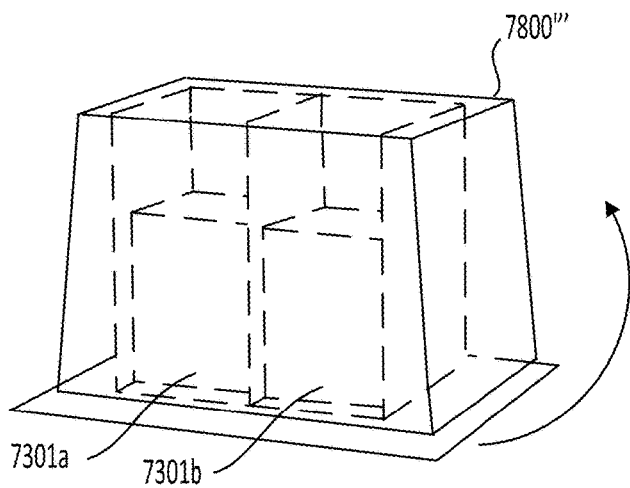
Figure 42C:
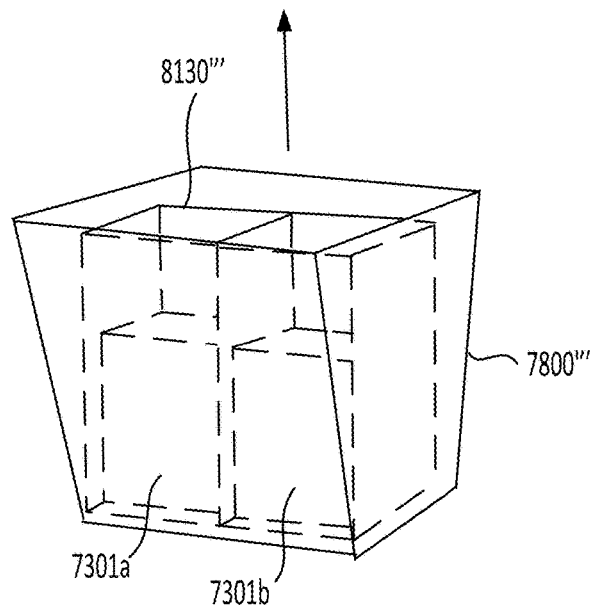

In yet another implementation, as depicted in FIGS. 42A-C, the refillable cartridge 8100' is disposed on and affixed to an inversion platform 500. In implementations, the inversion surface forms the receiving surface 8130'. The refillable cartridge 8100''' can be vertically actuated or held at a fixed height and loaded from one or more vertically movable loading conveyors (not shown) configured to deliver unbound folded laundry articles and stacks of folded laundry articles or stacks 7301$a$-$b$ into the refillable cartridge 8100'''. Once the refillable cartridge is loaded, a container 7800''' is placed upside down over the refillable cartridge 810' (FIG. 22B) and the inversion platform and everything thereon is flipped upside down (FIG. 22C), and the refillable cartridge 8100' vertically raised from the container 7800' leaving the stacks 7301$a$-$b$ deposited within the container 7800'. Additionally or alternatively, the inversion platform flips and the container 7800''' drops down to a receiving surface with the stacks 7301$a$-$b$ of folded laundry articles deposited therein.

Figure 43:
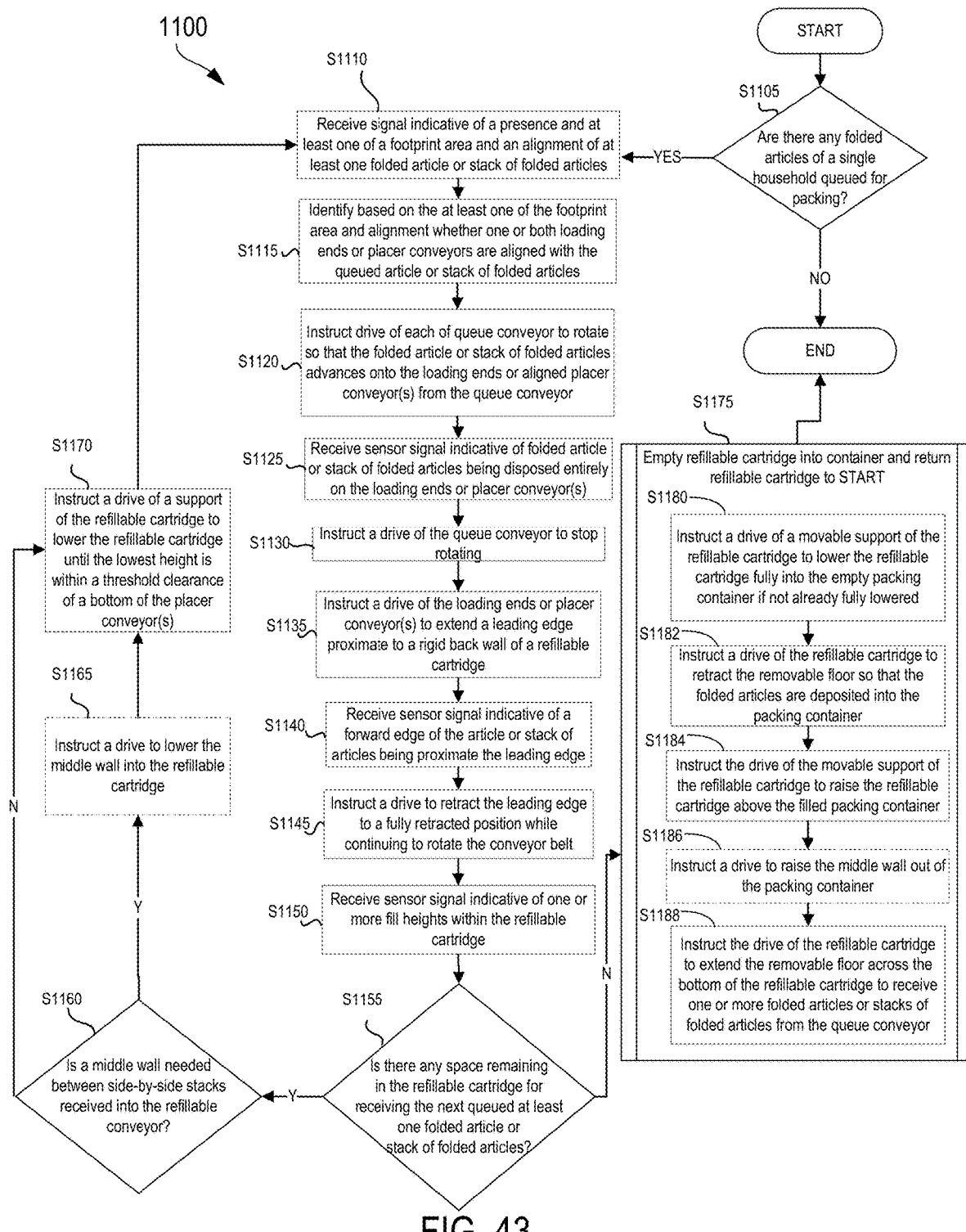
FIG. 43 depicts an example method of packing unbound folded household laundry articles into a shipping container.

Referring now to FIG. 43, any of the examples and implementations described previously with regard to the system 8000 are applicable to implementations described herein with regard to a method 1100 of robotically packing a container 7800 with one or more unbound folded laundry articles 7300$a$-$n$ or stacks 7301$a$-$n$ of unbound folded laundry articles comprising household laundry. The method 1100 of packing is configured to be executed autonomously by one or more controllers, and the one or more controllers are configured to be in operative communication with the one or more processors, sensors, and drives of the system 8000 described with regard to all of the preceding implementations, including that of FIG. 3. In examples, the one or more controllers are configured to communicate with each device of the system 8000 over a communication network 230 via at least one of wired and wireless communication protocols.

In implementations, the container conveyor 8400 disposed beneath the refillable cartridge 8100 is instructed by the controller 8005 to advance an empty container 7800 to a resting position below the refillable cartridge 8100 and assigning S1182 and receiving at the controller a unique customer identifier associated with the empty container 7800, the unique customer identifier being associated with the at least one of a folded laundry article 7300 and one or more stacks 7301 of folded laundry articles that will be loaded into the container.

In implementations, the method 1100, then comprises iterating a filling sequence one or more times, and stopping iterating upon the determining that either the received one or more unbound folded laundry articles 7300$a$-$n$ reach or nearly reach a threshold height 8140 of a refillable cartridge 8100 or that the remaining fillable height is less than a remaining stack 7301 of queued folded laundry articles 7300 waiting to be placed into the refillable cartridge 8100. The filling sequence comprises determining S1105 whether there are any folded articles of a single household queued for packing on a queue conveyor 8200. In implementations, the determination is based on a sensor signal of one or more sensors 8160, 8210 disposed proximate the queue conveyor 8200 as described previously with regard to implementations. Additionally, in implementations, the sensor signals can detect queued folded laundry articles for a single household disposed on one or more stacked queue conveyors 8200*a-b* or static holding shelves 8200*b* accessible by the cantilevering queuing and stacking conveyor 8855 (FIG. 16), as indicated in the schematic drawing of FIG. 44.

Returning to FIG. 43, if a determination is made that the one or more unbound folded laundry articles are queue for packing, the method comprises receiving S1110, at a controller 8005, one or more output signals from one or more sensors in communication with the controller. The sensor signals can be indicative of at least one of an area footprint and an alignment of at least one folded laundry article or stack of folded laundry articles disposed on a queue conveyor adjacent a pair of parallel loading conveyors. The method comprises identifying S1115 based on the at least one of the area footprint and alignment whether one or both loading ends 8300*a-b* or independent placer conveyors are aligned with the queued article or stack of folded laundry articles, instructing S1120 a drive of each of the queue conveyor 8200*a-b* and, in some implementations, the aligned one or both independent placer conveyors to rotate so that the folded laundry article or stack of folded articles advances onto the aligned one or both loading ends 8300*a-b* or independent placer conveyors, receiving S1125, at the controller, a sensor signal indicative of the folded laundry article or stack of folded articles being disposed entirely on the loading ends 8300*a-b* or aligned one or both placer conveyors, instructing S1130 a drive of the queue conveyor to stop rotating, instructing S1135 a nose extend drive of the loading ends 8300*a-b* or independent placer conveyors to extend a leading edge 8310 proximate to a rigid back wall 8115 of a refillable cartridge 8100, receiving S1140 a sensor signal (e.g., output signal of sensor 8160) indicative of a forward edge of the folded laundry article 7300 or stack 7301 of folded laundry articles being proximate the leading edge 8310 of the conveyor, and instructing S1145 a drive of the aligned one or both loading ends 8300*a-b* or independent loading conveyors to retract to a fully retracted position while continuing to rotate the one or both of conveyor belts 8312 in a forward direction to deposit the folded laundry thereon off of the leading edge 8310 and into the refillable cartridge 8100.

In implementations, the method comprises receiving S1150 a sensor signal indicative of one or more fill heights within the refillable cartridge, and determining S1155, based on the sensor signal, whether any space remains in the refillable cartridge 8100 for receiving a next queued at least one folded laundry article or stack of folded laundry articles. As described previously, the sensor signal is output from a sensor disposed proximate the refillable cartridge 8100, and the sensor is in at least one of wired and wireless communication with the controller 8005.

If space remains, the method optionally comprises determining S1160, based on a sensor signal, a detected side-by-side configuration of two stacks 7301 of folded laundry articles inside the refillable cartridge 8100 and a need for a middle support wall or dividing wall 8170 (FIGS. 39A-40B) to be inserted between the side-by-side stacks for added stability during loading and packing. The method optionally comprises instructing S1165 a dividing wall drive 8565 of a motorized lifter 8500 to lower a removable dividing wall 8170 into the refillable cartridge 8100 between the two detected side-by-side stacks 7301*b*, 7301*c* of folded laundry articles, as shown in FIG. 40A. Additionally or alternatively, the method comprises determining, based on the sensor signal, that a stack of folded laundry articles is disposed entirely within one bilateral half (e.g. FIG. 5, Half(a), Half (b)) of the refillable cartridge 8100 and instructing the dividing wall drive 8565 of the motorized lifter to lower a removable dividing wall 8170 into the refillable cartridge between the bilateral halves of the refillable cartridge to keep the one stack 7301 from tipping until another stack 7301 is loaded beside it for stability.

Additionally or alternatively, in implementations, because some stacks 7301 of folded laundry articles 7300*b-g* can be queued on separate ones of parallel queue conveyors 8200*a-b*, the method can comprise instructing parallel loading ends 8300*a-b* or independent placer conveyors to load several smaller stacks from one of the two parallel queues $Q_{a-b}$ at a time to help keep the loaded stacks 7301 even in the refillable cartridge 8100. Additionally or alternatively, the queue conveyor 8200 can comprise two side by side, separately actuated conveyors with extendible loading ends built into the conveyors. The loading ends 8300*a-b* or parallel conveyors need not alternate to achieve a final loaded height in the refillable cartridge 8100 that is even across the tops of two or more loaded stacks. For example, two stacks 7301 of folded laundry articles could be loaded from one queue of two parallel queues $Q_{a-b}$ before one stack was loaded from the other. Additionally or alternatively, in implementations, sorting categories can be duplicated in each one of the two parallel queues $Q_{a-b}$ such that folded laundry articles 7300 can be placed in either queue $Q_{a-b}$ regardless category. The controller 8005 therefore can be configured to sort the folded laundry articles on the queue conveyor 8200 solely based on a cumulative height of each queue from the refillable cartridge loading end to the opposite end of the queue. Additionally or alternatively, the queue conveyor 8200 can be a single conveyor accommodating a single queue of folded laundry articles placed by a single loading end or placer conveyor into a refillable cartridge 8100.

Returning to the method 1100, in implementations, determining S1155, based on the sensor signal, whether any space remains in the refillable cartridge 8100 for receiving a next queued at least one folded laundry article or stack of folded laundry articles, comprises determining one or more fill heights of the at least one folded laundry article 7300 or stacks 7301 of folded laundry articles within the refillable cartridge 8100, and determining, based on the one or more fill heights, whether sufficient space remains in the refillable cartridge 8100 for receiving the next queued at least one folded laundry article or stack of folded laundry articles. For example, the sensor 8160 can be a point cloud camera configured to detect the one or more fill heights, and the controller 8005 can use the output signal to break an area footprint of the refillable cartridge into two or more discrete "columns" each having a width and length in x, y dimensions of the area footprint. The two or more discrete columns can be, for example, two columns, one assigned to each bilateral half (e.g., FIG. 5, Half(a), Half(b)). Because the sensor has a preset, known static distance to the removable receiving surface 8130, the sensor can detect a height (including a high point, or maximum height) of a stack of folded laundry articles from the receiving surface for each column in a bilateral half of the refillable cartridge. Optionally, the method can include calculating a filled volume of the refillable cartridge by resolving a volumetric rectangle equation of width*length*height for each column and totaling the calculated volumes of each column. The method can optionally include comparing this volume to a threshold volume of the container 7800.

In implementations, the next queued at least one folded laundry article 7300 or stack 7301 of folded laundry articles has a measured height communicated at least one of wired and wirelessly from a queue conveyor sensor to the controller 8005. The method comprises instructing S1170 a drive of a movable support of the refillable cartridge to lower the refillable cartridge 8100 until a lowest fill height is within a threshold clearance of a bottom of the aligned one or both loading ends 8300*a-b* or placer conveyors. In implementations, the threshold clearance is in a range of between about 1 mm to 100 mm.

Although implementations of height sensing of one or more unbound folded laundry articles received within the refillable cartridge 8100 have been described in some implementations, additionally or alternatively, the method comprises tracking the heights of the queue articles or stacks of articles on the queue conveyor and establishing their order along the parallel queues $Q_{1-2}$ for optimized filling of the refillable cartridge 8100. For example, the one or more unbound folded laundry articles can be queued in stacks of known heights. The method comprises calculating the appropriate number of stacks to insert into the refillable cartridge to optimize filling the container 7800 with as little empty space as possible and without exceeding the hold volume of the container 7800. The controller 8005 is configured to queue folded laundry articles and stacks of folded laundry articles on the queue conveyor 8200 until a sum total of the queued stacks would fill the container. Stacking on the queue conveyor is then paused and the queued stacks are then loaded into the refillable cartridge 8100.

The method 1100 comprises, upon determining S1105 either that no additional folded laundry articles of a singled household are queued for packing or determining S1155 that no space or sufficient space remains in the refillable cartridge for receiving the next queued at least one folded laundry article or stack of folded laundry articles, instructing emptying S1175 the refillable cartridge 8100 into the container 7800 disposed therebeneath and instructing the drive to the raise the empty refillable cartridge to a height parallel to the queue conveyor for receiving another household's load of folded laundry articles.

In implementations, the method of emptying 1175 the refillable comprises instructing S1180 a drive of a movable support of the refillable cartridge to lower the refillable cartridge fully into the empty packing container if not already fully lowered. Because the moveable support 8500 lowers the refillable cartridge 8100 into the container 7800 disposed thereunder during each lowering and filling of successive stacks 7301, the refillable cartridge likely is already at the bottom of the container 7800 prior to unloading. In other implementations, the refillable cartridge may not be fully loaded and may require lowering to the bottom of the container prior to unloading, for example prior to unloading a partial load comprising the final articles of a folded load of laundry. Fully lowering the cartridge 8100 into the container 7800 reduces any drop height that might cause folded articles to unfold when the receiving surface 8130 is removed. Once the refillable cartridge is positioned at the bottom of the container or just above the inner bottom surface of the container, the controller instructs 1182 a drive of the refillable cartridge to retract the removable floor so that the folded articles are deposited into the packing container.

Figures 34A, 34B:
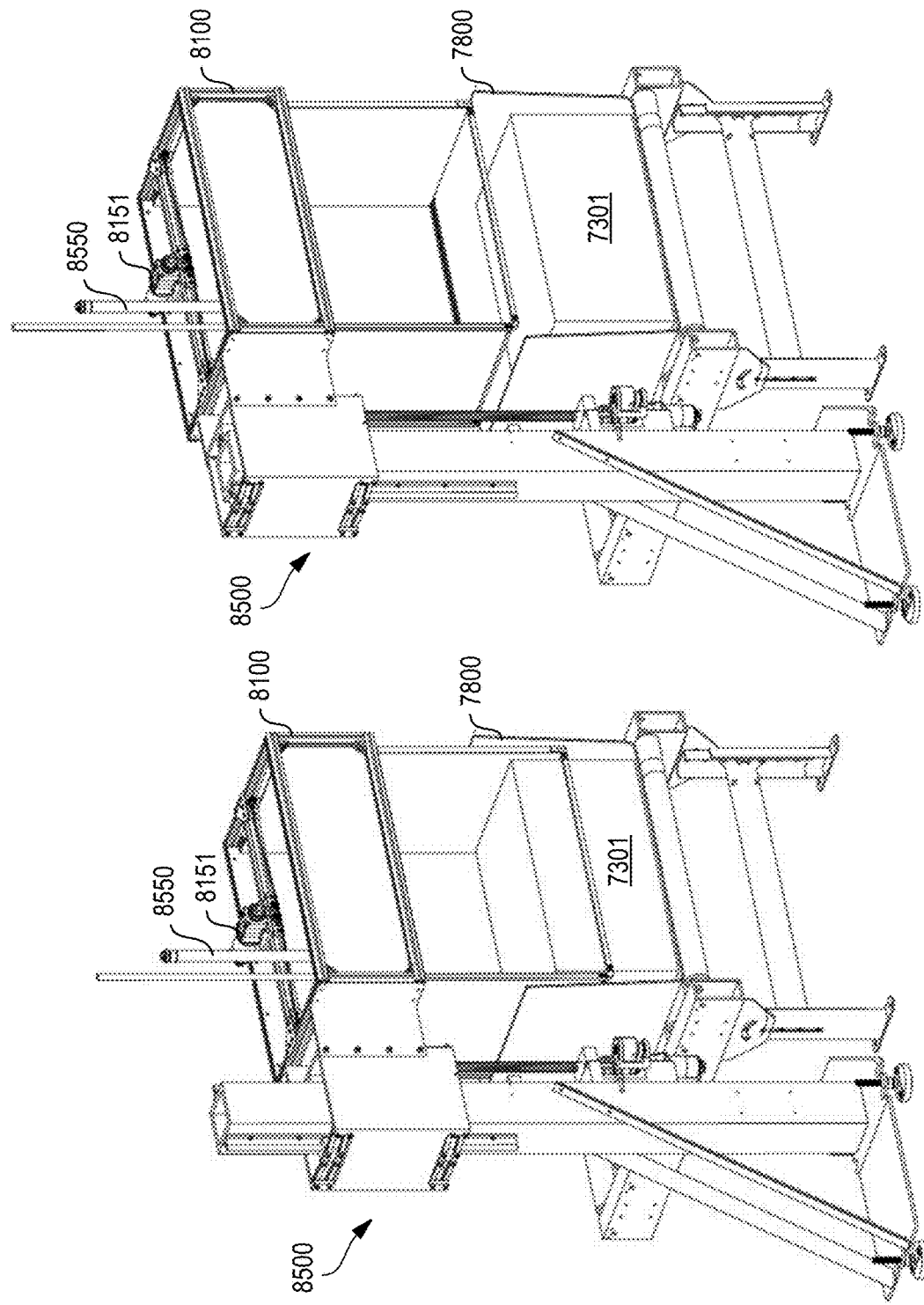
FIG. 34A depicts the view of 33B with the refillable cartridge partially retracted (e.g., raised) from the container.
FIG. 34B depicts the view of 34A with the refillable cartridge fully retracted (e.g., raised) from the container, leaving the articles of laundry disposed within the container.

The method comprises instructing S1184 the drive of the movable support to raise the empty refillable cartridge upon receiving a signal from the drive indicative of the removable floor being retracted, as shown in FIGS. 34A-B and 40B. The method optionally comprises instructing S1186 the dividing wall drive of a support structure to raise from the container a removable dividing wall 8170 movably inserted into the refillable cartridge between the two stacks 7301*b-c* of folded laundry articles disposed in bilateral halves of the refillable cartridge 8100. After fully retracting the refillable cartridge from the container 7800 and raising the refillable cartridge back to the height of the queue conveyor 8200, the method further comprises instructing S1188 the drive motor 8151 of the refillable cartridge 8100 to extend the removable floor 8130 across a bottom of the refillable cartridge 8100 to receive a next queued one or more folded articles 7300 or stacks 7301 of folded articles upon receiving a signal from a height sensor indicative of the refillable cartridge 8100 being raised entirely above the container 7800. In implementations, the height sensor comprises at least one of a limit switch and a motor encoder of the motorized lifter 8500 configured to raise and lower the refillable cartridge 8100. In implementations, the height sensor is configured to detect the removable floor 8130 of the refillable cartridge 8100 being at the height parallel to the queue conveyor 8200.

In implementations, the method 1100 comprises receiving a signal indicative of the heights and area footprint of one or more at least one folded laundry article 7300 and folded stacks 7301 of laundry articles remaining on the queue conveyor 8200 and selecting an empty container 7800 comprising dimensions larger than the combined volume of the folded laundry articles remaining on the queue conveyor 8200. In such implementations, containers of standard selectable sizes are available to be selected and autonomously moved to the conveyor 8400 beneath the refillable cartridge. The method further comprises instructing the conveyor drive 8410 of the container conveyor 8400 disposed beneath the refillable cartridge 8100 to advance the empty container 7800 comprising the selected dimensions to a resting position below the refillable cartridge 8100 as detected by one or more position sensors 8415, such as break beam sensors disposed in the corners of the conveyor for determining the container 7800 being positioned squarely on the conveyor 8400 and in alignment with the refillable cartridge 8100.

As described previously throughout with regard to implementations, the at least one folded laundry article 7300 or stack 7301 of folded laundry articles are unbound, having no outer wrapper or restraint disposed on or enclosed around the folded laundry to prevent unfolding. The at least one folded laundry article or stack of folded laundry articles comprise household laundry belonging to a common (e.g., single) household. The household laundry comprises two or more article types of at least one of different sizes and different shapes, and each one of the two or more article types comprises a longest dimension of between about 4 cm to 500 cm.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

What is claimed is:

1. A refillable cartridge device configured to receive automatically at least one unbound folded laundry article for transfer into a container, the refillable cartridge device comprising:
   a pair of rigid opposed sidewalls;
   a rigid back wall spanning between the pair of opposed sidewalls,
   an opening opposite the rigid back wall, the opening configured to receive the at least one unbound folded laundry article therethrough, the at least one unbound folded laundry article being delivered by at least one extendable surface configured to extend a leading edge through the opening toward the rigid back wall;
   a removable receiving surface configured to span, in a closed position, between a bottom edge of each one of the pair of opposing sidewalls and the rigid back wall;
   at least one drive for moving the removable receiving surface from the closed position to an open position; and
   a controller in operable communication with the at least one drive and a communication network, the controller being configured to
      receive via the communication network one or more sensor signals indicative of at least one of
         the refillable cartridge being filled to a threshold height by the at least one unbound folded laundry article and no additional unbound folded laundry article being queued for insertion into the refillable cartridge, and
      instruct the drive to move the removable receiving surface from the closed position to the open position in response to receiving the one or more sensor signals such that the removable receiving surface is no longer disposed beneath the at least one unbound folded laundry article.

2. The device of claim 1, further comprising one or more channels disposed on at least one of the pair of opposing sidewalls, the one or more channels configured to receive the removable receiving surface in the open position.

3. The device of claim 2, wherein the one or more channels comprises a pair of vertical channels, each one of the vertical channels being disposed adjacent a peripheral edge of the at least one of the pair of rigid opposed sidewalls, and wherein the removable receiving surface is configured to retract into the one or more channels in the open position.

4. The device of claim 3, further comprising one or more cords fixedly attached to the removable receiving surface and configured to route within the one or more channels.

5. The device of claim 4, further comprising a motorized pulley configured to receive the one or more cords, wherein the motorized pulley comprises the drive of the removable receiving surface, the motorized pulley being configured to selectively raise and lower the one or more cords to retract the removable receiving surface in the open position and return the removable receiving surface to the closed position.

6. The device of claim 1, wherein the removable receiving surface is pliant and comprises at least one of rubber, PVC, urethane, neoprene, nylon, nitrile, polyester, leather, and KEVLAR.

7. The device of claim 6, wherein the removable receiving surface comprises a linked belt.

8. The device of claim 1, wherein the at least one unbound folded laundry article comprises a plurality of unbound folded laundry articles disposed sequentially in a queue on a queue conveyor proximate the receiving surface.

9. The device of claim 8, wherein the plurality of unbound folded laundry articles comprises household laundry belonging to a single household, wherein the household laundry comprises two or more article types of at least one of different sizes and different shapes, and wherein each of the two or more article types comprises a longest dimension of between 4 cm to 500 cm.

10. The device of claim 1, wherein the at least one unbound folded laundry articles comprises at least one stack of unbound folded laundry articles, and wherein a height of the at least one stack of unbound folded laundry articles is less than or equal to a height of the container.

11. The device of claim 10, wherein each unbound folded laundry article of the at least one stack of folded laundry articles comprises at least one of a common article type and area footprint.

12. The device of claim 11, wherein the at least one stack comprises two or more stacks of folded laundry articles disposed adjacent the refillable cartridge in two parallel queues, each one of the two parallel queues being aligned with one half of a volume of the refillable cartridge.

13. The device of claim 12, wherein the two parallel queues are staggered along a length of the two parallel queues and each one of the two parallel queues comprises a sum total height equal to a sum total height of another of the two parallel queues.

14. The device of claim 12, wherein the two or more stacks of the two parallel queues are disposed in order of size, and wherein at least one of the at least one unbound folded laundry article and the two or more stacks of folded laundry articles comprising a largest folded area is disposed closest to the refillable cartridge.

15. The device of claim 12, wherein the at least one extendable surface comprises a pair of movable conveyors and each one of the two parallel queues is disposed on one of the pair of movable in operable communication with the controller.

16. The device of claim 15, wherein each one of the pair of movable conveyors comprises a loading end proximate the opening, the loading end configured to
- extend a leading edge out to the rigid back wall at a loading height,
- rotate a conveyor belt to advance the at least one of the at least one unbound folded laundry article and one of the two or more stacks to the leading edge extended out toward the rigid back wall, and retract the leading edge backward to deposit
- the at least one of the at least one unbound folded laundry article and one of the two or more stacks into the refillable cartridge.

17. The device of claim 16, further comprising a motorized lifter configured to
- engage with the refillable cartridge, and
- raise and lower the refillable cartridge to at least one of
  - one or more loading heights for receiving the at least two stacks of folded laundry articles, and
  - an unloading position within the container.

18. The device of claim 17, wherein the motorized lifter comprises a carriage configured to attach to an upper portion of the refillable cartridge and move upward and downward along one or more stationary rails.

19. The device of claim 18, further comprising at least one of a rack and pinion, timing belt drive, counterweight, and leadscrew configured to move the carriage upward and downward along the one or more stationary rails.

20. The device of claim 17, wherein the at least one of the receiving surface and a top surface of an unbound folded laundry article received within the refillable cartridge is configured to be positioned below a bottom surface of the at least one conveyor in a range of between 1 mm to 100 mm prior to loading at the loading height.

21. The device of claim 17, wherein the motorized lifter further comprises one or more plungers configured to engage the received at least one unbound folded laundry article received within the refillable cartridge, apply a compression force, and retract from the at least one unbound folded laundry article.

22. The device of claim 21, wherein the one or more plungers are configured to remain engaged with the received at least one unbound folded laundry article during a descent of the refillable cartridge into the container.

23. The device of claim 22, wherein a plunger compression force comprises a range of between 0.25 lbf to 5 lbf.

24. The device of claim 21, further comprising at least one load cell disposed on the one or more plungers, the at least one load cell being configured to sense a height of the at least one unbound folded laundry article received within the refillable cartridge and output a signal indicative of the height to the controller.

25. The device of claim 1, further comprising at least one sensor configured to detect a height of the at least one unbound article received within the refillable cartridge, wherein the at least one sensor is at least one of a break beam, 3-D camera, an IR sensor, a 2-D camera, LIDAR, LADAR, a sonar proximity sensor, an ultrasonic ranging sensor, a radar sensor, and a pair of stereo depth cameras.

* * * * *